United States Patent
Park et al.

(10) Patent No.: US 11,818,076 B2
(45) Date of Patent: Nov. 14, 2023

(54) METHOD FOR TRANSMITTING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Haewook Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 17/593,510

(22) PCT Filed: Mar. 20, 2020

(86) PCT No.: PCT/KR2020/004346
§ 371 (c)(1),
(2) Date: Sep. 20, 2021

(87) PCT Pub. No.: WO2020/204538
PCT Pub. Date: Oct. 8, 2020

(65) Prior Publication Data
US 2022/0200767 A1    Jun. 23, 2022

(30) Foreign Application Priority Data

Mar. 29, 2019 (KR) ........................ 10-2019-0037488

(51) Int. Cl.
*H04B 7/02* (2018.01)
*H04L 5/00* (2006.01)
*H04B 7/0417* (2017.01)

(52) U.S. Cl.
CPC ......... *H04L 5/0057* (2013.01); *H04B 7/0417* (2013.01); *H04L 5/0048* (2013.01)

(58) Field of Classification Search
CPC .... H04L 5/0057; H04L 5/0048; H04B 7/0417
(Continued)

(56) References Cited

U.S. PATENT DOCUMENTS

2018/0205442 A1* 7/2018 Oteri ..................... H04W 88/08
2019/0068266 A1   2/2019 Chang et al.
(Continued)

FOREIGN PATENT DOCUMENTS

WO    2018088739    5/2018
WO    2018174636    9/2018

OTHER PUBLICATIONS

PCT International Application No. PCT/KR2020/004346, International Search Report dated Jul. 23, 2020, 5 pages.
(Continued)

*Primary Examiner* — Zewdu A Kassa
(74) *Attorney, Agent, or Firm* — LEE HONG DEGERMAN KANG & WAIMEY

(57) ABSTRACT

A method by which a terminal transmits channel state information (CSI) in a wireless communication system comprises the steps of: receiving, from a base station, linear combining-based codebook-related parameters; calculating the CSI on the basis of the codebook-related parameters; and reporting the CSI to the base station, wherein a channel quality indicator (CQI) in the CSI is calculated using a precoding matrix indicator (PMI) determined so as to maintain orthogonality between respective layers by using a predefined method.

12 Claims, 20 Drawing Sheets

(58) Field of Classification Search
USPC ................ 375/267, 260, 259, 219, 295, 316
See application file for complete search history.

(56) References Cited

U.S. PATENT DOCUMENTS

| | | |
|---|---|---|
| 2019/0068268 A1 | 2/2019 | Zhang et al. |
| 2021/0075486 A1* | 3/2021 | Song .................... H04B 7/0626 |
| 2021/0175950 A1* | 6/2021 | Sergeev ............... H04B 7/0634 |
| 2021/0328742 A1* | 10/2021 | Hao ...................... H04L 5/0057 |

OTHER PUBLICATIONS

Samsung et al., "WF on Layer indicator reporting," 3GPP TSG RAN WG1 AH1801, R1-1801103, Jan. 2018, 3 pages.

* cited by examiner

[FIG. 1]
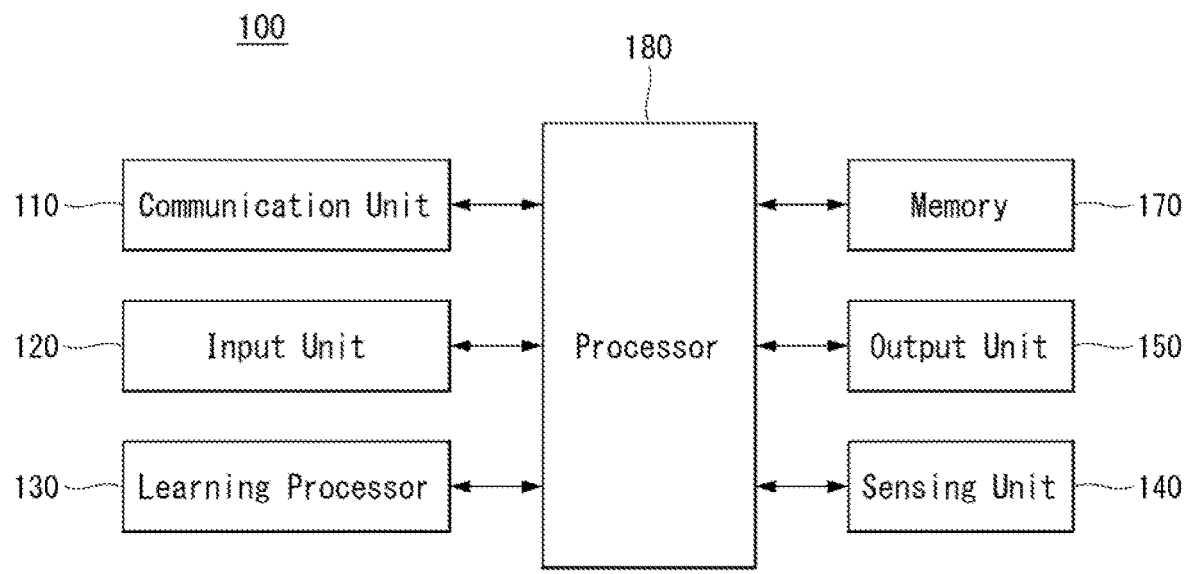
[FIG. 2]
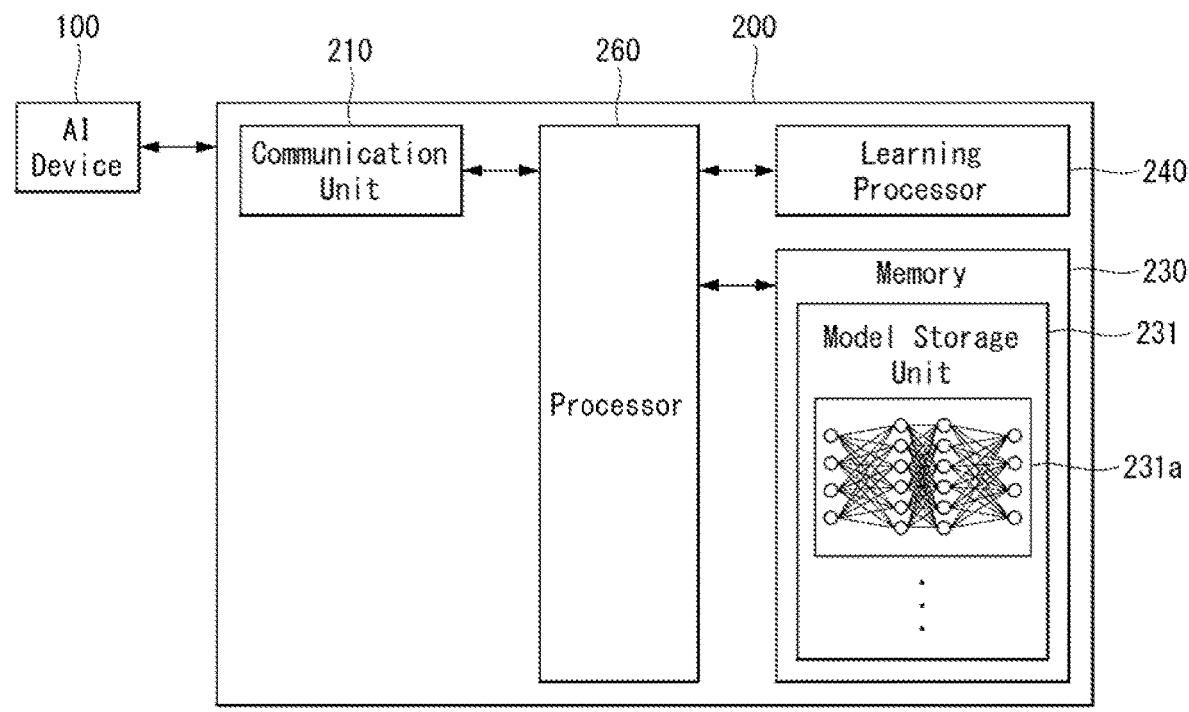

[FIG. 3]
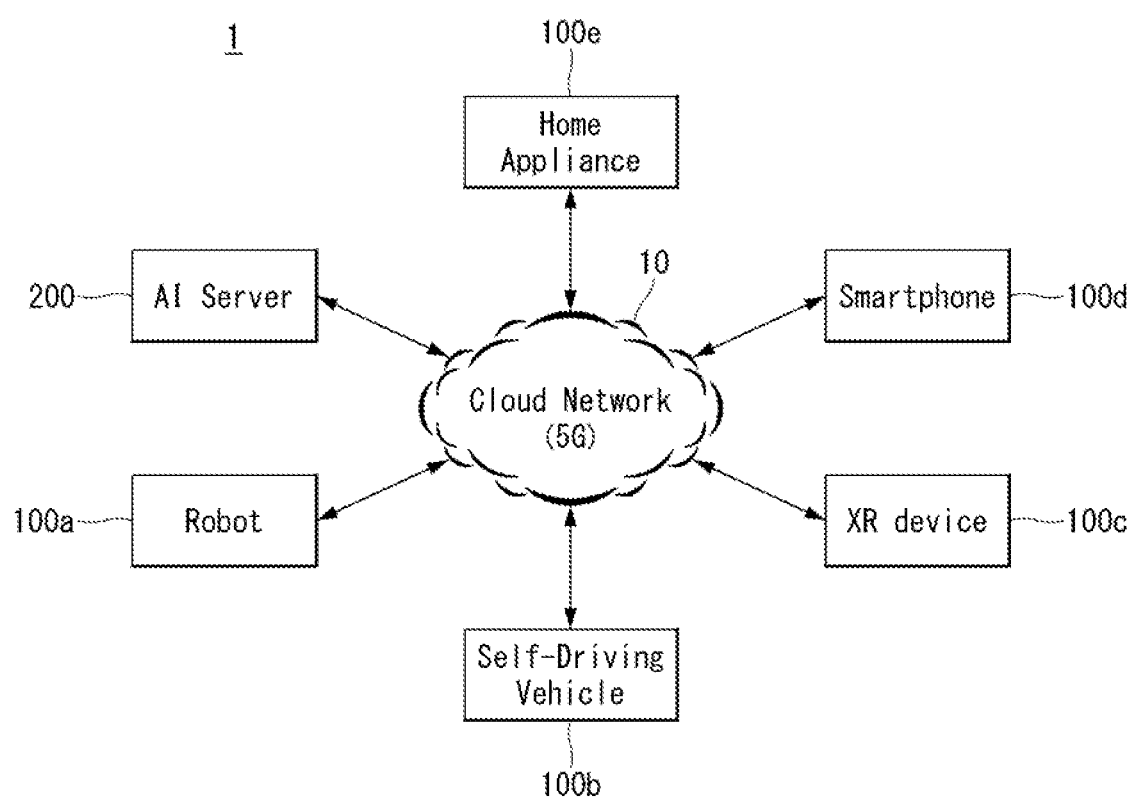

[FIG. 4]
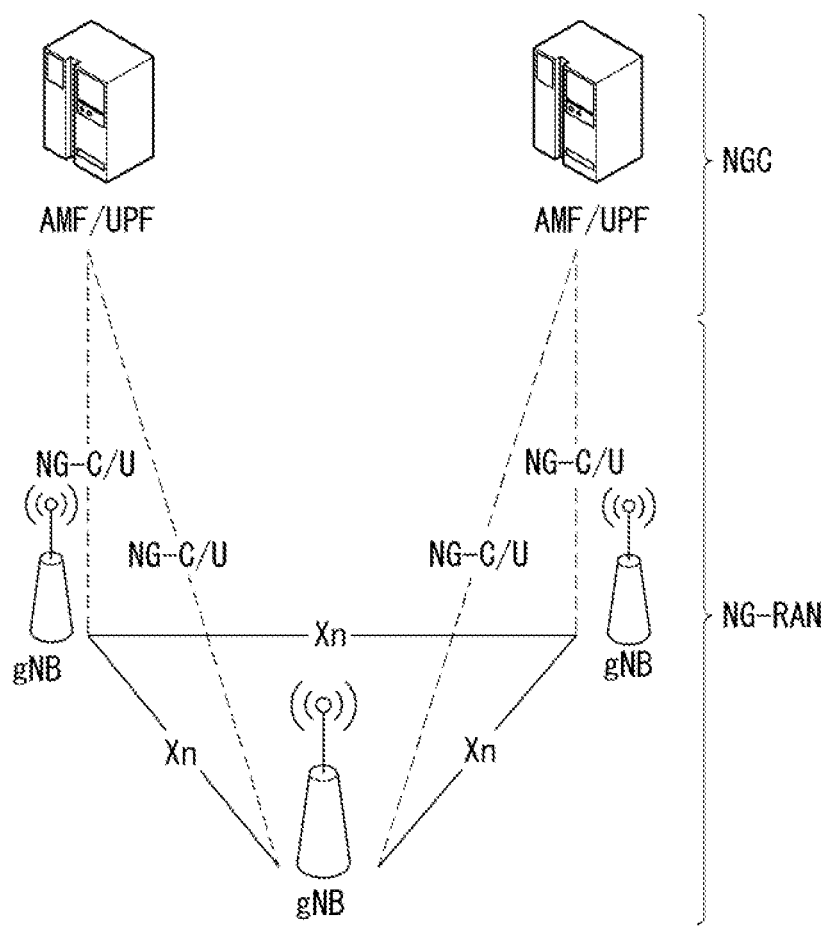

[FIG. 5]
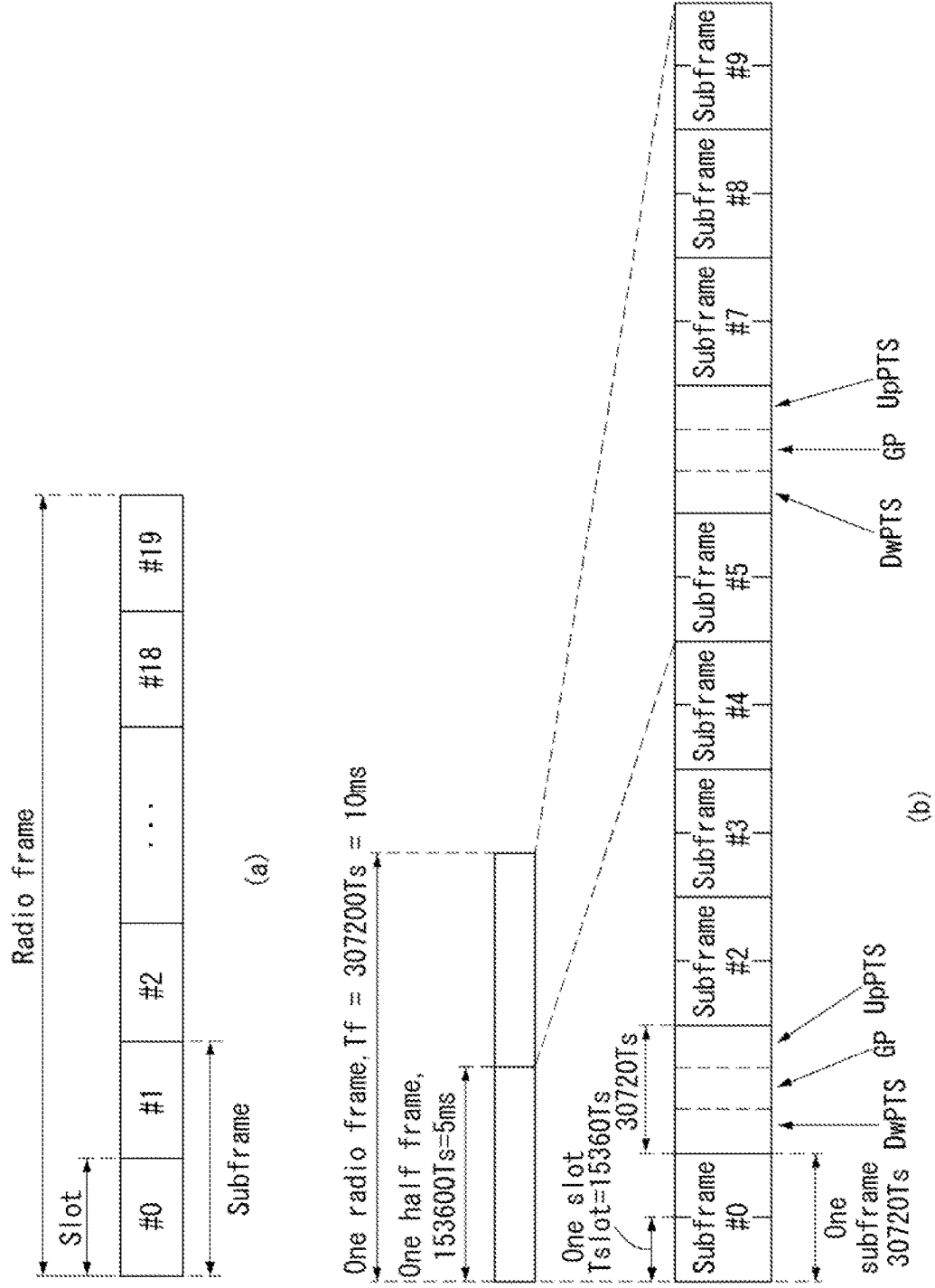

[FIG. 6]
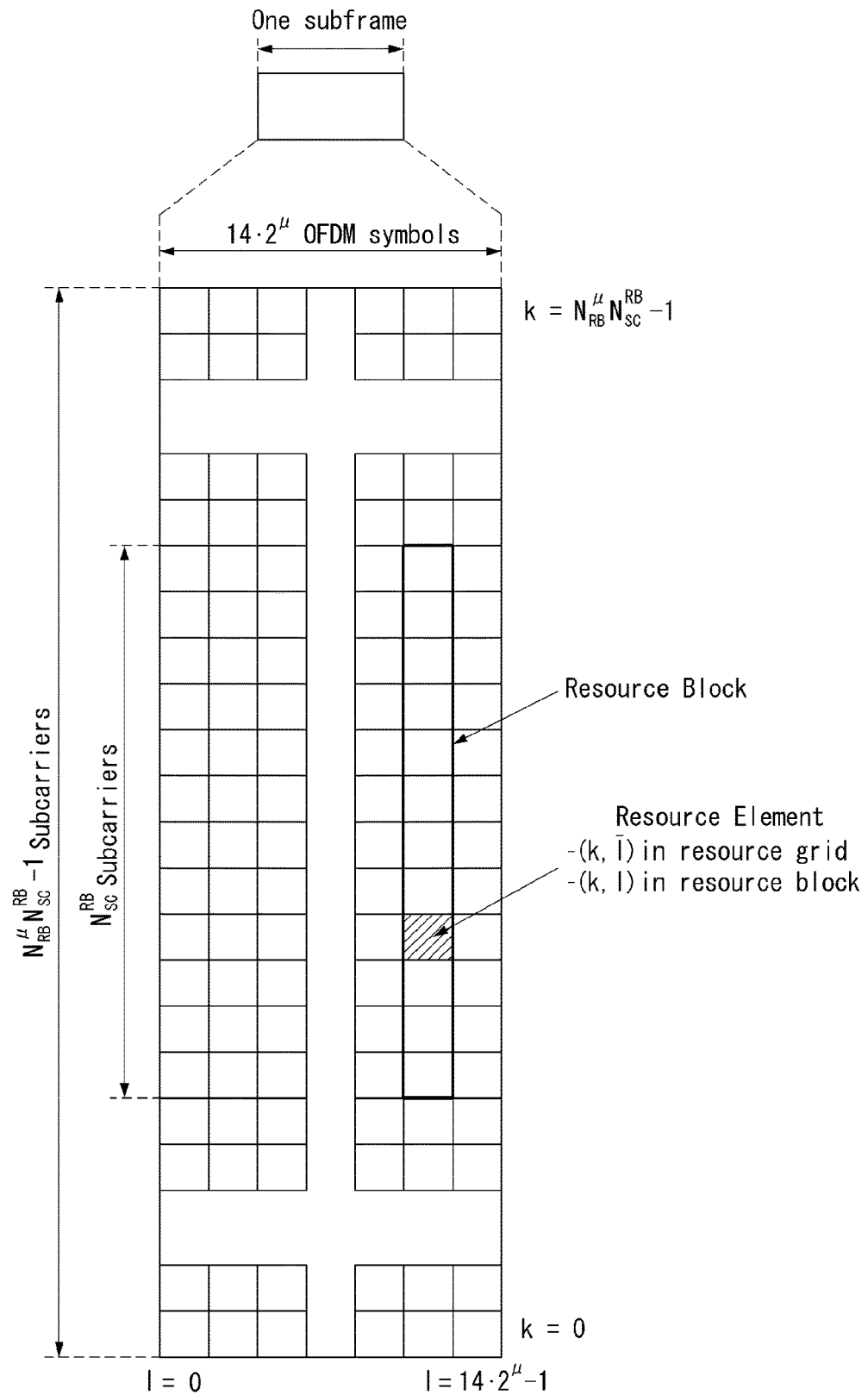

[FIG. 7]
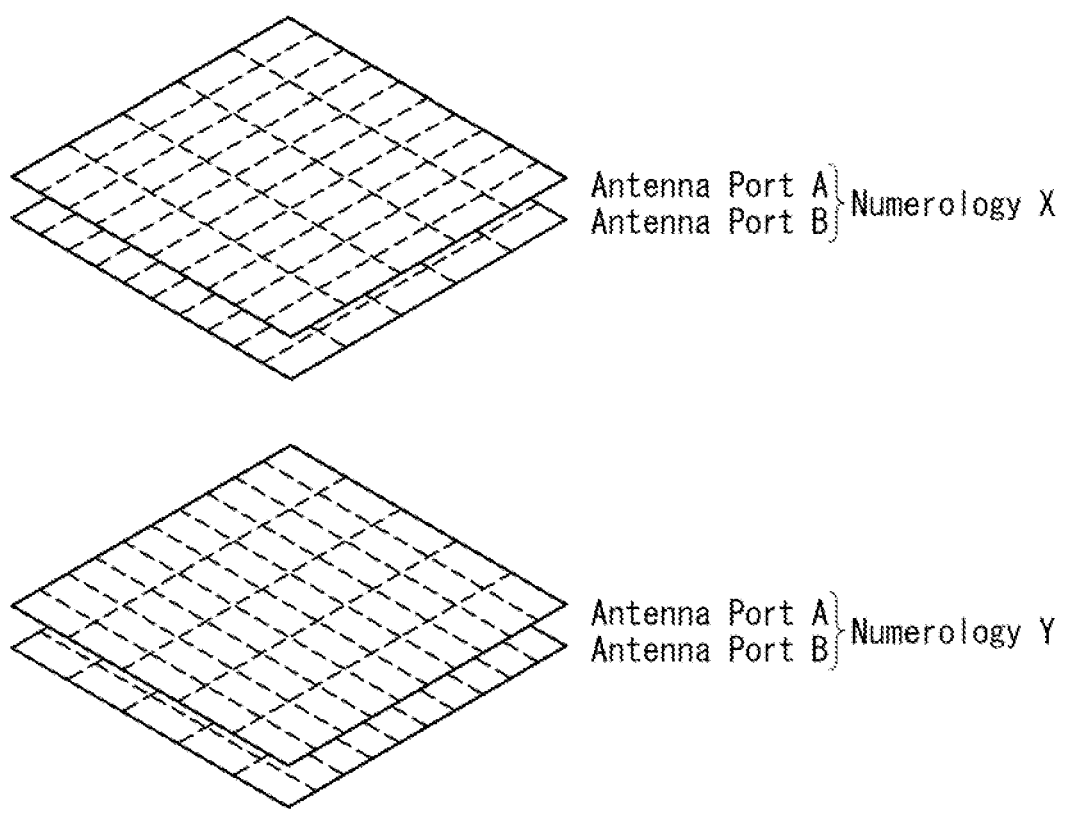

[FIG. 8]
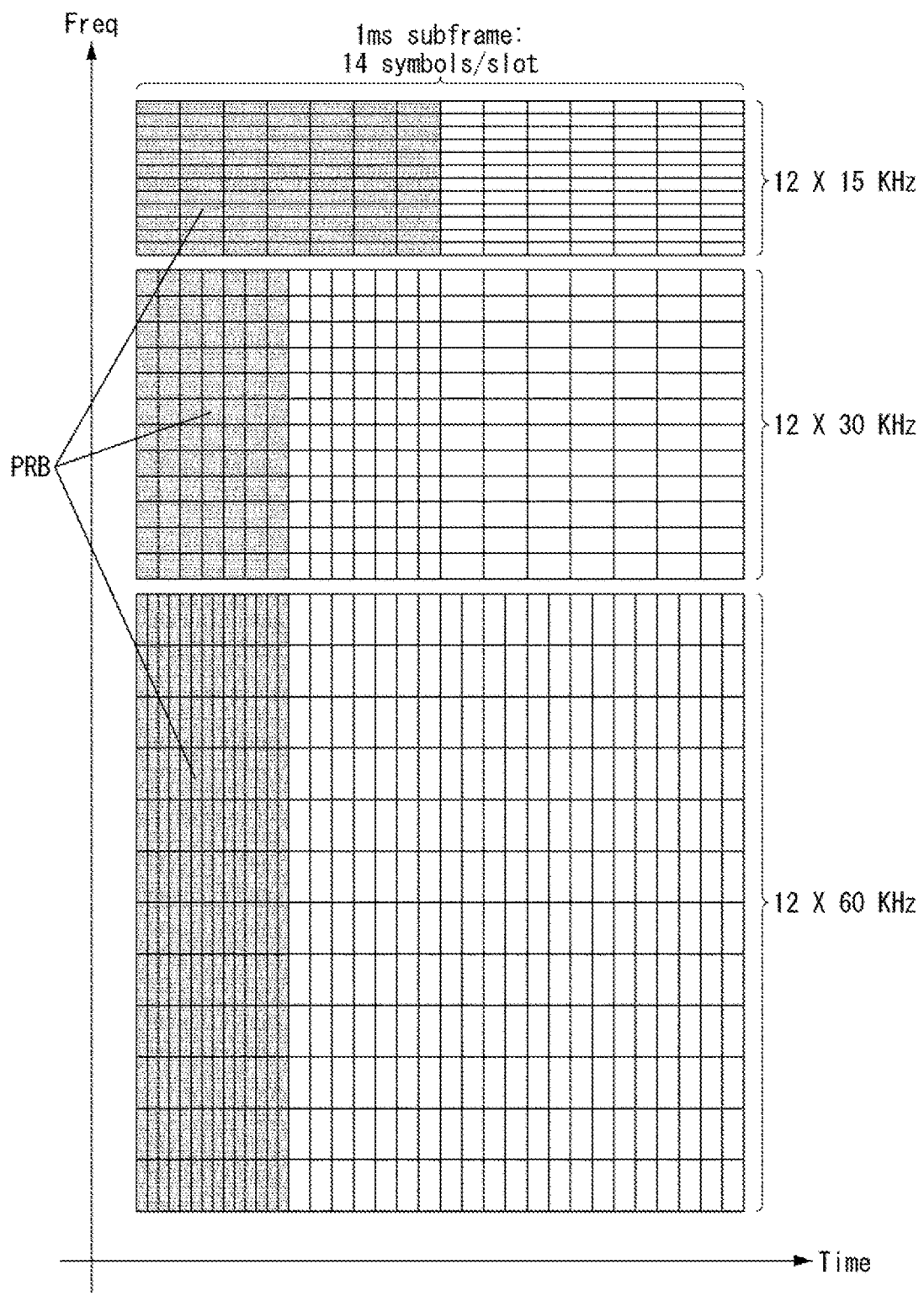

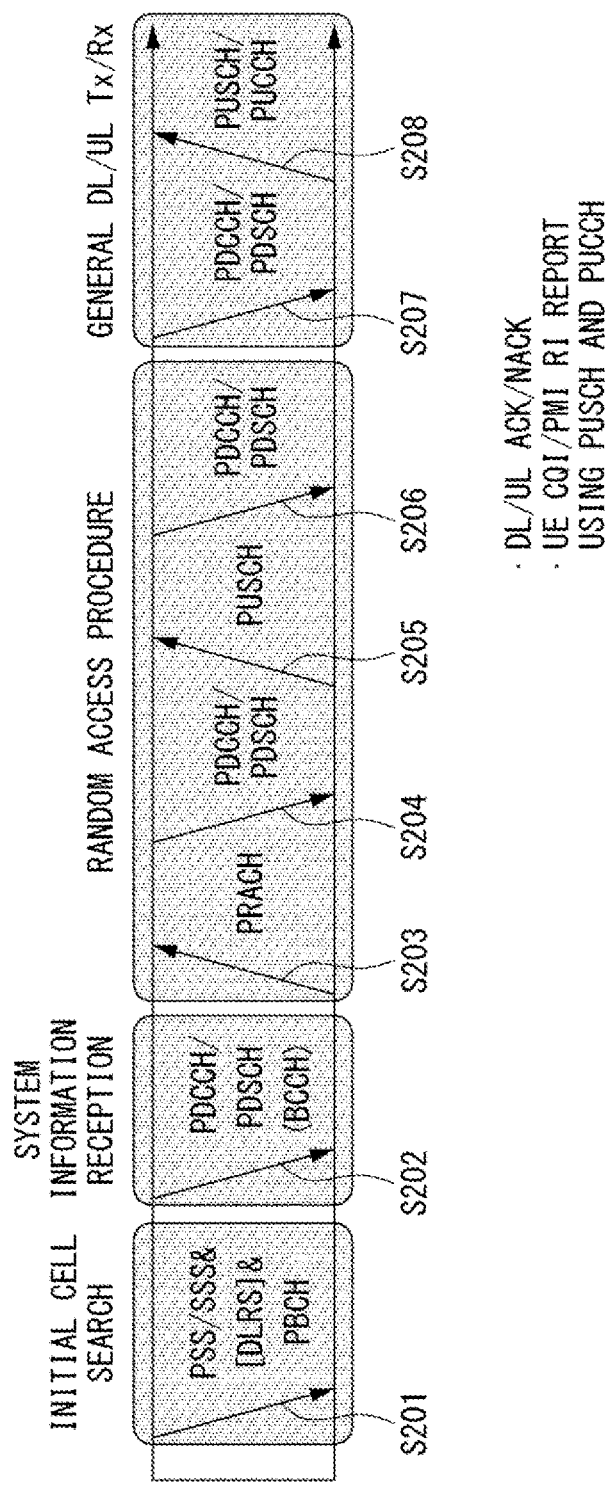
[FIG. 9]

[FIG. 10]
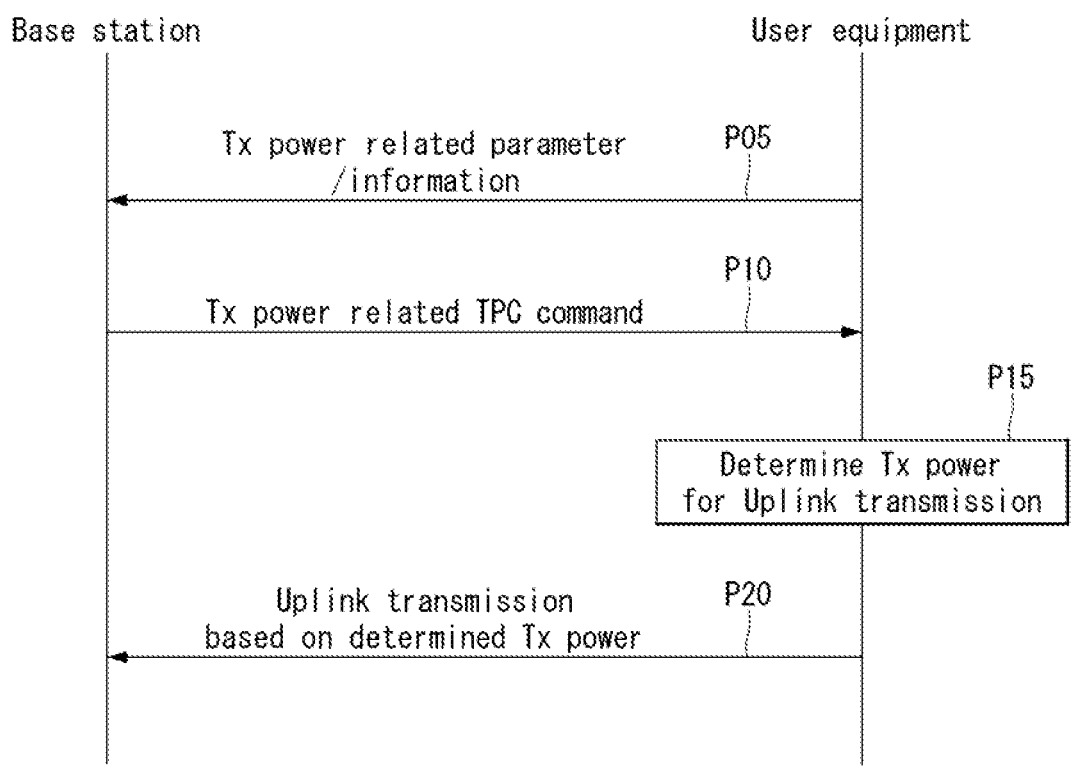

[FIG. 11]
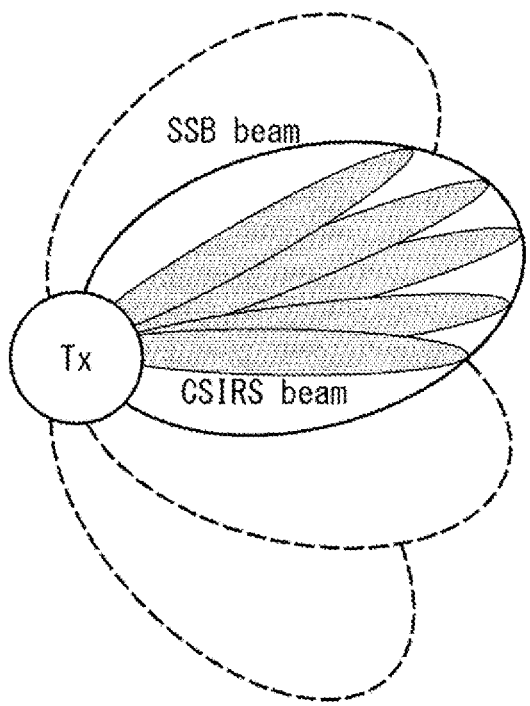
[FIG. 12]
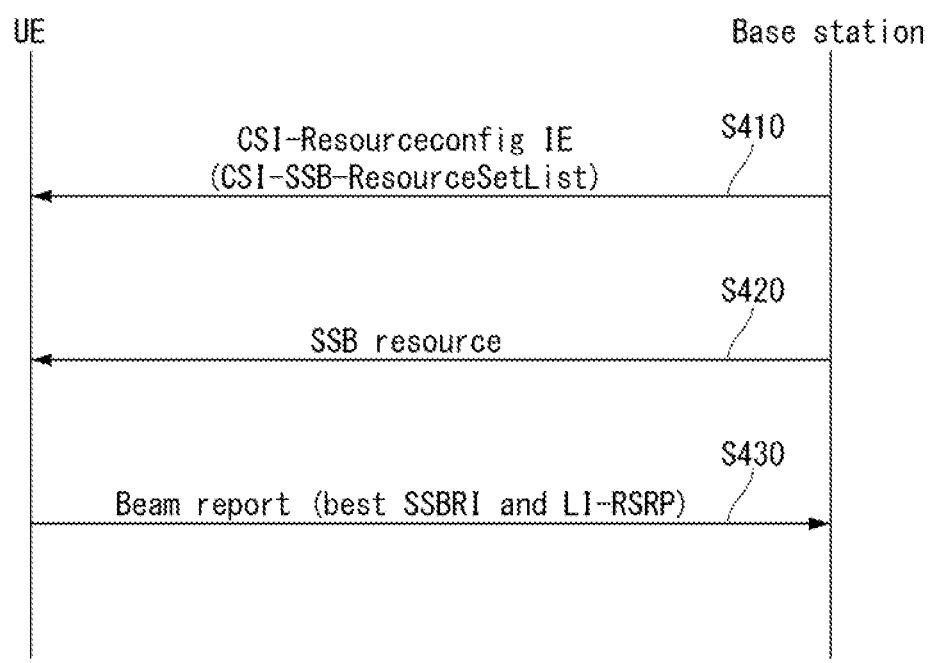

[FIG. 13]
(a)
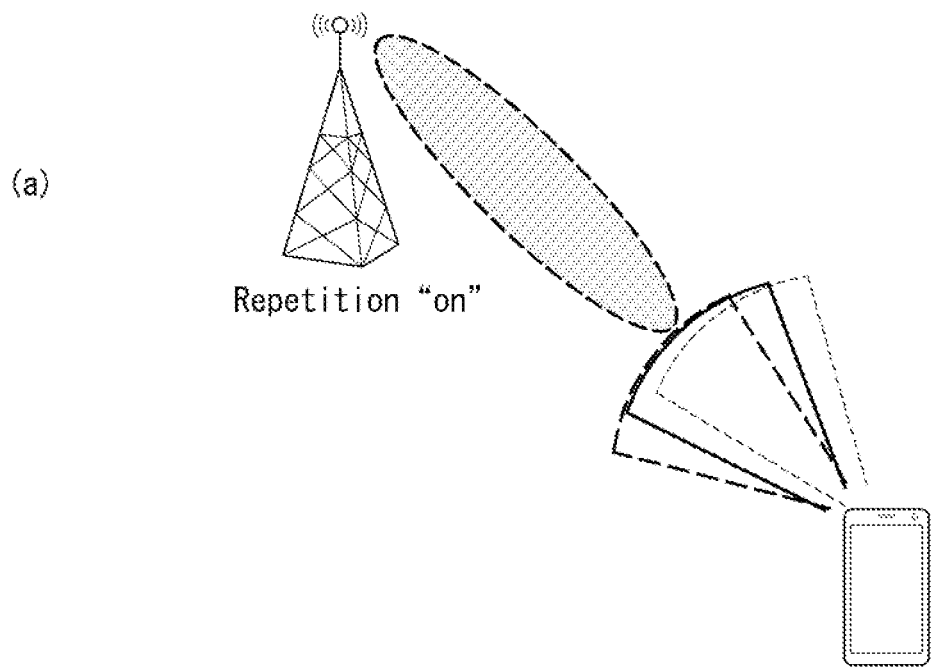
(b)
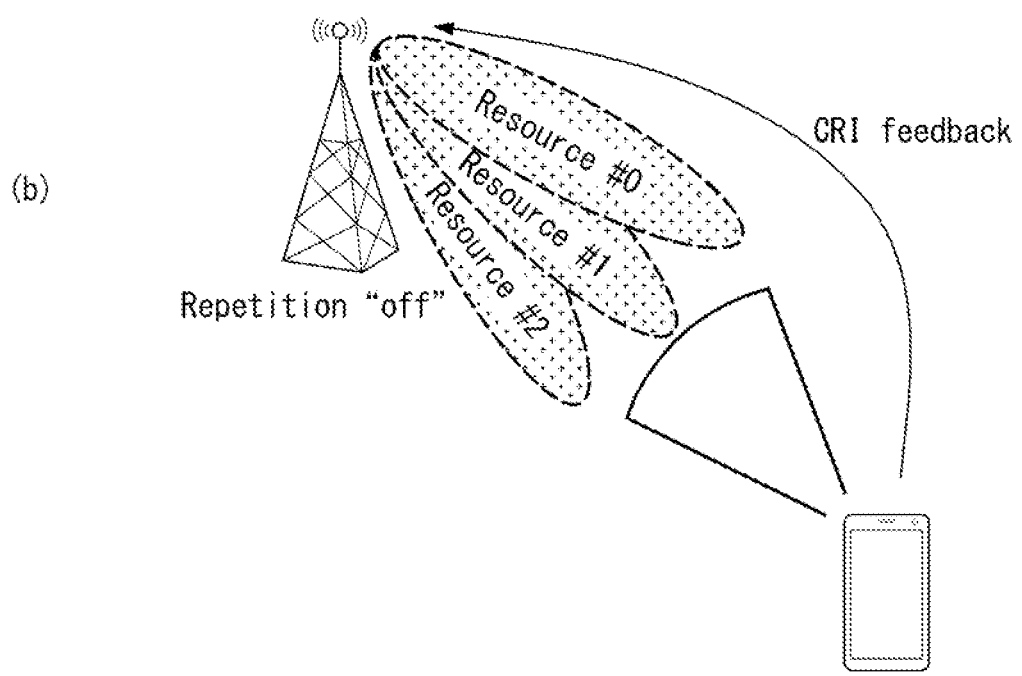

[FIG. 14]
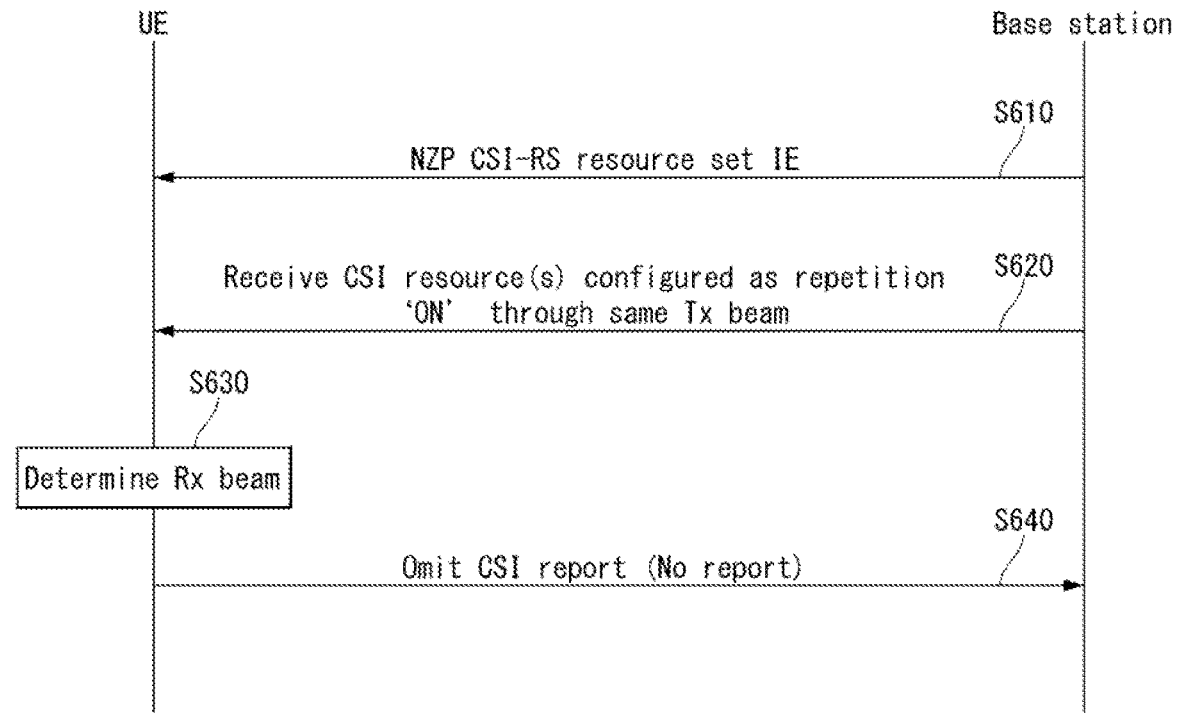
[FIG. 15]
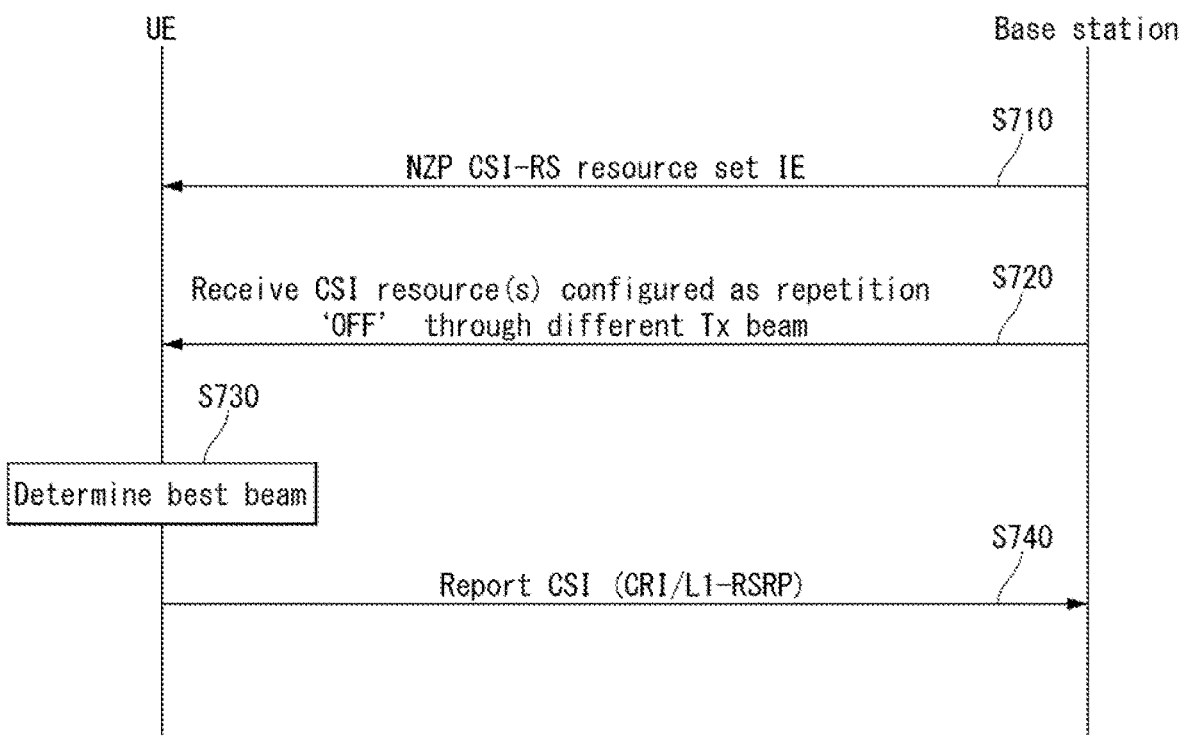

[FIG. 16]
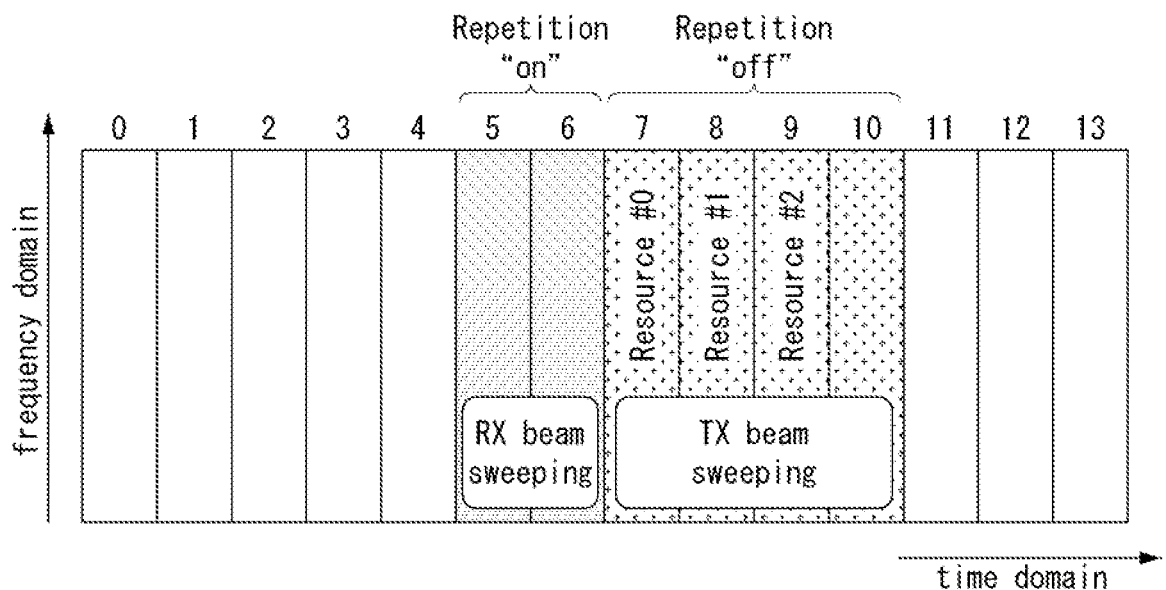
[FIG. 17]
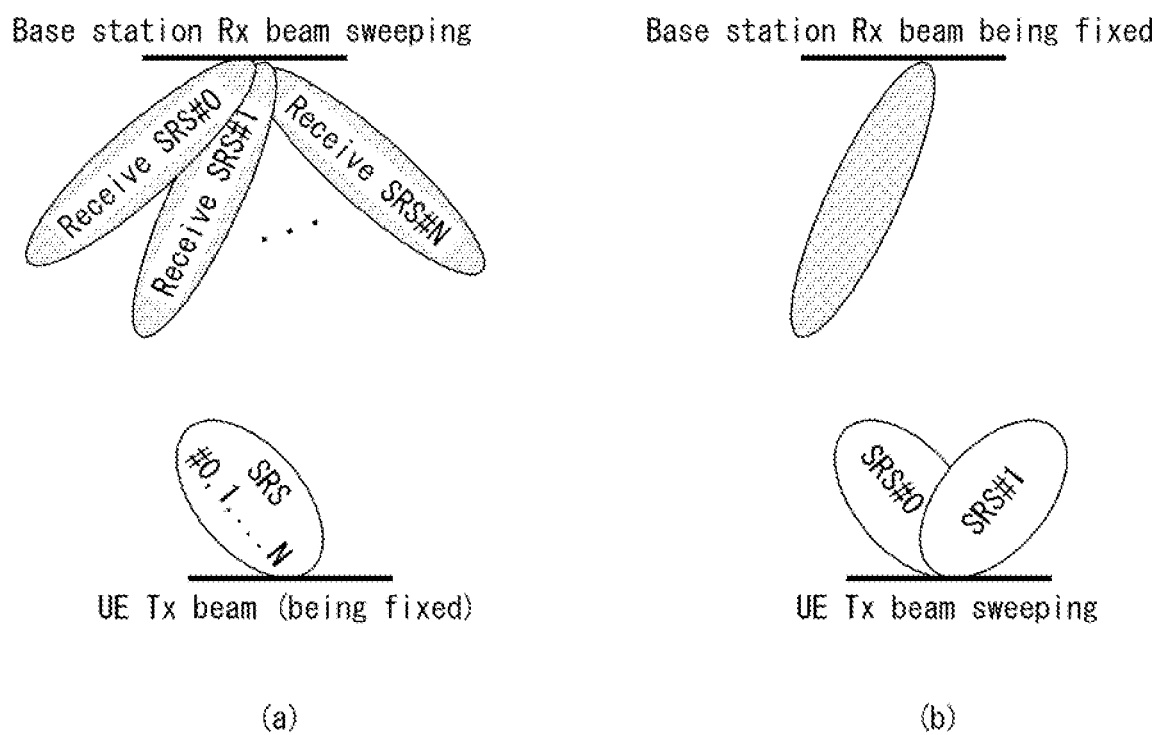

【FIG. 18】
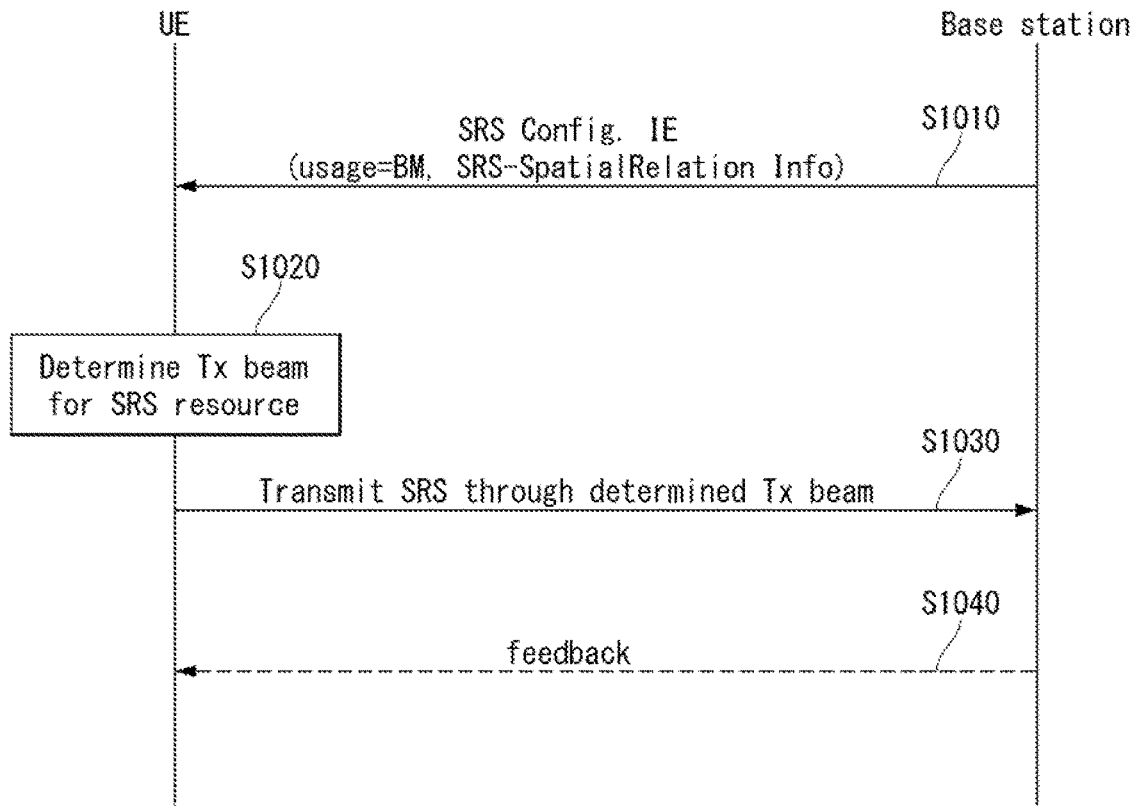
【FIG. 19】
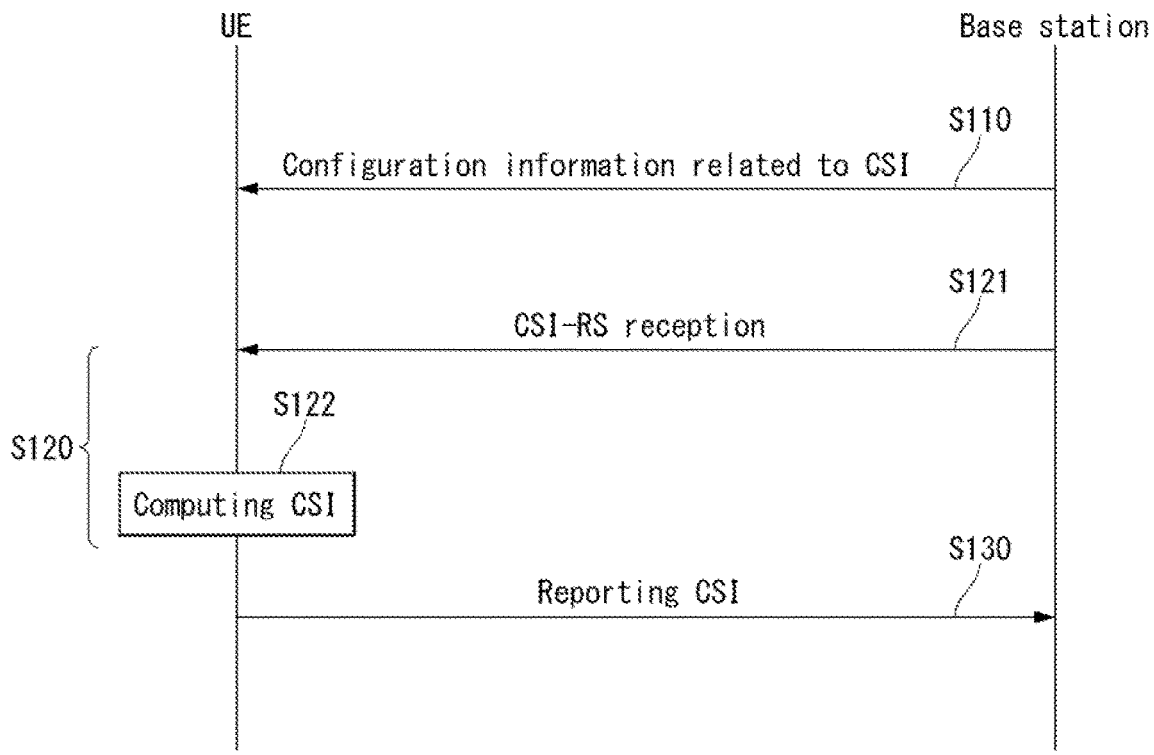

[FIG. 20]
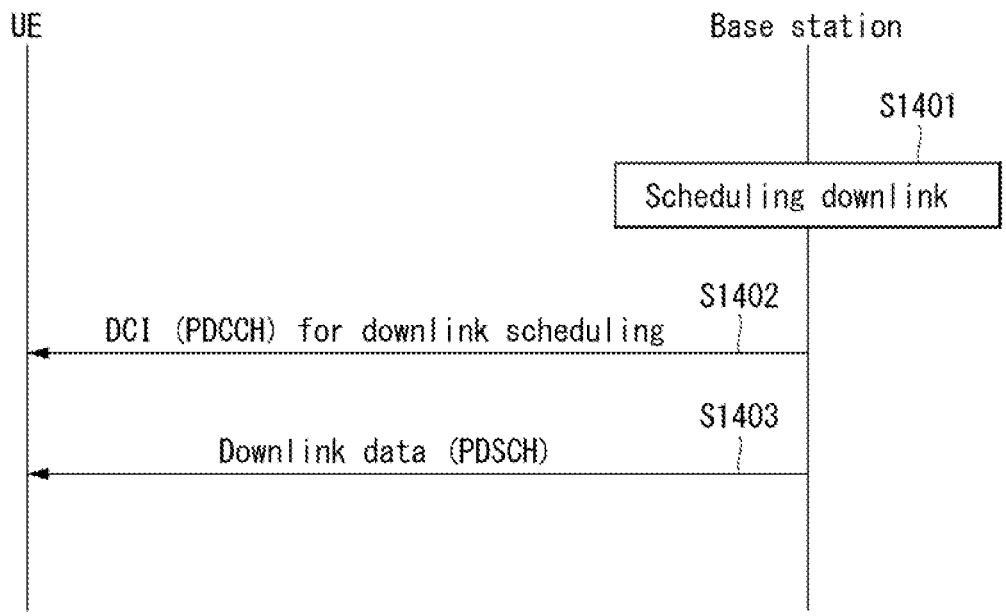
[FIG. 21]
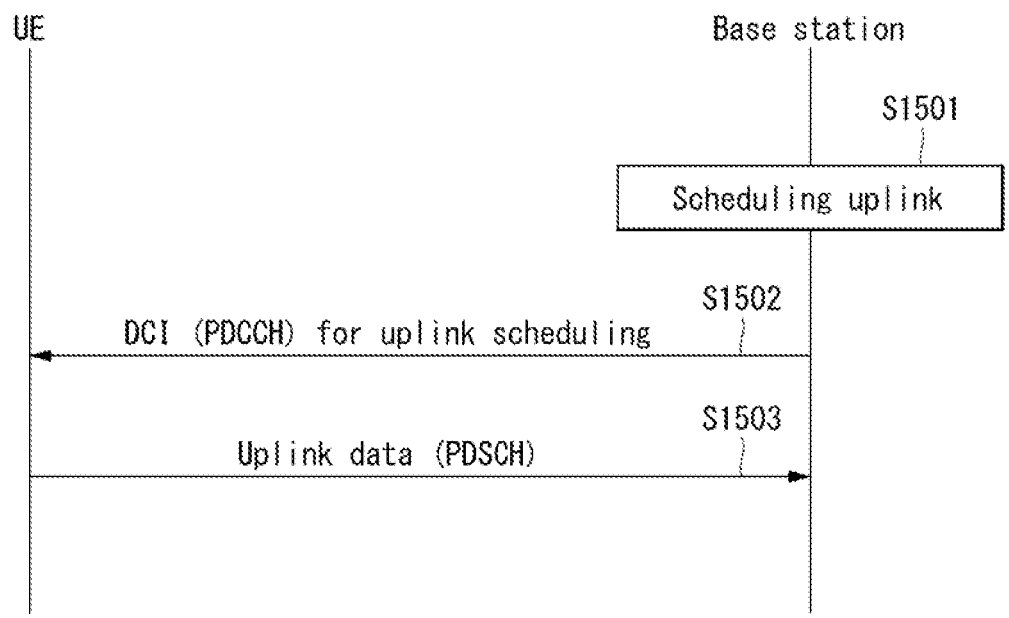

[FIG. 22]
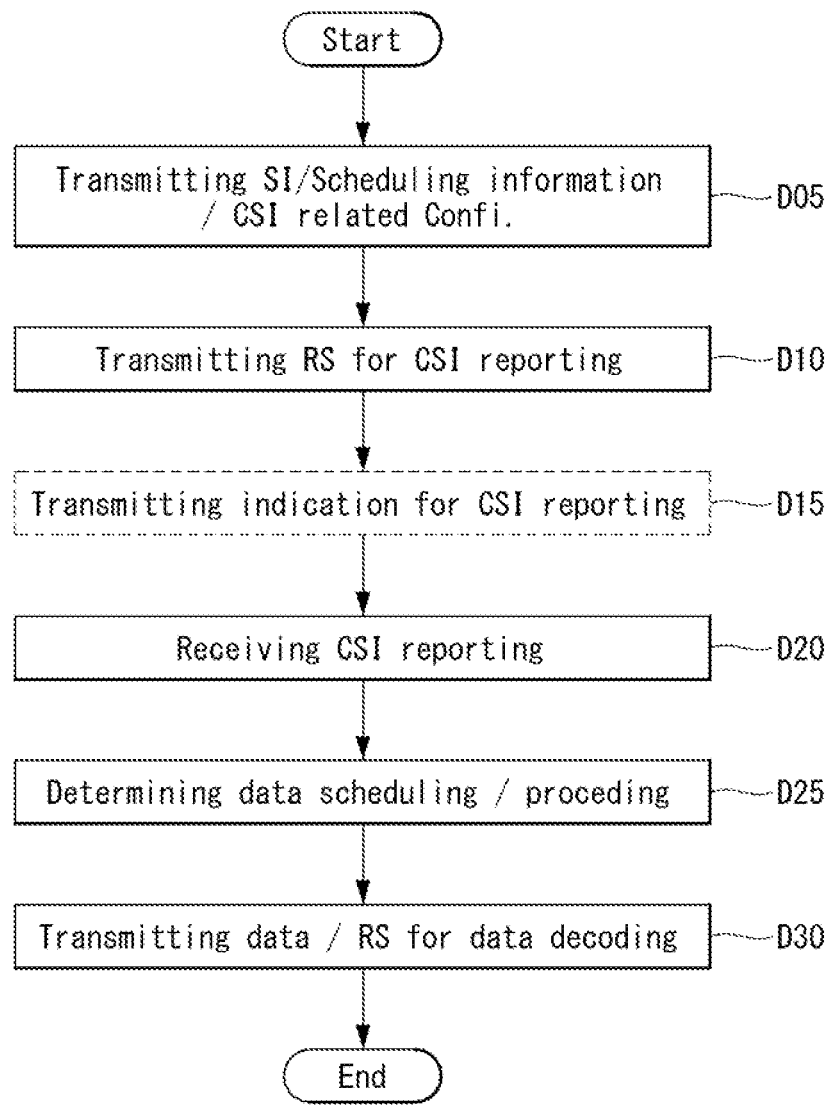

[FIG. 23]
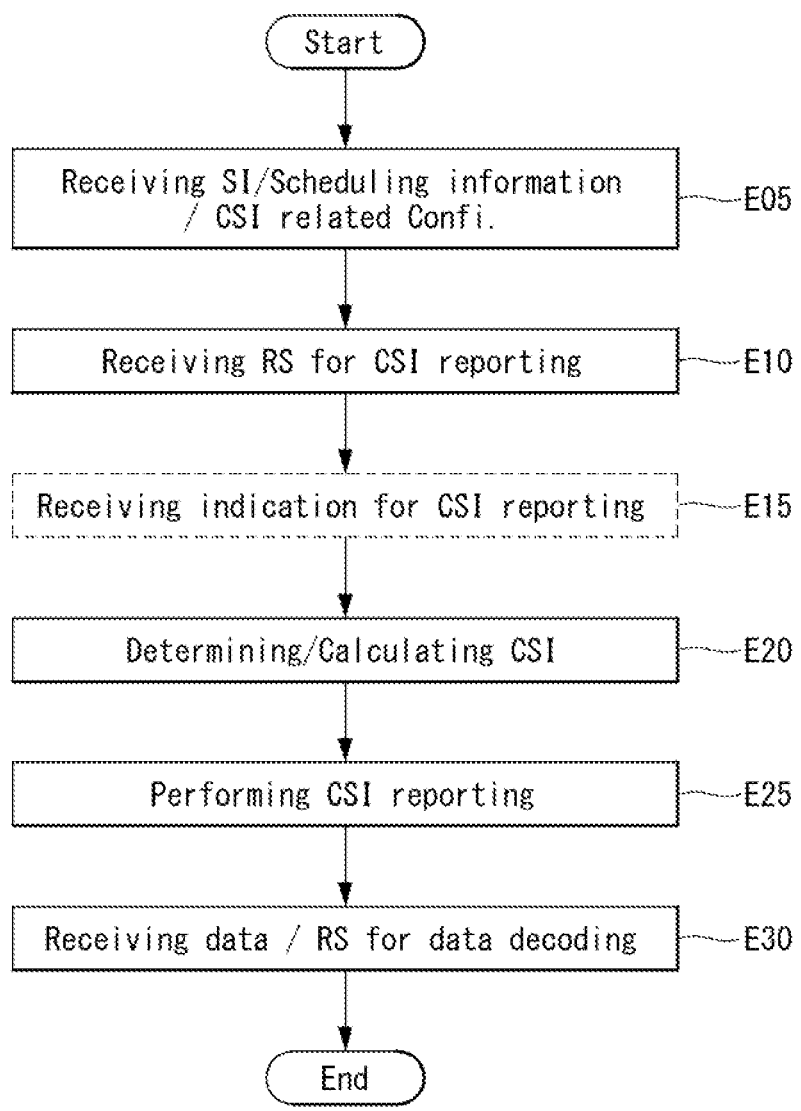

[FIG. 24]
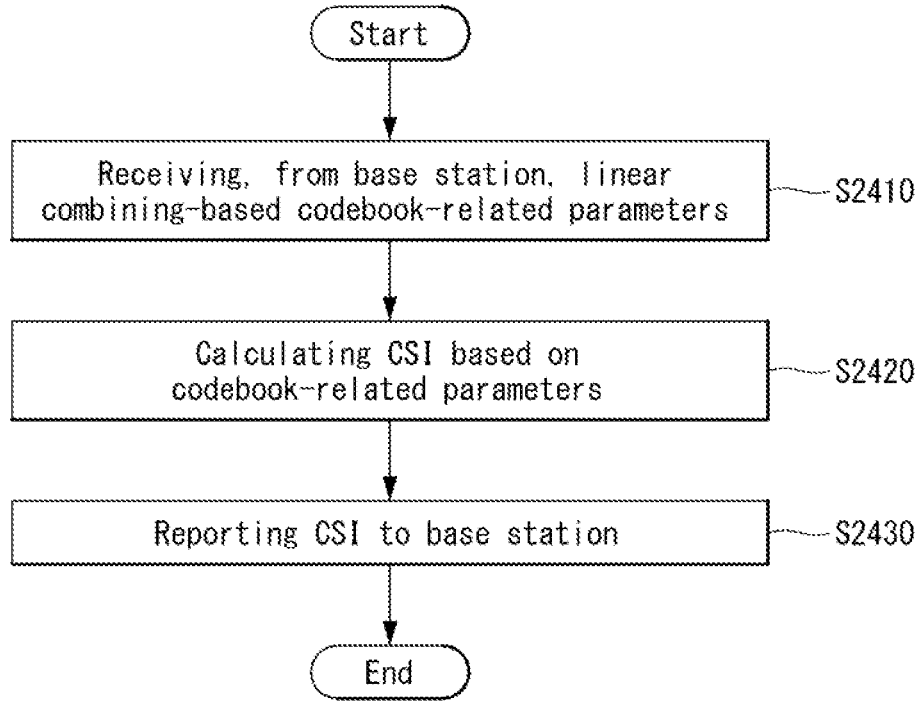
[FIG. 25]
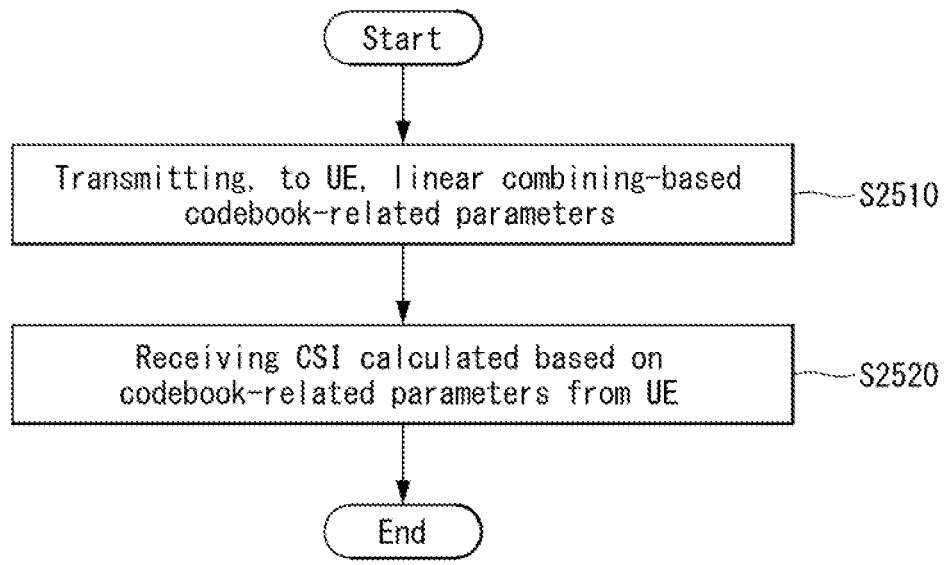

[FIG. 26]
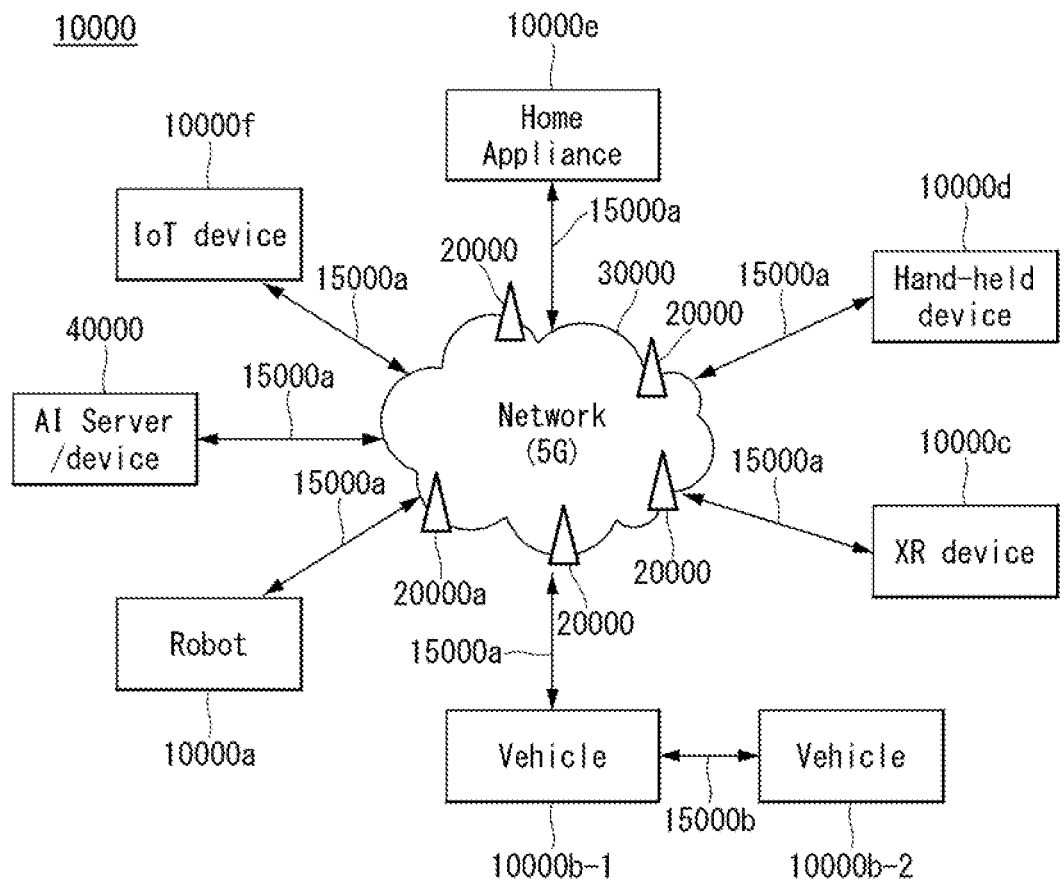
[FIG. 27]
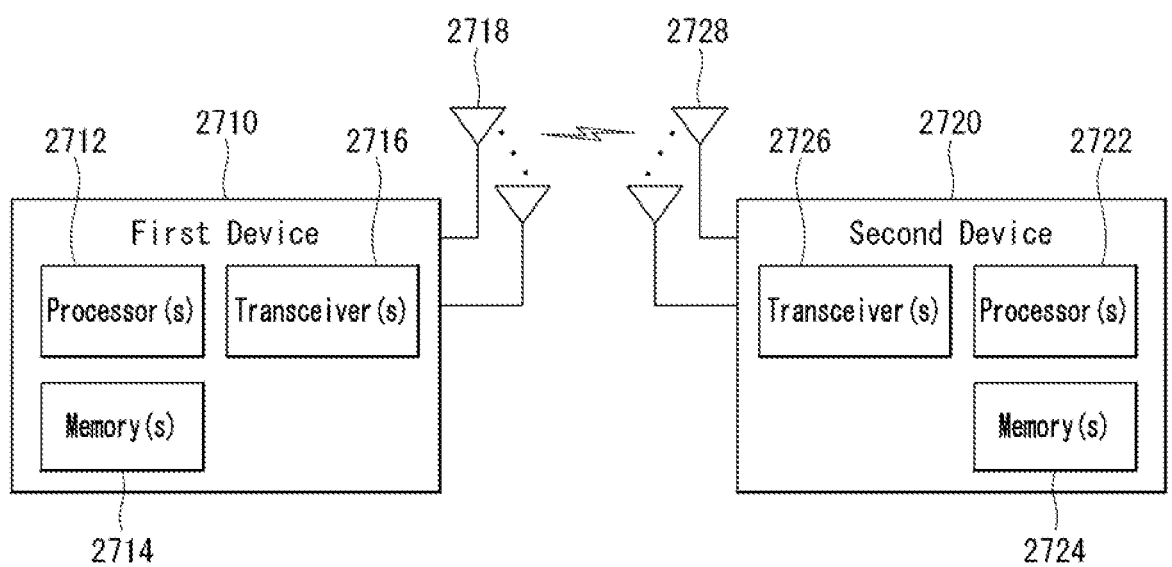

[FIG. 28]
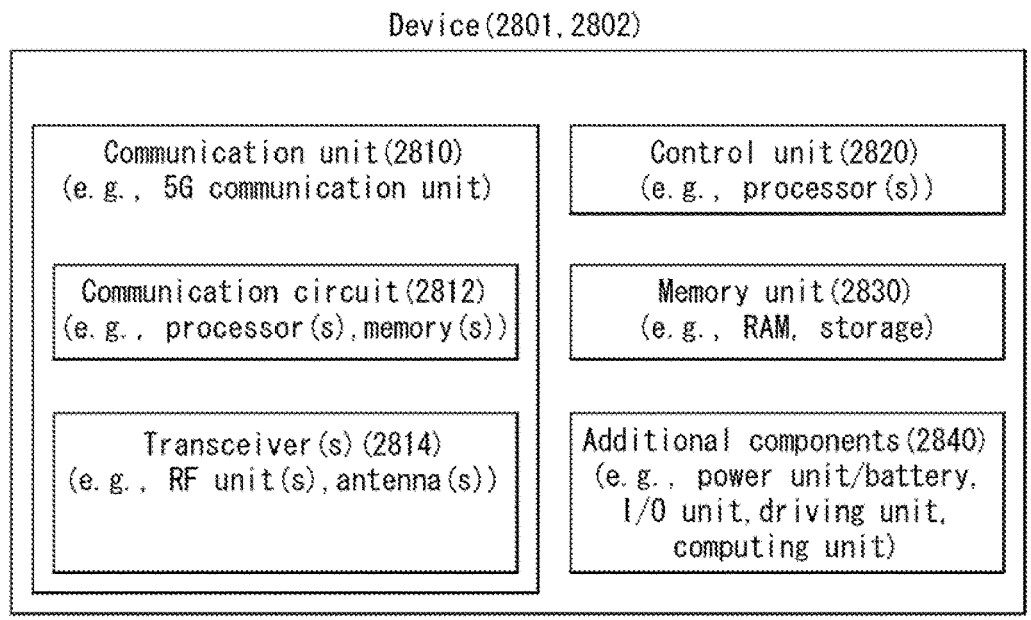
[FIG. 29]
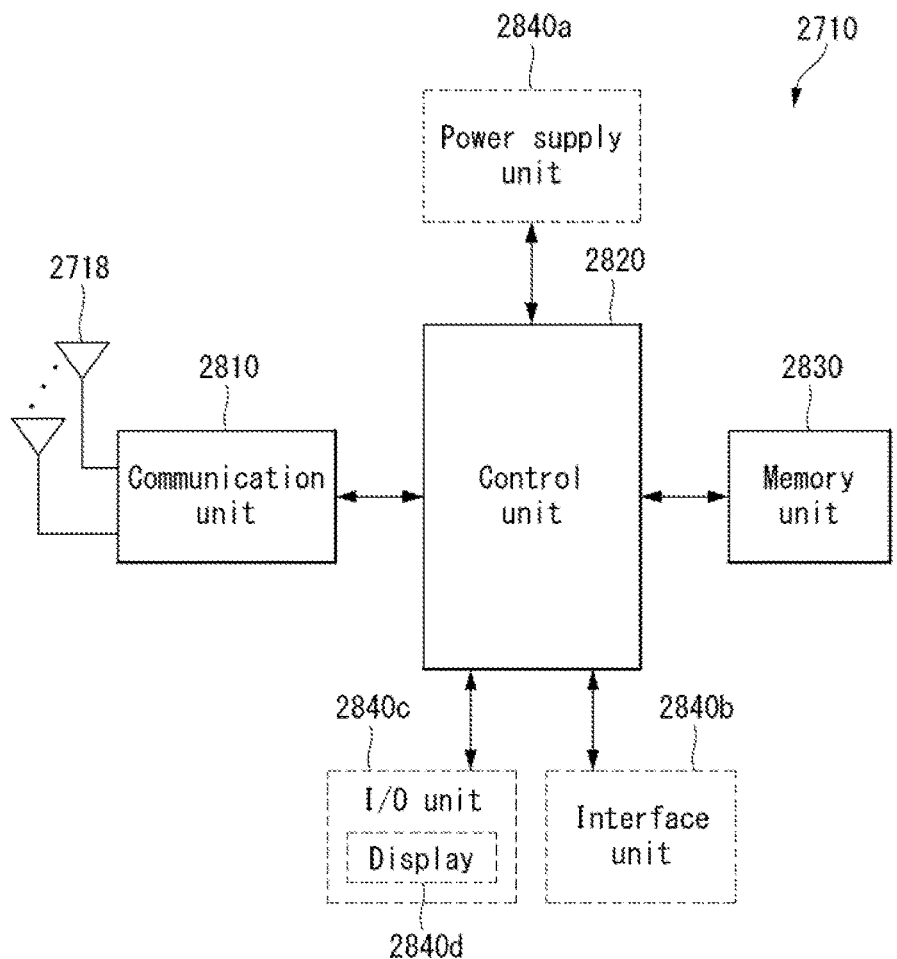

METHOD FOR TRANSMITTING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2020/004346, filed on Mar. 30, 2020, which claims the benefit of earlier filing date and right of priority to Korean Patent Application No. 10-2019-0037488, filed on Mar. 29, 2019, the contents of which are all incorporated by reference herein in their entirety.

TECHNICAL FIELD

The present disclosure relates to a wireless communication system, and to a method for transmitting channel state information and a device therefor.

BACKGROUND ART

Mobile communication systems have been developed to provide voice services while ensuring the activity of a user. However, the mobile communication systems have been expanded to their regions up to data services as well as voice. Currently, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. For this, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An object of the present disclosure is to provide a method for performing channel state information (CSI) transmission.

In addition, an object of the present disclosure is to provide a method of configuring a channel quality indicator (CQI) to maintain orthogonality between respective layers.

In addition, an object of the present disclosure is to provide a method of configuring a precoding matrix indicator (PMI) to maintain orthogonality between respective layers.

Technical problems to be solved by the present disclosure are not limited by the above-mentioned technical problems, and other technical problems which are not mentioned above can be clearly understood from the following description by those skilled in the art to which the present disclosure pertains.

Technical Solution

The present disclosure proposes a method for transmitting channel state information (CSI) in a wireless communication system.

Specifically, the method performed by a user equipment (UE) includes receiving, from a base station, linear combining-based codebook-related parameters; calculating CSI based on the codebook-related parameters; and reporting the CSI to the base station, wherein a channel quality indicator (CQI) in the CSI is calculated using a precoding matrix indicator (PMI) determined so as to maintain orthogonality between respective layers by using a predefined method.

In addition, in the present disclosure, the predefined method may be i) a House-holder method or ii) a Givens rotation method.

In addition, in the present disclosure, the linear combination-based codebook may be a codebook for type 2 CSI, and the CSI may be the type 2 CSI.

In addition, in the present disclosure, the method may further include reporting, to the base station, a start layer index to which the predefined method is applied or an order of layers to which the predefined method is applied.

In addition, in the present disclosure, the precoding matrix indicator (PMI) in the CSI may maintain orthogonality between respective layers by using the predefined method.

In addition, in the present disclosure, a layer indicator (LI) may not be included in the CSI, and a phase tracking reference signal (PTRS) may be mapped to a first layer.

In addition, in the present disclosure, a user equipment (UE) performing a method for transmitting channel state information (CSI) in a wireless communication system, the UE includes: one or more transceivers; one or more processors; and one or more memories for storing instructions for operations executed by the one or more processors and connected to the one or more processors, wherein the operations includes: receiving, from a base station, linear combining-based codebook-related parameters; calculating the CSI based on the codebook-related parameters; and reporting the CSI to the base station, wherein a channel quality indicator (CQI) in the CSI is calculated using a precoding matrix indicator (PMI) determined so as to maintain orthogonality between respective layers by using a predefined method.

In addition, in the present disclosure, the predefined method may be i) a House-holder method or ii) a Givens rotation method.

In addition, in the present disclosure, the linear combination-based codebook may be a codebook for type 2 CSI, and the CSI may be the type 2 CSI.

In addition, in the present disclosure, the method may further include reporting, to the base station, a start layer index to which the predefined method is applied or an order of layers to which the predefined method is applied.

In addition, in the present disclosure, the precoding matrix indicator (PMI) in the CSI may maintain orthogonality between respective layers by using the predefined method.

In addition, in the present disclosure, a method for receiving channel state information (CSI) in a wireless communication system, the method performed by a base station includes: transmitting, to a user equipment (UE), linear combining-based codebook-related parameters; and receiving the CSI calculated based on the codebook-related parameters from the UE, wherein a channel quality indicator (CQI) in the CSI is calculated using a precoding matrix indicator (PMI) in the CSI determined so as to maintain orthogonality between respective layers by using a predefined method.

In addition, in the present disclosure, a base station performing a method for receiving channel state information (CSI) in a wireless communication system, the base station includes: one or more transceivers; one or more processors; and one or more memories for storing instructions for operations executed by the one or more processors and connected to the one or more processors, wherein the operations includes: transmitting, to a user equipment (UE), linear combining-based codebook-related parameters; and receiving the CSI calculated based on the codebook-related parameters from the UE, wherein a channel quality indicator (CQI) in the CSI is calculated using a precoding matrix indicator (PMI) in the CSI determined so as to maintain orthogonality between respective layers by using a predefined method.

In addition, in the present disclosure, a device comprising one or more memories and one or more processors functionally connected to the one or more memories, wherein the one or more processors is configured to cause the device to: receive, from a base station, linear combining-based codebook-related parameters, calculate the CSI based on the codebook-related parameters, and report the CSI to the base station, wherein a channel quality indicator (CQI) in the CSI is calculated using a precoding matrix indicator (PMI) in the CSI determined so as to maintain orthogonality between respective layers by using a predefined method.

In addition, in the present disclosure, one or more non-transitory computer-readable medium storing one or more instructions, wherein the one or more instructions, which are executable by one or more processors, are configured to: receive, from a base station, linear combining-based codebook-related parameters, calculate the CSI based on the codebook-related parameters, and report the CSI to the base station, wherein a channel quality indicator (CQI) in the CSI is calculated using a precoding matrix indicator (PMI) in the CSI determined so as to maintain orthogonality between respective layers by using a predefined method.

Advantageous Effects

The present disclosure has an effect that performance can be improved by maintaining orthogonality between respective layers in transmitting type 2 channel state information (CSI).

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included as a part of the description to help the understanding of the present disclosure, provide embodiments of the disclosure and together with the description, illustrate the technical features of the present disclosure.

FIG. 1 illustrates an AI device according to an embodiment of the present disclosure.

FIG. 2 is a diagram showing an AI server to which a method proposed in the present disclosure may be applied.

FIG. 3 is a diagram showing an AI system to which a method proposed in the present disclosure may be applied.

FIG. 4 illustrates a structure of a wireless communication system to which the present disclosure may be applied.

FIG. 5 illustrates a frame structure in a wireless communication system to which the present disclosure may be applied.

FIG. 6 is a diagram illustrating a resource grid in a wireless communication system to which the present disclosure may be applied.

FIG. 7 illustrates examples of a resource grid per antenna port and numerology to which a method proposed in the present disclosure may be applied.

FIG. 8 is a diagram illustrating a resource block in a wireless communication system to which the present disclosure may be applied.

FIG. 9 is a diagram illustrating physical channels used in a wireless communication system to which the present disclosure may be applied and a general signal transmission method using them.

FIG. 10 is a flowchart illustrating a process of controlling uplink transmit power to which the present disclosure may be applied.

FIG. 11 is a diagram illustrating an example of a beam used for beam management.

FIG. 12 is a flowchart showing an example of a downlink beam management procedure.

FIG. 13 illustrates an example of a downlink beam management procedure using a Channel State Information-Reference Signal (CSI-RS).

FIG. 14 is a flowchart showing an example of a RX beam determination process of a UE.

FIG. 15 is a flowchart illustrating an example of a TX beam determination process of a base station.

FIG. 16 illustrates an example of resource allocation in time and frequency domains related to the DL BM procedure using the CSI-RS.

FIG. 17 illustrates an example of an uplink beam management procedure using a Sounding Reference Signal (SRS).

FIG. 18 is a flowchart illustrating an example of an uplink beam management procedure using the SRS.

FIG. 19 is a flowchart showing an example of a CSI-related procedure to which a method proposed in the present disclosure may be applied.

FIG. 20 is a flowchart illustrating an example of a downlink transmission/reception operation to which a method proposed in the present disclosure may be applied.

FIG. 21 is a flowchart illustrating an example of an uplink transmission/reception operation to which a method proposed in the present disclosure may be applied.

FIG. 22 is a flowchart illustrating an operation process in a base station performing a CSI procedure to which a method proposed in the present disclosure may be applied.

FIG. 23 is a flowchart illustrating an operation process in a UE performing a CSI procedure to which a method proposed in the present disclosure may be applied.

FIG. 24 is a flowchart illustrating an operation process in a UE performing CSI transmission in a wireless communication system according to an embodiment of the present disclosure.

FIG. 25 is a flowchart illustrating an operation process in a base station receiving CSI in a wireless communication system according to an embodiment of the present disclosure.

FIG. 26 is an example of a wireless communication system to which the methods proposed in the present disclosure may be applied.

FIG. 27 is an example of a wireless device to which the methods proposed in the present disclosure may be applied.

FIG. 28 is another example of a wireless device to which the methods proposed in the present disclosure may be applied.

FIG. 29 is an example of a portable device to which the methods proposed in the present disclosure may be applied.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

In the present specification, 'A and/or B' may be interpreted in the same sense as 'including at least one of A or B'.

Hereinafter, examples of 5G use scenarios to which a method proposed in this specification may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in this specification may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method proposed in this specification may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method proposed in this specification may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR radio access or new radio.

System General

FIG. 4 illustrates a structure of a wireless communication system to which the present disclosure may be applied.

Referring to FIG. 4, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

FIG. 5 illustrates a frame structure in a wireless communication system to which the present disclosure may be applied.

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480\cdot 10^3$, and $N_f=4096$. DL and UL transmission is configured as a radio frame having a section of $T_f=(\Delta f_{max} N_f/100)\cdot T_s=10$ ms. The radio frame is composed of ten subframes each having a section of $T_{sf}=(\Delta f_{max} N_f/1000)\cdot T_s=1$ ms. In this case, there may be a set of UL frames and a set of DL frames.

In addition, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 3 shows the number of OFDM symbols per slot for a normal CP in the numerology $\mu$, and Table 4 shows the number of OFDM symbols per slot for an extended CP in the numerology $\mu$.

TABLE 3

| | | | Slot configuration | | | |
|---|---|---|---|---|---|---|
| | | 0 | | | 1 | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 4

| | | | Slot configuration | | | |
|---|---|---|---|---|---|---|
| | | 0 | | | 1 | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

FIG. 6 illustrates an example of a resource grid supported in a wireless communication system to which a method proposed by the present specification is applicable.

Referring to FIG. 6, a resource grid is composed of $N_{RB}^\mu N_{sc}^{RB}$ subcarriers in a frequency domain, each subframe composed of 14·2$\mu$ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 7, one resource grid may be configured per the numerology $\mu$ and an antenna port p.

FIG. 7 illustrates examples of a resource grid per antenna port and numerology to which a method proposed by the present specification is applicable.

Each element of the resource grid for the numerology $\mu$ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,l̄) is used, where $l=0, \ldots, N_{symb}^\mu-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$. The center of subcarrier 0 of common resource block 0 for the subcarrier spacing configuration $\mu$ coincides with 'point A'. A common resource block number $n_{CRB}^\mu$ in the frequency domain and resource elements (k, l) for the subcarrier spacing configuration $\mu$ may be given by the following Equation 1.

$$n_{CRB}^\mu = \left\lfloor \frac{k}{N_{sc}^{RB}} \right\rfloor \quad \text{[Equation 1]}$$

k may be defined relative to the point A so that k=0 corresponds to a subcarrier centered around the point A.

Physical resource blocks are numbered from 0 to $N_{BWP,i}^{size}-1$ within a bandwidth part (BWP), where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

$N_{BWP,i}^{start}$ may be the common resource block where the BWP starts relative to the common resource block 0.

FIG. 8 is a diagram illustrating a resource block in a wireless communication system to which the present disclosure may be applied.

Bandwidth Part (BWP)

In the NR system, a maximum of 400 MHz can be supported per component carrier (CC). If a UE operating in such a wideband CC operates with RF for all CCs turn on all the time, UE battery consumption may increase. Alternatively, considering use cases operating in one wideband CC (e.g., eMBB, URLLC, mMTC, V2X, etc.), different numerologies (e.g., sub-carrier spacings) can be supported for different frequency bands in the CC. Alternatively, UEs may have different capabilities for a maximum bandwidth. In consideration of this, a base station may instruct a UE to operate only in a part of bandwidth, not in the entire bandwidth of a wideband CC, and the part of the bandwidth is defined as a bandwidth part (BWP) for the convenience of description. A BWP may include resource blocks (RBs) consecutive on the frequency axis and may correspond to one numerology (e.g., a subcarrier spacing, a CP length, a slot/mini-slot duration).

Meanwhile, the base station may configure a plurality of BWPs for even one CC configured for a UE. For example, a BWP occupying a relatively small frequency domain may be set in a PDCCH monitoring slot and a PDSCH indicated by a PDCCH may be scheduled on a BWP wider than the BWP. Alternatively, when UEs converge on a specific BWP, some UEs may be set to other BWPs for load balancing. Alternatively, BWPs on both sides of a bandwidth other than some spectra at the center of the bandwidth may be configured in the same slot in consideration of frequency domain inter-cell interference cancellation between neighboring cells. That is, the base station may configure at least one DL/UL BWP for a UE associated with wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Physical Channel and General Signal Transmission

FIG. 9 is a diagram illustrating physical channels used in a wireless communication system to which the present disclosure may be applied and a general signal transmission method using them.

FIG. 9 illustrates physical channels and general signal transmission used in a 3GPP system. In a wireless communication system, the UE receives information from the base station through Downlink (DL) and the UE transmits information to the base station through Uplink (UL). The information which the base station and the UE transmit and receive includes data and various control information and there are various physical channels according to a type/use of the information which the base station and the UE transmit and receive.

When the UE is powered on or newly enters a cell, the UE performs an initial cell search operation such as synchronizing with the base station (S201). To this end, the UE may receive a Primary Synchronization Channel (P-SCH) and a Secondary Synchronization Channel (S-SCH) from the base station and synchronize with the base station and acquire information such as a cell ID or the like. Thereafter, the UE may receive a Physical Broadcast Channel from the base station and acquire in-cell broadcast information. Meanwhile, the UE receives a Downlink Reference Signal (DL RS) in an initial cell search step to check a downlink channel state.

The UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the base station or for signal transmission, the UE may perform a Random Access Procedure (RACH) to the base station (S203 to S206). To this end, the UE may transmit a specific sequence to a preamble through a Physical Random Access Channel (PRACH) (S203 and S205) and receive a response message for the preamble through the PDCCH and a corresponding PDSCH (S204 and S206). In the case of a contention based RACH, a Contention Resolution Procedure may be additionally performed.

The UE that performs the above procedure may then perform the PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE may receive Downlink Control Information (DCI) through the PDCCH. Here, the DCI may include control information such as resource allocation information for the UE and formats may be different according to a use purpose.

Meanwhile, the control information which the UE transmits to the base station through the uplink or the UE receives from the base station may include a downlink/uplink ACK/NACK signal, a Channel Quality Indicator (CQI), a Precoding Matrix Index (PMI), a Rank Indicator (RI), and the like. In the case of the 3GPP LTE system, the UE may transmit the above-described control information such as CQI/PMI/RI, etc., through the PUSCH and/or PUCCH.

Table 5 shows an example of the DCI format in the NR system.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 5, DCI format 0_0 is used for scheduling the PUSCH in one cell.

Information included in the DCI format 0_0 is CRC scrambled and transmitted by C-RNTI or CS-RNTI or MCS-C-RNTI. And, DCI format 0_1 is used to reserve the PUSCH in one cell. Information included in the DCI format 0_1 is CRC scrambled and transmitted by C-RNTI or CS-RNTI or SP-CSI-RNTI or MCS-C-RNTI. DCI format 1_0 is used for scheduling the PDSCH in one DL cell.

Information included in the DCI format 1_0 is CRC scrambled and transmitted by C-RNTI or CS-RNTI or MCS-C-RNTI. DCI format 1_1 is used for scheduling the PDSCH in one cell. Information included in the DCI format 1_1 is CRC scrambled and transmitted by C-RNTI or CS-RNTI or MCS-C-RNTI. DCI format 2_1 is used for informing PRB(s) and OFDM symbol(s) that the UE may assume that transmission is not intended.

The following information included in the DCI format 2_1 is CRC scrambled and transmitted by INT-RNTI.
preemption indication 1, preemption indication 2, . . . , preemption indication N.

Power Control (PC)

In a wireless communication system, it may be necessary to increase or decrease the transmit power of a terminal (e.g. user equipment, UE) and/or a mobile device according to circumstances. In this way, controlling the transmit power of the terminal and/or the mobile device may be referred to as uplink power control. As an example, the transmit power control scheme may be applied to satisfy a requirement (e.g. Signal-to-Noise Ratio (SNR), Bit Error Ratio (BER), Block Error Ratio (BLER), etc.) in a base station (e.g. gNB, eNB, etc.).

The power control as described above may be performed by an open-loop power control scheme and a closed-loop power control scheme.

Specifically, the open-loop power control scheme refers to a scheme of controlling transmit power without feedback from the transmitting device (e.g. base station, etc.) to the receiving device (e.g. terminal, etc.) and/or feedback from the receiving device to the transmitting device. For example, the terminal may receive a specific channel/signal (pilot channel/signal) from the base station and estimate the strength of the received power using this. Thereafter, the terminal may control the transmit power by using the estimated strength of the received power.

In contrast, the closed-loop power control scheme refers to a scheme of controlling transmit power based on feedback from the transmitting device to the receiving device and/or feedback from the receiving device to the transmitting device. For example, the base station receives a specific channel/signal from the terminal, and determines an optimum power level of the terminal based on the power level, SNR, BER, BLER, etc. measured by the received specific channel/signal. The base station may transmit information (i.e. feedback) on the determined optimum power level to the terminal through a control channel, etc., and the corresponding terminal may control the transmit power using the feedback provided by the base station.

Hereinafter, a power control scheme for cases in which a terminal and/or a mobile device perform uplink transmission to a base station in a wireless communication system will be described in detail.

Specifically, hereinafter power control schemes for transmission of 1) uplink data channel (e.g. Physical Uplink Shared Channel (PUSCH), 2) an uplink control channel (e.g. Physical Uplink Control Channel (PUCCH), 3) Sounding Reference Signal (SRS), 4) random access channel (e.g. Physical Random Access Channel (PRACH) are described. At this time, the transmission occasion (i.e. a transmission time unit) (i) for PUSCH, PUCCH, SRS and/or PRACH may be defined by a slot index (n_s) in a frame of a system frame number (SFN), a first symbol (S) in a slot, the number (L) of consecutive symbols, and the like.

1) Power Control of Uplink Data Channel

Hereinafter, for convenience of description, a power control scheme will be described based on a case in which the UE performs PUSCH transmission. It goes without saying that the corresponding scheme may be extended and applied to other uplink data channels supported in the wireless communication system.

In the case of the PUSCH transmission in the active uplink bandwidth part (UL BWP) of the carrier (f) of the serving cell (c), the UE may calculate a linear power value of the transmit power determined by Equation P1 below. Thereafter, the corresponding UE may control the transmit power by considering the calculated linear power value and the number of antenna ports and/or the number of SRS ports.

Specifically, when the UE performs the PUSCH transmission in the active UL BWP (b) of the carrier (f) of the serving cell (c) using a parameter set configuration based on index j and a PUSCH power control adjustment state based on index 1, the UE may determine the PUSCH transmit power $P_{PUSCH,b,f,c}(i,j,q_d,l)$ (dBm) at the PUSCH transmission occasion (i) based on Equation P1 below.

$$P_{PUSCH,b,f,c}(i, j, q_d, l) = \min\begin{Bmatrix} P_{CMAX,f,c}(i), \\ P_{O\_PUSCH,b,f,c}(j) + \\ 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{Bmatrix}[dBm]$$ [Equation 3]

In Equation 3, index j may indicate an index for an open-loop power control parameter (e.g. Po, alpha, α, etc.), and a maximum of 32 parameter sets may be configured per cell. The index q_d may indicate an index of a DL RS resource for path loss (PathLoss, PL) measurement (e.g. $PL_{b,f,c}(q_d)$), and a maximum of 4 measurements may be configured per cell. Index 1 may indicate an index for a closed-loop power control process, and a maximum of 2 processes may be configured per cell.

Specifically, Po (e.g. $P_{O\_PUSCH,b,f,c}(j)$) may indicate a target reception power at the receiving side as a parameter broadcast as part of system information. The corresponding Po value may be configured in consideration of the throughput of the UE, the capacity of the cell, noise and/or interference, and the like. In addition, alpha (e.g. $\alpha_{b,f,c}(j)$) may indicate a rate at which compensation for path loss is performed. Alpha may be configured to a value from 0 to 1, and full pathloss compensation or fractional pathloss compensation may be performed according to the configured value. In this case, the alpha value may be configured in consideration of interference between terminals and/or data rate, etc. Also, $P_{CMAX,f,c}(i)$ may indicate a configured UE transmit power. For example, the configured UE transmit power may be interpreted as 'configured maximum UE output power' defined in 3GPP TS 38.101-1 and/or TS38.101-2. In addition, $M_{RB,b,f,c}^{PUCCH}(i)$ may indicate a bandwidth of PUSCH resource allocation expressed by the number of resource blocks (RBs) for PUSCH transmission occasion based on subcarrier spacing (μ). In addition, $f_{b,f,c}(i, l)$ related to the PUCCH power control adjustment state may be configured or indicated based on the TPC command field of DCI (e.g. DCI format 0_0, DCI format 0_1, DCI format 2_2, DCI format2_3, etc.).

In this case, a specific Radio Resource Control (RRC) parameter (e.g. SRI-PUSCHPowerControl-Mapping, etc.) may indicate a linkage between the SRS Resource Indicator (SRI) field of downlink control information (DCI) and the above-mentioned indices j, q_d, and l. In other words, the above-mentioned indexes j, l, q_d, etc. may be associated with a beam, a panel, and/or a spatial domain transmission filter based on specific information. Through this, PUSCH transmit power control in units of beams, panels, and/or spatial domain transmission filters may be performed.

The above-described parameters and/or information for PUSCH power control may be individually (i.e. independently) configured for each BWP. In this case, the corresponding parameters and/or information may be configured or indicated through higher layer signaling (e.g. RRC signaling, Medium Access Control-Control Element (MAC-CE), etc.) and/or DCI, etc. As an example, parameters and/or information for PUSCH power control may be transmitted through RRC signaling PUSCH-ConfigCommon, PUSCH-PowerControl, etc., and PUSCH-ConfigCommon and PUSCH-PowerControl may be configured as shown in Table 6 below.

$$P_{PUSCH,b,f,c}(i, q_u, q_d, l) = \min \begin{Bmatrix} P_{CMAX,f,c}(i), \\ P_{O\_PUSCH,b,f,c}(q_u) + \\ 10\log_{10}(2^\mu \cdot M_{RB,b,f,c}^{PUSCH}(i)) + PL_{b,f,c}(q_d) + \\ \Delta_{F\_PUCCH}(F) + \Delta_{TF,b,f,c}(i) + f_{b,f,c}(i, l) \end{Bmatrix} [dBm] \quad \text{[Equation 4]}$$

In Equation 4, q_u may indicate an index for an open-loop power control parameter (e.g. Po, etc.), and a maximum of 8 parameter values may be configured per cell. The index q_d may indicate an index of a DL RS resource for path loss (PL) measurement (e.g. $PL_{b,f,c}(q_d)$), and a maximum of 4 measurements may be configured per cell. Index l may indicate an index for a closed-loop power control process, and a maximum of 2 processes may be configured per cell.

Specifically, Po (e.g. $P_{O\_PUCCH,b,f,c}(q_u)$) may indicate a target reception power at the receiving side as a parameter broadcast as part of system information. The corresponding Po value may be configured in consideration of the throughput of the UE, the capacity of the cell, noise and/or inter-

TABLE 6

| | |
|---|---|
| PUSCH-ConfigCommon : := | SEQUENCE { |
| groupHoppingEnabledTransformPrecoding | ENUMERATED {enabled} |
| pusch-TimeDomainAllocationList | PUSCH-TimeDomainResourceAllocationList |
| msg3-DeltaPreamble | INTEGER (-1..6) |
| p0-NominalWithGrant | INTEGER (-202..24) |
| ... | |
| } | |
| PUSCH-PowerControl : := | SEQUENCE { |
| tpc-Accumulation | ENUMERATED { disabled } |
| msg3-Alpha | Alpha |
| p0-NominalWithoutGrant | INTEGER (-202..24) |
| p0-AlphaSets | SEQUENCE (SIZE (1..maxNrofP0-PUSCH-AlphaSets) ) OF P0-PUSCH-AlphaSet |
| pathlossReferenceRSToAddModList | SEQUENCE (SIZE (1..maxNrofPUSCH-PathlossReferenceRSs) ) OF PUSCH-PathlossReferenceRS |
| pathlossReferenceRSToReleaseList | SEQUENCE (SIZE (1..maxNrofPUSCH-PathlossReferenceRSs) ) OF PUSCH-PathlossReferenceRS-Id |
| twoPUSCH-PC-AdjustmentStates | ENUMERATED {twoStates} |
| deltaMCS | ENUMERATED {enabled} |
| sri-PUSCH-MappingToAddModList | SEQUENCE (SIZE (1..maxNrofSRI-PUSCH-Mappings) ) OF SRI-PUSCH-PowerControl |
| sri-PUSCH-MappingToReleaseList | SEQUENCE (SIZE (1..maxNrofSRI-PUSCH-Mappings) ) OF SRI-PUSCH-PowerControlId |
| } | |

Through the scheme described above, the UE may determine or calculate PUSCH transmit power, and may transmit the PUSCH using the determined or calculated PUSCH transmit power.

2) Power Control of Uplink Control Channel

Hereinafter, for convenience of description, a power control scheme will be described based on a case in which the UE performs PUCCH transmission. It goes without saying that the corresponding scheme may be extended and applied to other uplink control channels supported in the wireless communication system.

Specifically, when the UE performs PUCCH transmission in the active UL BWP (b) of the carrier (f) of the primary cell (or a secondary cell) (c), using the PUCCH power control adjustment state based on index l, the UE may determine the PUCCH transmit power $P_{PUCCH,b,f,c}(i, q_u, q_d, l)$ (dBm) at the PUCCH transmission occasion (i) based on Equation P2 below.

ference, and the like. In addition, $P_{CMAX,f,c}(i)$ may indicate the configured UE transmit power. For example, the configured UE transmit power may be interpreted as 'configured maximum UE output power' defined in 3GPP TS 38.101-1 and/or TS38.101-2. In addition, $M_{RB,b,f,c}^{PUSCH}(i)$ may indicate a bandwidth of PUSCH resource allocation expressed by the number of resource blocks (RBs) for PUSCH transmission occasion based on subcarrier spacing (μ). In addition, the delta function (e.g. $\Delta_{F\_PUCCH}(F)$, $\Delta_{TF,b,f,c}(i)$) may be configured in consideration of the PUCCH format (e.g. PUCCH formats 0, 1, 2, 3, 4, etc.). In addition, $g_{b,f,c}(i, l)$ related to the PUCCH power control adjustment state may be configured or indicated based on the TPC command field of DCI (e.g. DCI format 1_0, DCI format 1_1, DCI format 2_2, etc.) received or detected by the UE.

In this case, a specific RRC parameter (e.g. PUCCH-SpatialRelationInfo, etc.) and/or a specific MAC-CE command (e.g. PUCCH spatial relation Activation/Deactivation, etc.) may be used to activate or deactivate a linkage between a PUCCH resource and the above-mentioned indexes q_u, q_d, and l. As an example, the PUCCH spatial relation Activation/Deactivation command in MAC-CE may activate or deactivate the linkage between the PUCCH resource and the above-mentioned indices q_u, q_d, and l based on the RRC parameter PUCCH-SpatialRelationInfo. In other words, the above-mentioned indices q_u, q_d, l, etc. may be associated with a beam, a panel, and/or a spatial domain transmission filter, etc. based on specific information. Through this, PUCCH transmit power control in units of beams, panels, and/or spatial domain transmission filters may be performed.

The above-described parameters and/or information for the PUCCH power control may be individually (i.e. independently) configured for each BWP. In this case, the corresponding parameters and/or information may be configured or indicated through higher layer signaling (e.g. RRC signaling, MAC-CE, etc.) and/or DCI, etc. As an example, parameters and/or information for PUCCH power control may be transmitted through RRC signaling PUCCH-ConfigCommon, PUCCH-PowerControl, etc., and PUCCH-ConfigCommon and PUCCH-PowerControl may be configured as shown in Table 7 below.

the index l, the UE may determine the SRS transmit power $P_{SRS,b,f,c}(i,q_s,l)$ (dBm) at the SRS transmission occasion (i) based on Equation 5 below.

$$P_{SRS,b,f,c}(i, q_s, l) = \min\begin{Bmatrix} P_{CMAX,f,c}(i), \\ P_{O\_SRS,b,f,c}(q_s) + \\ 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} [dBm]$$ [Equation 5]

In Equation 5, q_s may indicate an index for an open-loop power control parameter (e.g. Po, alpha (α), a DL RS resource for pathloss (PL) measurement (e.g. $PL_{b,f,c}(q_d)$), etc.), and may be configured for each SRS resource set. Index l may indicate an index for a closed loop power control process, and the corresponding index may be configured independently of the PUSCH or may be configured in association with PUSCH. When SRS power control is not

TABLE 7

| | |
|---|---|
| PUCCH-ConfigCommon : := | SEQUENCE { |
| pucch-ResourceCommon | INTEGER (0..15) |
| pucch-GroupHopping | ENUMERATED { neither, enable, disable }, |
| hoppingId | INTEGER (0..1023) |
| p0-nominal | INTEGER (−202..24) |
| ... | |
| } | |
| PUCCH-PowerControl : := | SEQUENCE { |
| deltaF-PUCCH-f0 | INTEGER (−16..15) |
| deltaF-PUCCH-f1 | INTEGER (−16..15) |
| deltaF-PUCCH-f2 | INTEGER (−16..15) |
| deltaF-PUCCH-f3 | INTEGER (−16..15) |
| deltaF-PUCCH-f4 | INTEGER (−16..15) |
| p0-Set | SEQUENCE (SIZE (1..maxNrofPUCCH-P0-PerSet) ) OF P0-PUCCH |
| pathlossReferenceRSs | SEQUENCE (SIZE (1..maxNrofPUCCH-PathlossReferenceRSs) ) OF PUCCH-PathlossReferenceRS |
| twoPUCCH-PC-AdjustmentStates | ENUMERATED {twoStates} |
| ... | |
| } | |
| P0-PUCCH : := | SEQUENCE { |
| p0-PUCCH-Id | P0-PUCCH-Id, |
| p0-PUCCH-Value | INTEGER (−16..15) |
| } | |
| P0-PUCCH-Id : := | INTEGER (1..8) |
| PUCCH-PathlossReferenceRS : := | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

Through the scheme described above, the UE may determine or calculate the PUCCH transmit power, and may transmit the PUCCH using the determined or calculated PUCCH transmit power.

3) Power Control of Sounding Reference Signal

With respect to the sounding reference signal (SRS) transmission in the active UL BWP of the carrier f of the serving cell c, the UE may calculate a linear power value of the transmit power determined by Equation 5 below. Thereafter, the corresponding UE may control the transmit power by equally dividing the calculated linear power value for the antenna port(s) configured for SRS.

Specifically, when the UE performs SRS transmission in the active UL BWP (b) of the carrier (f) of the serving cell (c) using the SRS power control adjustment state based on associated with PUSCH, the maximum number of closed-loop power control processes for SRS may be one.

Specifically, Po (e.g. $P_{O\_SRS,b,f,c}(q_s)$) may indicate a target reception power at the receiving side as a parameter broadcast as part of system information. The corresponding Po value may be configured in consideration of the throughput of the UE, the capacity of the cell, noise and/or interference, and the like. In addition, alpha (e.g. $\alpha_{SRS,b,f,c}(q_s)$) may indicate a rate at which compensation for path loss is performed. Alpha may be configured to a value from 0 to 1, and full pathloss compensation or fractional pathloss compensation may be performed according to the configured value. In this case, the alpha value may be configured in consideration of interference between terminals and/or data rate, etc. Also, $P_{CMAX,f,c}(i)$ may indicate a configured UE transmit power. For example, the configured UE transmit power may be interpreted as 'configured maximum UE output power' defined in 3GPP TS 38.101-1 and/or TS38.101-2. In addition, $M_{SRS,b,f,c}(i)$ may indicate a bandwidth of SRS resource allocation expressed by the number of resource blocks (RBs) for SRS transmission occasion based on subcarrier spacing ($\mu$). In addition, $h_{b,f,c}(i,l)$ related to the SRS power control adjustment state may be configured or indicated based on the TPC command field and/or RRC parameter (e.g. srs-PowerControlAdjustmentStates, etc.) of the DCI (e.g. DCI format 2_3, etc.) received or detected by the UE.

The resource for SRS transmission may be applied as a reference for the base station and/or the UE to determine a beam, a panel, and/or a spatial domain transmission filter, etc., and in consideration of this, SRS transmit power control may be performed in units of beams, panels, and/or spatial domain transmission filters.

The above-described parameters and/or information for SRS power control may be individually (i.e. independently) configured for each BWP. In this case, the corresponding parameters and/or information may be configured or indicated through higher layer signaling (e.g. RRC signaling, MAC-CE, etc.) and/or DCI, etc. As an example, parameters and/or information for SRS power control may be transmitted through RRC signaling SRS-Config, SRS-TPC-CommandConfig, etc., and SRS-Config and SRS-TPC-CommandConfig may be configured as shown in Table 8 below.

TABLE 8

| | |
|---|---|
| SRS-Config : := | SEQUENCE { |
| srs-ResourceSetToReleaseList | SEQUENCE (SIZE(1..maxNrofSRS-ResourceSets) ) OF SRS-ResourceSetId |
| srs-ResourceSetToAddModList | SEQUENCE (SIZE(1..maxNrofSRS-ResourceSets) ) OF SRS-ResourceSet |
| srs-ResourceToReleaseList | SEQUENCE (SIZE(1..maxNrofSRS-Resources) ) OF SRS-ResourceId |
| srs-ResourceToAddModList | SEQUENCE (SIZE(1..maxNrofSRS-Resources) ) OF SRS-Resource |
| tpc-Accumulation | ENUMERATED {disabled} |
| . . . | |
| } | |
| SRS-ResourceSet : := | SEQUENCE { |
| srs-ResourceSetId | SRS-ResourceSetId, |
| srs-ResourceIdList | SEQUENCE (SIZE(1..maxNrofSRS-ResourcesPerSet) ) OF SRS-ResourceId |
| resourceType | CHOICE { |
| aperiodic | SEQUENCE { |
| aperiodicSRS-ResourceTrigger | INTEGER (1..maxNrofSRS-TriggerStates–1), |
| csi-RS | NZP-CSI-RS-ResourceId |
| slotOffset | INTEGER (1..32) |
| . . ., | |
| [ [ | |
| aperiodicSRS-ResourceTriggerList-v1530 | SEQUENCE (SIZE(1..maxNrofSRS-TriggerStates-2) ) |
| | OF INTEGER (1..maxNrofSRS-TriggerStates-1) |
| ] ] | |
| }, | |
| semi-persistent | SEQUENCE { |
| associatedCSI-RS | NZP-CSI-RS-ResourceId |
| . . . | |
| }, | |
| periodic | SEQUENCE { |
| associatedCSI-RS | NZP-CSI-RS-ResourceId |
| . . . | |
| } | |
| }, | |
| usage | ENUMERATED {beamManagement, codebook, nonCodebook, antennaSwitching}, |
| alpha | Alpha |
| p0 | INTEGER (–202..24) |
| pathlossReferenceRS | CHOICE { |
| ssb-Index | SSB-Index, |
| csi-RS-Index | NZP-CSI-RS-ResourceId |
| } | |
| srs-PowerControlAdjustmentStates | ENUMERATED { sameAsFci2, separateClosedLoop} |
| . . . | |
| } | |
| SRS-TPC-CommandConfig : := | SEQUENCE { |
| startingBitOfFormat2-3 | INTEGER (1..31) |
| fieldTypeFormat2-3 | INTEGER (0..1) |
| . . ., | |
| [ [ | |
| startingBitOfFormat2-3SUL-v1530 | INTEGER (1..31) |
| ] ] | |
| } | |

Through the scheme described above, the UE may determine or calculate the SRS transmit power, and may transmit the SRS using the determined or calculated SRS transmit power.

4) Power Control of Random Access Channel

When the UE performs PRACH transmission in the active UL BWP (b) of the carrier (f) of the serving cell (c), the UE may determine the PRACH transmit power $P_{PRACH,\,b,f,c}(i)$ (dBm) at the PRACH transmission occasion (i) based on Equation 6 below.

$$P_{PRACH,b,f,c}(i)=\min\{P_{CMAX,f,c}(i), P_{PRACH,target,f,c}+PL_{b,f,c}\} \text{ [dBm]} \qquad \text{[Equation 6]}$$

In Equation 6, $P_{CMAX,f,c}(i)$ may indicate the configured UE transmit power. For example, the configured UE transmit power may be interpreted as 'configured maximum UE output power' defined in 3GPP TS 38.101-1 and/or TS38.101-2. In addition, $P_{PRACH,\,target,f,c}$ indicates PRACH target reception power provided through higher layer signaling (e.g. RRC signaling, MAC-CE, etc.) for the active UL BWP. In addition, $PL_{b,f,c}$ may indicate a path loss for the active UL BWP, and may be determined based on the DL RS associated with the PRACH transmission in the active DL BWP of the serving cell (c). As an example, the UE may determine a path loss related to the PRACH transmission based on a synchronization signal (SS)/physical broadcast channel (PBCH) block, etc. associated with the PRACH transmission.

The above-described parameters and/or information for PRACH power control may be individually (i.e. independently) configured for each BWP. In this case, the corresponding parameters and/or information may be configured or indicated through higher layer signaling (e.g. RRC signaling, MAC-CE, etc.). As an example, parameters and/or information for PRACH power control may be transmitted through RRC signaling RACH-ConfigGeneric, etc., and RACH-ConfigGeneric may be configured as shown in Table P4 below.

figured UE transmit power, the UE may be configured to allocate power for the uplink transmissions according to a priority order. For example, the configured UE transmit power may mean 'configured maximum UE output power' (e.g. $P_{CMAX}(i)$) defined in 3GPP TS 38.101-1 and/or TS38.101-2.

At this time, the priority for transmit power control may be configured or defined in the following order.

PRACH transmission in Primary Cell (PCell)

PUCCH for Hybrid Automatic Repeat and reQuest-Acknowledgement (HARQ-ACK) information and/or Scheduling Request (SR), or PUSCH for HARQ-ACK information PUCCH or PUSCH for Channel State Information (CSI)

PUSCH not for HARQ-ACK information or CSI

SRS transmission (however, aperiodic SRS has a higher priority than semi-persistent SRS and/or periodic SRS) or PRACH transmission in a serving cell other than Pcell Through the power allocation based on the priority order as described above, the UE may control the total transmit power in each symbol of the transmission occasion (i) to be less than or equal to the linear value of the configured UE transmit power. For example, for this, the UE may be configured to scale and/or drop power for uplink transmission having a low priority. In this case, specific details of scaling and/or dropping may be configured or defined according to UE implementation.

In addition, as a specific example, in the case of transmissions having the same priority in carrier aggregation, the UE may consider transmission in the PCell as a higher priority than transmission in the Scell. And/or in the case of transmissions having the same priority in multiple UL carriers (e.g. two UL carriers), the UE may consider a carrier configured for PUCCH transmission as a high priority. In addition, if PUCCH transmission is not configured on any

TABLE 9

| RACH-ConfigGeneric : := | SEQUENCE { |
|---|---|
| prach-ConfigurationIndex | INTEGER (0..255), |
| msg1-FDM | ENUMERATED {one, two, four, eight}, |
| msg1-FrequencyStart | INTEGER (0..maxNrofPhysicalResourceBlocks−1), |
| zeroCorrelationZoneConfig | INTEGER(0..15), |
| preambleReceivedTargetPower | INTEGER (−202..−60), |
| preambleTransMax | ENUMERATED {n3, n4, n5, n6, n7, n8, n10, n20, n50, n100, n200}, |
| powerRampingStep | ENUMERATED {dB0, dB2, dB4, dB6}, |
| ra-ResponseWindow | ENUMERATED {sl1, sl2, sl4, sl8, sl10, sl20, sl40, sl80}, |
| . . . | |
| } | |

Through the scheme described above, the UE may determine or calculate the PRACH transmit power, and may transmit the PRACH using the determined or calculated PRACH transmit power.

5) Priority for Transmit Power Control

A method of controlling a transmit power of a UE in consideration of a single cell operation in a carrier aggregation situation or a single cell operation in an operation in a situation of a plurality of UL carriers (e.g. two UL carriers) will be described below.

At this time, when a total UE transmit power for uplink transmissions (e.g. PUSCH, PUCCH, SRS, and/or PRACH transmissions in 1) to 4) above) at each transmission occasion (i) exceeds a linear value (e.g. $\hat{P}_{CMAX}(i)$) of the concarrier, the UE may consider transmission in a non-supplementary UL carrier as a high priority.

6) Transmit Power Control Procedure

FIG. 10 is a flowchart illustrating a process of controlling uplink transmit power to which the present disclosure may be applied.

First, a user equipment may receive a parameter and/or information related to a transmit power (Tx power) from a base station (P05). In this case, the UE may receive the corresponding parameter and/or information through higher layer signaling (e.g. RRC signaling, MAC-CE, etc.). As an example, in relation to PUSCH transmission, PUCCH transmission, SRS transmission, and/or PRACH transmission, the UE may receive parameters and/or information (e.g.

Table 6, Table 7, Table 8, Table 9, etc.) related to the transmit power control described in 1) to 4) described above.

Thereafter, the UE may receive a TPC command related to transmit power from the base station (P10). In this case, the UE may receive the corresponding TPC command through lower layer signaling (e.g. DCI). For example, in relation to PUSCH transmission, PUCCH transmission, and/or SRS transmission, as described in 1) to 3) above, the UE may receive information on a TPC command to be used for determining a power control adjustment state, etc. through a TPC command field of a predefined DCI format. However, in the case of PRACH transmission, the corresponding step may be omitted.

Thereafter, the UE may determine (or calculate) the transmit power for uplink transmission based on the parameter, information, and/or the TPC command received from the base station (P15). As an example, the UE may determine PUSCH transmission power, PUCCH transmission power, SRS transmission power, and/or PRACH transmission power based on the scheme (e.g. Equation 3, Equation 4, Equation 5, Equation 6, etc.) described in 1) to 4) above. And/or, such as in a situation such as carrier aggregation, when two or more uplink channels and/or signals need to be transmitted by overlapping, the UE may determine the transmit power for uplink transmission in consideration of the priority order, etc. in 5) described above.

Thereafter, the UE may transmit one or more uplink channels and/or signals (e.g. PUSCH, PUCCH, SRS, PRACH, etc.) to the base station based on the determined (or calculated) transmit power (P20).

Bandwidth Part (BWP)

The NR systems may be supported up to 400 MHz per one component carrier (CC). If the UE operating in such a wideband CC always operates with RF for the entire CC turned on, the UE battery consumption may increase. Alternatively, when considering several use cases (e.g. eMBB, URLLC, Mmtc, V2X, etc.) operating within one wideband CC, different numerology (e.g. sub-carrier spacing) may be supported for each frequency band within the corresponding CC. Alternatively, the capability for the maximum bandwidth may be different for each UE. In consideration of this, the base station may instruct the UE to operate only in a partial bandwidth rather than the full bandwidth of the wideband CC, and defines the partial bandwidth as a bandwidth part (BWP) for convenience. The BWP may be composed of consecutive resource blocks (RBs) on the frequency axis, and may correspond to one numerology (e.g. sub-carrier spacing, cyclic prefix (CP) length, slot/mini-slot duration, etc.).

On the other hand, the base station may configure a plurality of BWPs even within one CC configured by the UE. For example, in a PDCCH monitoring slot, the BWP occupying a relatively small frequency region may be configured, and the PDSCH indicated by the PDCCH may be scheduled on a larger BWP. And/or, when the UEs flock to a specific BWP, it may be configured to switch some UEs to another BWP for load balancing. And/or, in consideration of frequency domain inter-cell interference cancellation, etc. between neighboring cells, a portion of the entire bandwidth (i.e. spectrum) may be excluded and both BWPs may be configured in the same slot. That is, the base station may configure at least one DL/UL BWP to the UE associated with the wideband CC, and specifically, may activate at least one DL/UL BWP among DL/UL BWP(s) configured at a specific time point (by L1 signaling or MAC CE or RRC signaling, etc.). And/or, the base station may instruct the UE to switch to another configured DL/UL BWP (through L1 signaling or MAC CE or RRC signaling, etc.). And/or, based on a timer, it may also be considered a method of configuring switching to a predetermined DL/UL BWP when a value of the corresponding timer expires.

At this time, the activated DL/UL BWP may be defined or referred to as active DL/UL BWP. However, the UE may not receive a configuration for DL/UL BWP in a situation such as in the process of initial access, or before RRC connection is established (i.e. set up). In this case, the DL/UL BWP assumed by the UE may be defined or referred to as initial active DL/UL BWP.

For example, when a specific field indicating BWP (e.g. BWP indicator field) is included in DCI (e.g. DCI format 1_1) for scheduling of PDSCH, a value of the corresponding field may be configured to indicate a specific DL BWP (e.g. active DL BWP) among a set of (pre)configured DL BWPs for DL reception for the UE. In this case, the UE receiving the DCI may be configured to receive DL data in the specific DL BWP indicated by the corresponding field. And/or, when a specific field (e.g. BWP indicator field) indicating BWP is included in DCI (e.g. DCI format 0_1) for scheduling of PUSCH, a value of the corresponding field may be configured to indicate a specific UL BWP (e.g. active UL BWP) among a set of (pre)configured UL BWPs for UL transmission for the UE. In this case, the UE receiving the DCI may be configured to transmit UL data in the specific UL BWP indicated by the corresponding field.

Beam Management (BM)

A BM procedure as layer 1 (L1)/layer 2 (L2) procedures for acquiring and maintaining a set of base station (e.g. gNB, TRP, etc.) and/or terminal (e.g. UE) beams which may be used for downlink (DL) and uplink (UL) transmission/reception may include the following procedures and terms.

Beam measurement: Operation of measuring characteristics of a beam forming signal received by the base station or UE.

Beam determination: Operation of selecting a transmit (Tx) beam/receive (Rx) beam of the base station or UE by the base station or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

Downlink Beam Management (DL BM)

FIG. 11 is a diagram illustrating an example of a beam used for beam management.

The DL BM procedure may include (1) transmission of beamformed DL reference signals (RSs) (e.g. CIS-RS or SS Block (SSB)) of the base station and (2) beam reporting of the UE.

Here, the beam reporting may include a preferred DL RS identifier (ID)(s) and L1-Reference Signal Received Power (RSRP).

The DL RS ID may be an SSB Resource Indicator (SSBRI) or a CSI-RS Resource Indicator (CRI).

As illustrated in FIG. 11, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping.

The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

FIG. 12 is a flowchart showing an example of a downlink beam management procedure.

A configuration for beam report using the SSB is performed during a CSI/beam configuration in an RRC connected state (or RRC connected mode).

The UE receives from the base station CSI-ResourceConfig IE including CSI-SSB-ResourceSetList including SSB resources used for the BM (S410).

Table 10 shows an example of CSI-ResourceConfig IE, and as shown in Table 10, a BM configuration using the SSB is not separately defined and the SSB is configured like the CSI-RS resource.

Further, the UE does not expect that the CSI-RS is configured in an RE overlapped with the RE of the SSB.

DL BM Using CSI-RS

Looking at the use of the CSI-RS, i) if repetition parameter is configured and TRS_info is not configured in a specific CSI-RS resource set, the CSI-RS is used for beam management. ii) if repetition parameter is not configured and TRS_info is configured, the CSI-RS is used for a Tracking Reference Signal (TRS). iii) if neither repetition parameter nor TRS_info is configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none', CSI-ResourceConfig (higher layer parameter resourcesForChannelMeasurement) does not include the higher layer parameter "trs-Info" but includes NZP-CSI-RS-ResourceSet configured to the higher layer parameter "repetition", the UE may be configured only with the same number of port

TABLE 10

```
-- ASN1START
-- TAG-CSI-RESOURCECONFIG-START
CSI-ResourceConfig : :=                              SEQUENCE {
    csi-ResourceConfigId                                 CSI-ResourceConfigId,
    csi-RS-ResourceSetList                               CHOICE {
        nzp-CSI-RS-SSB                                       SEQUENCE {
            nzp-CSI-RS-ResourceSetList                           SEQUENCE (SIZE (1..maxNrofNZP-CSI-RS-
ResourceSetsPerConfig) ) OF NZP-CSI-RS-ResourceSetId     OPTIONAL,
            csi-SSB-ResourceSetList                              SEQUENCE (SIZE (1..maxNrofCSI-SSB-
ResourceSetsPerConfig) ) OF CSI-SSB-ResourceSetId        OPTIONAL
        },
        csi-IM-ResourceSetList                               SEQUENCE (SIZE (1..maxNrofCSI-IM-
ResourceSetsPerConfig) ) OF CSI-IM-ResourceSetId
    },
    bwp-Id                                               BWP-Id,
    resourceType                                         ENUMERATED { aperiodic, semiPersistent, periodic },
    ...
}
-- TAG-CSI-RESOURCECONFIGTOADDMOD-STOP
-- ASN1STOP
```

In Table 10, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the base station the SSB resource based on the CSI-SSB-ResourceSetList (S420).

When CSI-RS reportConfig associated with reporting of SSBRI and L1-RSRP is configured, the UE (beam) reports to the base station best SSBRI and L1-RSRP corresponding thereto (S430).

In other words, when reportQuantity of the CSI-RS reportConfig IE is configured as 'ssb-Index-RSRP', the UE reports to the base station best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied.

(1-port or 2-port) having higher layer parameter 'nrofPorts' for all CSI-RS resources in the NZP-CSI-RS-ResourceSet.

When (higher layer parameter) repetition is configured to 'ON', it is related to the Rx beam sweeping procedure of the UE. In this case, when the UE receives a configuration of the NZP-CSI-RS-ResourceSet, the UE may assume that at least one CSI-RS resource in the NZP-CSI-RS-ResourceSet is transmitted to the same downlink spatial domain transmission filter. In other words, at least one CSI-RS resource in the NZP-CSI-RS-ResourceSet is transmitted through the same Tx beam. Here, at least one CSI-RS resource in the NZP-CSI-RS-ResourceSet may be transmitted to different OFDM symbols. or transmitted in different frequency domain (i.e. through FDM). In addition, the UE does not expect that different periodicities are received at periodicityAndOffset in all CSI-RS resources in the NZP-CSI-RS-Resourceset.

On the other hand, when repetition is configured to 'OFF', it is related to the Tx beam sweeping procedure of the base station. In this case, when repetition is configured to 'OFF', the UE does not assume that at least one CSI-RS resource in the NZP-CSI-RS-ResourceSet is transmitted to the same downlink spatial domain transmission filter. That is, at least one CSI-RS resource in the NZP-CSI-RS-ResourceSet is transmitted through different Tx beams.

FIG. 13 illustrates an example of a downlink beam management procedure using a Channel State Information-Reference Signal (CSI-RS).

FIG. 13(a) illustrates an Rx beam determination (or refinement) procedure of the UE and FIG. 13(b) illustrates a Tx beam sweeping procedure of the base station. In addition, FIG. 13(a) illustrates a case where the repetition parameter is configured to 'ON' and FIG. 13(b) illustrates a case where the repetition parameter is configured to 'OFF'.

Referring to FIG. 13(a) and FIG. 14, an Rx beam determination process of the UE will be described.

FIG. 14 is a flowchart showing an example of a RX beam determination process of the UE.

- The UE receives, from the base station, NZP CSI-RS resource set IE including higher layer parameter repetition through RRC signaling (S610). Here, the repetition parameter is configured to 'ON'.
- The UE repeatedly receives a resource(s) in CSI-RS resource set configured as repetition 'ON' in different OFDM symbols through the same Tx beam (or DL spatial domain transmission filter) of the base station (S620).
- The UE determines the Rx beam thereof (S630).
- The UE may omit a CSI report (S640). In this case, reportQuantity of CSI report config may be configured as 'No report (or None)'.

That is, when the UE is configured to repetition 'ON', the CSI report may be omitted.

Referring to FIG. 13(b) and FIG. 15, a Tx beam determination process of the base station will be described.

FIG. 15 is a flowchart illustrating an example of a TX beam determination process of the base station.

- The UE receives, from the base station, the NZP CSI-RS resource set IE including higher layer parameter repetition through RRC signaling (S710). Here, the repetition parameter is configured to 'OFF' and is related to the Tx beam sweeping procedure of the base station.
- The UE receives a resource(s) in the CSI-RS resource set configured as repetition 'OFF' through different Tx beams (DL spatial domain transmission filters) of the base station (S720).
- The UE selects (or determines) a best beam (S730).
- The UE reports to the base station an ID for the selected beam and related quality information (e.g., L1-RSRP) (S740). In this case, reportQuantity of CSI report config may be configured as 'CRI+L1-RSRP'.

In other words, when the CSI-RS is transmitted for the BM, the UE reports to the base station the CRI and L1-RSRP therefor.

FIG. 16 illustrates an example of resource allocation in time and frequency domains related to the DL BM procedure using the CSI-RS.

Specifically, when repetition 'ON' is configured in the CSI-RS resource set, a plurality of CSI-RS resources are repeatedly used by applying the same Tx beam, and when repetition 'OFF' is configured in the CSI-RS resource set, it can be seen that different CSI-RS resources are transmitted via different Tx beams.

DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. At least each ID of DL RS for spatial QCL purpose (QCL Type D) in the RS set may refer to one of DL RS types such as SSB, P-CSI RS, SP-CSI RS, and A-CSI RS, and the like.

At least, initialization/update of the ID of the DL RS(s) in the RS set used for the purpose of the spatial QCL may be performed through at least explicit signaling.

Table 5 shows an example of TCI-State IE.

The TCI-State IE is associated with a quasi co-location (QCL) type corresponding to one or two DL reference signals (RSs).

TABLE 11

| | |
|---|---|
| -- ASN1START | |
| -- TAG-TCI-STATE-START | |
| TCI-State : := | SEQUENCE { |
| tci-StateId | TCI-StateId, |
| qcl-Type1 | QCL-Info, |
| qcl-Type2 | QCL-Info |
| | OPTIONAL, -- Need R |
| ... | |
| } | |
| QCL-Info : := | SEQUENCE { |
| cell | ServCellIndex |
| | OPTIONAL, -- Need R |
| bwp-Id | BWP-Id |
| | OPTIONAL, -- Cond CSI-RS-Indicated |
| referenceSignal | CHOICE { |
| csi-rs | NZP-CSI-RS-ResourceId, |
| ssb | SSB-Index |
| }, | |
| qcl-Type | ENUMERATED {typeA, typeB, typeC, typeD}, |
| ... | |
| } | |
| -- TAG-TCI-STATE-STOP | |
| -- ASN1STOP | |

In Table 11, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. In the case of two DL RSs, the QCL type is not the same regardless of whether the reference is the same DL RS or different DL RSs.

A quasi co-location type corresponding to each DL RS may be given by higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

UL BM

In the UL BM, beam reciprocity (or beam correspondence) between the Tx beam and the Rx beam may be established or not established according to UE implementation. If the reciprocity between the Tx beam and the Rx beam is established in both the base station and the UE, a UL beam pair may be matched through a DL beam pair. However, when the reciprocity between the Tx beam and the Rx beam is not established even in any one of (in either of) the base station and the UE, a UL beam pair determination process is required separately from (apart form) DL beam pair determination.

In addition, even when both the base station and the UE maintain beam correspondence, the base station may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K≥1 SRS resources (higher later parameter SRS-resources). Here, K is a natural number and a maximum value of K is indicated by SRS capability.

Similarly to the DL BM, a UL BM procedure may also be divided into Tx beam sweeping of the UE and Rx beam sweeping of the base station.

FIG. 17 illustrates an example of an uplink beam management procedure using a Sounding Reference Signal (SRS). FIG. 17(a) illustrates an Rx beam determination procedure of the base station, and FIG. 17(b) illustrates a Tx beam sweeping procedure of the UE.

FIG. 18 is a flowchart illustrating an example of an uplink beam management procedure using the SRS.

The UE receives, from the base station, RRC signaling (e.g., SRS-Config IE) including a (higher layer parameter) usage parameter configured as 'beam management' (S1010).

Table 12 shows an example of SRS-Config IE (Information Element) and SRS-Config IE is used for an SRS transmission configuration. The SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 12

```
-- ASN1START
-- TAG-MAC-CELL-GROUP-CONFIG-START
SRS-Config : :=                              SEQUENCE {
    srs-ResourceSetToReleaseList                 SEQUENCE (SIZE(1..maxNrofSRS-ResourceSets) ) OF
SRS-ResourceSetId                            OPTIONAL, -- Need N
    srs-ResourceSetToAddModList                  SEQUENCE (SIZE(1..maxNrofSRS-ResourceSets) ) OF
SRS-ResourceSet                              OPTIONAL, -- Need N
    srs-ResourceToReleaseList                    SEQUENCE (SIZE(1..maxNrofSRS-Resources) ) OF SRS-
ResourceId                                   OPTIONAL, -- Need N
    srs-ResourceToAddModList                     SEQUENCE (SIZE(1..maxNrofSRS-Resources) ) OF SRS-
Resource                                     OPTIONAL, -- Need N
    tpc-Accumulation                             ENUMERATED {disabled}
                                                 OPTIONAL, -- Need S
```

TABLE 12-continued

```
...
}
SRS-ResourceSet : :=                     SEQUENCE {
    srs-ResourceSetId                        SRS-ResourceSetId,
    srs-ResourceIdList                       SEQUENCE (SIZE(1..maxNrofSRS-ResourcesPerSet) )
OF SRS-ResourceId                        OPTIONAL, -- Cond Setup
    resourceType                             CHOICE {
        aperiodic                                SEQUENCE {
            aperiodicSRS-ResourceTrigger             INTEGER (1..maxNrofSRS-
TriggerStates-1),
            csi-RS                                   NZP-CSI-RS-ResourceId
                                                 OPTIONAL, -- Cond NonCodebook
            slotOffset                               INTEGER (1..32)
                                                 OPTIONAL, -- Need S
            ...
        },
        semi-persistent                          SEQUENCE {
            associatedCSI-RS                         NZP-CSI-RS-ResourceId
                                                 OPTIONAL, -- Cond NonCodebook
            ...
        },
        periodic                                 SEQUENCE {
            associatedCSI-RS                         NZP-CSI-RS-ResourceId
                                                 OPTIONAL, -- Cond NonCodebook
            ...
        }
    },
    usage                                    ENUMERATED {beamManagement, codebook,
nonCodebook, antennaSwitching},
    alpha                                    Alpha
                                         OPTIONAL, -- Need S
    p0                                       INTEGER (-202..24)
                                         OPTIONAL, -- Cond Setup
    pathlossReferenceRS                      CHOICE {
        ssb-Index                                SSB-Index,
        csi-RS-Index                             NZP-CSI-RS-ResourceId
SRS-SpatialRelationInfo : :=             SEQUENCE {
    servingCellId                            ServCellIndex
    OPTIONAL, -- Need S
    referenceSignal                          CHOICE {
        ssb-Index                                SSB-Index,
        csi-RS-Index                             NZP-CSI-RS-ResourceId,
        srs                                      SEQUENCE {
            resourceId                               SRS-ResourceId,
            uplinkBWP                                BWP-Id
        }
    }
}
SRS-ResourceId : :=                      INTEGER (0..maxNrofSRS-Resources-1)
```

In Table 12, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1020). Here, SRS-SpatialRelation Info is configured for each SRS resource and represents whether to apply the same beam as the beam used in the SSB, the CSI-RS, or the SRS is to be applied for each SRS resource. In addition, SRS-SpatialRelationInfo may be configured or not configured in each SRS resource.

If SRS-SpatialRelationInfo is configured in the SRS resource, the UE transmits by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1030).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly to the above.

Additionally, the UE may receive or not receive a feedback for the SRS from the base station as in the following three cases (S1040).

i) When Spatial_Relation_Info is configured for all SRS resources in the SRS resource set, the UE transmits the SRS with the beam indicated by the base station. For example, when all Spatial_Relation_Info indicates the same SSB, CRI, or SRI, the UE repeatedly transmits the SRS with the same beam. This case as a usage of selecting the Rx beam by the base station corresponds to FIG. 16(a).

ii) Spatial_Relation_Info may not be configured for all SRS resources in the SRS resource set. In this case, the UE may transmit the SRS while arbitrarily changing the SRS beam. That is, this case as a usage of selecting the Tx beam by the UE corresponds to FIG. 17(b).

iii) Spatial_Relation_Info may be configured for some SRS resources in the SRS resource set. In this case, the SRS may be transmitted with the indicated for the configured SRS resource and the UE may arbitrarily apply the Tx beam and transmit it for SRS resource in which Spatial_Relation_Info is not configured.

Channel State Information (CSI) Related Procedure

FIG. 19 is a flowchart showing an example of a CSI-related procedure to which a method proposed in the present disclosure may be applied.

In a New Radio (NR) system, a channel state information-reference signal (CSI-RS) is used for time and/or frequency tracking, CSI computation, layer 1 (L1)-reference signal received power (RSRP) computation, and mobility.

The CSI computation is related to CSI acquisition and the L1-RSRP computation is related to beam management (BM).

Channel state information (CSI) collectively refers to information that may indicate the quality of a radio channel (or referred to as a link) formed between the UE and the antenna port.

In order to perform one of usages of the CSI-RS, a terminal (e.g. user equipment (UE)) receives, from a base station (e.g. general Node B, gNB), configuration information related to the CSI through radio resource control (RRC) signaling (S110).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like.

The CSI-IM resource set is identified by a CSI-IM resource set identifier (ID) and one resource set includes at least one CSI-IM resource.

Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set.

That is, the CSI resource configuration related information may include a CSI-RS resource set list and the CSI-RS resource set list may include at least one of a NZP CSI-RS resource set list, a CSI-IM resource set list, or a CSI-SSB resource set list.

The CSI resource configuration related information may be expressed as CSI-ResourceConfig IE.

The CSI-RS resource set is identified by a CSI-RS resource set ID and one resource set includes at least one CSI-RS resource.

Each CSI-RS resource is identified by a CSI-RS resource ID.

As shown in Table 13, parameters (e.g. a BM related 'repetition' parameter and a tracking related 'trs-Info' parameter) representing the usage of the CSI-RS may be configured for each NZP CSI-RS resource set.

Table 13 shows an example of the NZP CSI-RS resource set IE.

TABLE 13

```
-- ASN1START
-- TAG-NZP-CSI-RS-RESOURCESET-START
NZP-CSI-RS-ResourceSet ::=              SEQUENCE {
    nzp-CSI-ResourceSetId               NZP-CSI-RS-ResourceSetId,
    nzp-CSI-RS-Resources                SEQUENCE (SIZE (1..maxNrofNZP-CSI-RS-ResourcesPerSet)) OF NZP-CSI-RS-ResourceId,
    repetition                          ENUMERATED { on, off }
        OPTIONAL,
    aperiodicTriggeringOffset           INTEGER(0..4)
        OPTIONAL, --Need S
    trs-Info                            ENUMERATED {true}
        OPTIONAL, --Need R
    . . .
}
-- TAG-NZP-CSI-RS-RESOURCESET-STOP
-- ASN1STOP
```

In Table 13, the repetition parameter is a parameter indicating whether the same beam is repeatedly transmitted, and indicates whether repetition is 'ON' or 'OFF' for each NZP CSI-RS resource set.

The transmission beam (Tx beam) used in the present disclosure may be interpreted as the same meaning as a spatial domain transmission filter, and the reception beam (Rx beam) may be interpreted as the same meaning as a spatial domain reception filter.

For example, when the repetition parameter in Table 6 is configured as 'OFF', the UE does not assume that the NZP CSI-RS resource(s) in the resource set are transmitted to the same DL spatial domain transmission filter and the same Nrofports in all symbols.

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting.

The time domain behavior may be periodic, aperiodic, or semi-persistent.

The CSI report configuration related information may be expressed as CSI-ReportConfig IE and Table 14 below shows an example of CSI-ReportConfig IE.

TABLE 14

```
-- ASN1START
-- TAG-CSI-RESOURCECONFIG-START
CSI-ReportConfig ::=                        SEQUENCE {
    reportConfigId                              CSI-ReportConfigId,
    carrier                                     ServCellIndex OPTIONAL, --Need S
    resourcesForChannelMeasurement              CSI-ResourceConfigId,
    csi-IM-ResourcesForInterference             CSI-ResourceConfigId OPTIONAL, --Need R
    nzp-CSI-RS-ResourcesForInterference         CSI-ResourceConfigId OPTIONAL, --Need R
    reportConfigType                            CHOICE {
        periodic                                    SEQUENCE {
            reportSlotConfig                            CSI-ReportPeriodicityAndOffset,
            pucch-CSI-ResourceList                      SEQUENCE (SIZE (1..maxNrofBWPs)) OF PUCCH-CSI-
Resource
        },
        semiPersistentOnPUCCH                       SEQUENCE {
            reportSlotConfig                            CSI-ReportPeriodicityAndOffset,
            pucch-CSI-ResourceList                      SEQUENCE (SIZE (1..maxNrofBWPs)) OF PUCCH-CSI-
Resource
        },
        semiPersistentOnPUSCH                       SEQUENCE {
            reportSlotConfig                            ENUMERATED {s15, s110, s120, s140, s180, s1160, s1320},
            reportSlotOffsetList                        SEQUENCE (SIZE (1.. maxNrofUL-Allocations)) OF INTEGER(0..32),
            p0alpha                                     P0-PUSCH-AlphaSetId
        },
        aperiodic                                   SEQUENCE {
            reportSlotOffsetList                        SEQUENCE (SIZE (1..maxNrofUL-Allocations)) OF INTEGER(0..32)
        }
    },
    reportQuantity                              CHOICE {
        none                                        NULL,
        cri-RI-PMI-CQI                              NULL,
        cri-RI-i1                                   NULL,
        cri-RI-i1-CQI                               SEQUENCE {
            pdsch-BundleSizeForCSI                      ENUMERATED {n2, n4} OPTIONAL
        },
        cri-RI-CQI                                  NULL,
        cri-RSRP                                    NULL,
        ssb-Index-RSRP                              NULL,
        cri-RI-LI-PMI-CQI                           NULL
    },
```

The UE measures CSI based on configuration information related to the CSI (S120).

The CSI measurement may include (1) a CSI-RS reception process of the UE (S121) and (2) a process of computing the CSI through the received CSI-RS (S122).

The sequence for the CSI-RS is generated by Equation 7 below, and the initialization value of the pseudo-random sequence C(i) is defined by Equation 8.

$$r(m) = \frac{1}{\sqrt{2}}(1 - 2 \cdot c(2m)) + j\frac{1}{\sqrt{2}}(1 - 2 \cdot c(2m + 1)) \quad \text{[Equation 7]}$$

$$c_{init} = (2^{10}(N_{symb}^{slot} n_{s,f}^{\mu} + l + 1)(2n_{ID} + 1) + n_{ID}) \bmod 2^{31} \quad \text{[Equation 8]}$$

In Equations 7 and 8, $n_{s,f}^{\mu}$ represents a slot number in a radio frame, and the pseudo-random sequence generator is initialized with Cint at the beginning of each OFDM symbol that is $n_{s,f}^{\mu}$.

Further, l is the OFDM symbol number in the slot, and $n_{ID}$ is the same as the higher-layer parameter scramblingID.

Further, for the CSI-RS, resource element (RE) mapping of the CSI-RS resource is configured in time and frequency domains by higher layer parameter CSI-RS-ResourceMapping.

Table 15 shows an example of CSI-RS-ResourceMapping IE.

TABLE 15

```
-- ASN1START
-- TAG-CSI-RS-RESOURCEMAPPING-START
CSI-RS-ResourceMapping ::=                  SEQUENCE {
    frequencyDomainAllocation                   CHOICE {
        row1                                        BIT STRING (SIZE (4)),
        row2                                        BIT STRING (SIZE (12)),
        row4                                        BIT STRING (SIZE (3)),
        other                                       BIT STRING (SIZE (6))
    },
    nrofPorts                                   ENUMERATED {p1,p2,p4,p8,p12,p16,p24,p32},
    firstOFDMSymbolInTimeDomain                 INTEGER (0..13),
    firstOFDMSymbolInTimeDomain2                INTEGER (2..12)
        OPTIONAL, --Need R
```

TABLE 15-continued

| | |
|---|---|
| cdm-Type | ENUMERATED {noCDM, fd-CDM2, cdm4-FD2-TD2, cdm8-FD2-TD4}, |
| density | CHOICE { |
|   dot5 | ENUMERATED {evenPRBs, oddPRBs}, |
|   one | NULL, |
|   three | NULL, |
|   spare | NULL |
| }, | |
| freqBand | CSI-FrequencyOccupation, |
| ... | |
| } | |

In Table 15, a density (D) represents a density of the CSI-RS resource measured in RE/port/physical resource block (PRB) and nrofPorts represents the number of antenna ports.

Further, the UE reports the measured CSI to the base station (S130).

Here, when the quantity of CSI-ReportConfig in Table 15 is configured to 'none (or No report)', the UE may skip the report.

However, even when the quantity is configured to 'none (or No report)', the UE may report to the base station.

The case where the quantity is configured to 'none' is a case of triggering aperiodic TRS or a case where repetition is configured.

Here, only in a case where the repetition is configured to 'ON', the UE may be defined to skip the report.

In summary, when repetition is configured to 'ON' and 'OFF', the CSI report may be all of 'No report', 'SSB Resource Indicator (SSBRI) and L1-RSRP', and 'CSI-RS Resource Indicator (CRI) and L1-RSRP'.

Alternatively, when repetition is 'OFF', the CSI report of 'SSBRI and L1-RSRP' or 'CRI and L1-RSRP' is defined to be transmitted, and when repetition is 'ON', 'No report', 'SSBRI and L1-RSRP' or 'CRI and L1-RSRP' may be defined to be transmitted.

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The base station transmits the precoded NZP CSI-RS to the UE on each port of the configured NZP CSI-RS based IMR.

The UE assumes a channel/interference layer for each port in the resource set and measures interference.

For the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS for CSI acquisition and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

For aperiodic CSI, in each trigger state configured by using higher layer parameter CSI-AperiodicTriggerState, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is for channel measurement for L1-RSRP computation.

When two resource settings are configured, a first resource setting (given by higher layer parameter resourcesForChannelMeasurement) is for channel measurement and a second resource setting (given by csi-IM-ResourcesForInterference or nzp-CSI-RS-ResourcesForInterference) is for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is for channel measurement for L1-RSRP computation.

When two resource settings are configured, a first resource setting (given by resourcesForChannelMeasurement) is for channel measurement and a second resource setting (given by higher layer parameter csi-IM-ResourcesForInterference) is used for interference measurement performed on CSI-IM.

It is examined CSI computation related to CSI measurement.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

The UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

All interference transport layers of the NZP CSI-RS port for interference measurement consider an energy per resource element (EPRE) ratio.

Different interference signals on RE(s) of the NZP CSI-RS resource for channel measurement, the NZP CSI-RS resource for interference measurement, or CSI-IM resource for interference measurement.

It is examined the CSI Reporting procedure in more detail.

For CSI reporting, time and frequency resources which may be used by the UE are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, periodic, semi-persistent (SP), and aperiodic CSI reporting will be described respectively.

The periodic CSI reporting is performed on short PUCCH and long PUCCH.

The periodicity and slot offset of the periodic CSI reporting may be configured through RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured with the RRC and the CSI reporting is activated/deactivated by separate MAC CE.

In the case of the SP CSI on the PUSCH, the periodicity of the SP CSI reporting is configured through the RRC, but the slot offset is not configured through the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured through the RRC.

For SP CSI reporting on PUSCH, a separate RNTI (SP-CSI C-RNTI) is used.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, a timing for the AP CSI reporting is dynamically controlled by the DCI.

In the NR, it is not applied a scheme (for example, transmitting RI, WB PMI/CQI, and SB PMI/CQI in order)

of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

In the case of Low latency CSI, it is a WB CSI including a maximum of 4 ports Type-I codebook or a maximum of 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

Downlink Transmission/Reception Operation

FIG. 20 is a flowchart illustrating an example of a downlink transmission/reception operation to which a method proposed in the present disclosure may be applied.

Referring to FIG. 20, the base station schedules downlink transmission such as frequency/time resources, transport layer, downlink precoder, MCS, and the like (S1401). In particular, the base station may determine a beam for PDSCH transmission to the UE through the above-described operations.

The UE receives downlink control information (DCI) for downlink scheduling (i.e. including scheduling information of PDSCH) from the base station on the PDCCH (S1402).

DCI format 1_0 or 1_1 may be used for downlink scheduling, in particular, DCI format 1_1 includes the following information: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, Demodulation Reference Signal (DMRS) sequence initialization In particular, according to each state indicated in the antenna port(s) field, the number of DMRS ports may be scheduled, and also single-user (SU)/multi-user (MU) transmission scheduling is possible.

In addition, the TCI field consists of 3 bits, and the QCL for the DMRS is dynamically indicated by indicating a maximum of 8 TCI states according to the TCI field value.

The UE receives downlink data on the PDSCH from the base station (S1403).

When the UE detects a PDCCH including DCI format 1_0 or 1_1, it decodes the PDSCH according to an indication by the corresponding DCI.

Here, when the UE receives the PDSCH scheduled by DCI format 1, the UE may configure the DMRS configuration type by the higher layer parameter 'dmrs-Type', and the DMRS type is used to receive the PDSCH. In addition, the UE may configure the maximum number of DMRA symbols front-loaded for the PDSCH by the higher layer parameter 'maxLength'.

In case of DMRS configuration type 1, when the UE is scheduled with a single codeword and an antenna port mapped with an index of {2, 9, 10, 11 or 30} is specified, or when the UE is scheduled with two codewords, the UE assumes that all remaining orthogonal antenna ports are not associated with PDSCH transmission to another UE.

Alternatively, in the case of DMRS configuration type 2, when the UE is scheduled with a single codeword and an antenna port mapped with an index of {2, 10 or 23} is specified, or when the UE is scheduled with two codewords, the UE assumes that all remaining orthogonal antenna ports are not associated with PDSCH transmission to another UE.

When the UE receives the PDSCH, it may be assumed that the precoding granularity P' is a consecutive resource block in the frequency domain. Here, P' may correspond to one of {2, 4, wideband}.

If P' is determined to be wideband, the UE may not expect to be scheduled with non-contiguous PRBs, and the UE may assume that the same precoding is applied to the allocated resources.

On the other hand, If P' is determined to be any one of {2, 4}, a precoding resource block group (PRG) is divided into P' consecutive PRBs. The number of actual consecutive PRBs in each PRG may be one or more. The UE may assume that the same precoding is applied to consecutive downlink PRBs in the PRG.

In order for the UE to determine a modulation order, a target code rate, and a transport block size in the PDSCH, the UE first reads the 5-bit MCD field in the DCI and determines the modulation order and target code rate. Then, the UE reads the redundancy version field in the DCI and determines the redundancy version. Then, the UE determines the transport block size by using the number of layers before rate matching and the total number of allocated PRBs.

Uplink Transmission/Reception Operation

FIG. 21 is a flowchart illustrating an example of an uplink transmission/reception operation to which a method proposed in the present disclosure may be applied.

Referring to FIG. 21, the base station schedules uplink transmission such as frequency/time resources, transport layer, uplink precoder, MCS, and the like (S1501). In particular, the base station may determine a beam for the UE to transmit PUSCH through the above-described operations.

The UE receives DCI (i.e. including scheduling information of PUSCH) for uplink scheduling from the base station on the PDCCH (S1502).

DCI format 0_0 or 0_1 may be used for uplink scheduling, in particular, DCI format 0_1 includes the following information: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, Uplink Shared Channel (UL-SCH) indicator In particular, SRS resources configured in the SRS resource set associated with the higher layer parameter 'usage' may be indicated by the SRS resource indicator field. In addition, 'spatialRelationInfo' may be configured for each SRS resource, and the value may be one of {CRI, SSB, SRI}.

The UE transmits uplink data to the base station on the PUSCH (S1503).

When the UE detects a PDCCH including DCI format 0_0 or 0_1, it transmits the corresponding PUSCH according to an indication by the corresponding DCI.

For PUSCH transmission, two transmission schemes are supported: codebook-based transmission and non-codebook-based transmission:

i) When a higher layer parameter 'txConfig' is set to 'codebook', the UE is configured with codebook-based transmission. On the other hand, when the higher layer parameter 'txConfig' is set to 'nonCodebook', the UE is configured with non-codebook based transmission. When the higher layer parameter 'txConfig' is not configured, the UE does not expect to be scheduled by DCI format 0_1. When PUSCH is scheduled by DCI format 0_0, PUSCH transmission is based on a single antenna port.

In the case of codebook-based transmission, the PUSCH may be scheduled in DCI format 0_0, DCI format 0_1, or semi-statically. When this PUSCH is scheduled by DCI format 0_1, as given by the SRS resource indicator field and the Precoding information and number of layers field, the UE determines the PUSCH transmission precoder from DCI based on SRI, Transmit Precoding Matrix Indicator (TPMI), and transmission rank. The TPMI is used to indicate the precoder to be applied across the antenna port, and corresponds to the SRS resource selected by the SRI when multiple SRS resources are configured. Alternatively, if a single SRS resource is configured, the TPMI is used to indicate a precoder to be applied across the antenna port, and corresponds to the corresponding single SRS resource. A transmission precoder is selected from the uplink codebook having the same number of antenna ports as the higher layer parameter 'nrofSRS-Ports'. When the higher layer in which the UE is set to 'codebook' is configured to the parameter 'txConfig', the UE is configured with at least one SRS resource. The SRI indicated in slot n is associated with the most recent transmission of the SRS resource identified by the SRI, where the SRS resource precedes the PDCCH (i.e. slot n) carrying the SRI.

ii) In the case of non-codebook-based transmission, the PUSCH may be scheduled in DCI format 0_0, DCI format 0_1, or semi-statically. When multiple SRS resources are configured, the UE may determine the PUSCH precoder and the transmission rank based on the wideband SRI, wher the SRI is given by the SRS resource indicator in the DCI or is given by the higher layer parameter 'srs-ResourceIndicator'. The UE may use one or multiple SRS resources for SRS transmission, where the number of SRS resources may be configured for simultaneous transmission within the same RB based on UE capabilities. Only one SRS port is configured for each SRS resource. Only one SRS resource may be configured as the higher layer parameter 'usage' set to 'nonCodebook'. The maximum number of SRS resources that can be configured for non-codebook-based uplink transmission is 4. The SRI indicated in slot n is associated with the most recent transmission of the SRS resource identified by the SRI, where the SRS transmission precedes the PDCCH (i.e. slot n) carrying the SRI.

In the present disclosure, in relation to beam management operation and PUCCH/PUSCH-based CSI acquisition (calculation)/reporting, a power control method and a signaling method for configuring/indicating/supporting a parameter (layer orthogonal parameterization) for maintaining orthogonality between layers, and a signaling method for performing bandwidth part (BWP) adaptation and an operation of the UE/base station will be described.

In Type II CSI supported in Rel-15 or Type II CSI discussed in Rel-16, a codebook is configured by linearly combining with amplitude and/or phase coefficients for a plurality of Discrete Fourier Transform (DFT) beams for CSI configuration for one layer. When the UE reports CSI constituting a plurality of layers (e.g. RI>1) using this codebook, when the UE calculates CSI, each parameter (e.g. amplitude, phase DFT beam set, etc.) is independently calculated. If the resolution of each parameter is very large, each layer may be configured to be orthogonal.

However, when the UE provides feedback using limited resources, orthogonality between respective layers may not always be established/maintained due to reasons such as quantization error, and accordingly, as the number of layers increases, a problem such as a decrease in throughput performance may occur.

Accordingly, in the present disclosure, methods for maintaining/guaranteing orthogonality between respective layers and improving its performance will be described when constructing a linear combination-based codebook like Type II CSI.

As part of Rel-15 CSI enhancement, the framework of the codebook below was agreed upon.

---

Precoders for a layer is given by size-$P \times N_3$ matrix $W = W_1 \tilde{W}_2 W_f^H$ $P = 2N_1N_2 = $ #SD dimensions $N_3 = $ #FD dimensions FFS value and unit of $N_3$ Precoder normalization: the precoding matrix for given rank and unit of $N_3$ is normalized to norm 1/sqrt(rank)

Spatial domain (SD) compression

L spatial domain basis vectors (mapped to the two polarizations, so 2L in total) selected Compression in spatial domain using $W_1 = \begin{bmatrix} v_0 v_1 \cdots v_{L-1} & 0 \\ 0 & v_0 v_1 \cdots v_{L-1} \end{bmatrix}$, where $\{v_i\}_{i=0}^{L-1}$ are $N_1 N_2 \times 1$ orthogonal DFT vectors (same as Rel. 15 Type II)

Frequency-domain (FD) compression

Compression via $W_f = [W_f(0), \ldots, W_f(2L-1)]$ where $W_f(i) = [f_{k_{i,0}} f_{k_{i,1}} \cdots f_{k_{i,M_{i-1}}}]$, where $\{f_{k_{i,m}}\}_{m=0}^{M_i-1}$ are $M_i$ size-$N_3 \times 1$ orthogonal DFT vectors for SD-component $i = 0, \ldots, 2L-1$ Number of FD-components $\{M_i\}$ or $\Sigma_{i=0}^{2L-1} M_i$ is configurable, FFS value range FFS: choose one of the following alternatives Alt1. common basis vectors: $W_f = [f_{k_0} f_{k_1} \cdots f_{k_{M-1}}]$, i.e. $M_i = M \; \forall i$ and $\{k_{i,m}\}_{m=0}^{M_i-1}$ are identical (i.e., $k_{i,m} = k_m$, $i = 0, \ldots, 2L-1$)

Alt2. independent basis vectors: $W_f = [W_f(0), \ldots, W_f(2L-1)]$, where $W_f(i) = [f_{k_{i,0}} f_{k_{i,1}} \ldots f_{k_{i,M_i-1}}]$, i.e. $M_i$ frequency-domain components (per SD-component) are selected Note: $\{k_m\}_{m=0}^{M-1}$ or $\{k_{i,m}\}_{m=0}^{M_i-1}$, $i = 0, \ldots, 2L-1$ are all selected from the index set $\{0,1,\ldots,N_3-1\}$ from the same orthogonal basis group FFS: If oversampled DFT basis or DCT basis is used instead of orthogonal DFT basis FFS: Same or different FD-basis selection across layers Linear combination coefficients (for a layer)

FFS if $\tilde{W}_2$ is composed of $K = 2LM$ or $K = \Sigma_{i=0}^{2L-1} M_i$ linear combination coefficients FFS if only a subset $K_0 < K$ of coefficients are reported (coefficients not reported are zero).

FFS if layer compression is applied so that $\Sigma_{i=0}^{2L-1} M_i$ transformed coefficients are used to construct $\tilde{W}_2$ for layer 1 (where the transformed coefficients are the reported quantity)

FFS quantization/encoding/reporting structure

Note: The terminology "SD-compression" and "FD-compression" are for discussion purposes only and are not intended to be captured in the specification (Method 1)

Method 1 is a method in which, in a linear combination-based codebook such as Type II CSI, the UE calculates/reports a precoding matrix indicator (PMI) using codebook parameters configured by the base station, and in the pre-calculated PMI, the UE calculates/reports the CQI using the PMI to which a method (layer orthogonalization scheme) for ensuring inter-layer orthogonality (orthogonality between layers) configured or pre-defined by the base station is applied.

The base station may calculate the final PMI by applying the layer orthogonalization scheme configured or predefined in the UE to the PMI reported from the UE. In this case, the scheme of layer orthogonalization may include schemes described below.

For convenience of description, the PMI where RI=R of a specific sub-block (SB) is expressed as in Equation 9.

$$W = \frac{1}{\sqrt{R}} [w_1 \; w_2 \; \ldots \; w_R] \qquad \text{[Equation 9]}$$

In Equation 9, it is assumed that $w\_i$ is normalized to 1, refers to the i-th layer in PMI of RI=R, and the length of the vector is Nt.

(Method 1-1)—House-Holder Transform Method (House-Holder Transform Based Approach)

One example of the layer orthogonalization scheme is the House-holder transform method.

A House-holder transformation matrix for a specific v vector is defined as in Equation 10 below.

$$Q = I - \frac{2vv^H}{v^H v} \qquad \text{[Equation 10]}$$

In Equation 10, the superscript H denotes Hermitian, that is, conjugated transpose. Hereinafter, a scheme of maintaining/guaranteeing orthogonality between respective layers using the House-holder transform will be described.

First, the W matrix in Equation 9 may be decomposed as $$W = [\tilde{Q}_1 \; \tilde{Q}_2] \begin{bmatrix} R \\ 0 \end{bmatrix},$$

where $\tilde{Q}_1$ and $\tilde{Q}_2$ are Nt-by-R, Nt-by-(Nt-R) orthogonal matrix, respectively, and R is an upper triangular matrix on R-by-R. Using this, $Q_1$ may be calculated/applied as in Equation 11 below.

$$Q_1 = I - 2\rho_1 v_1 v_1^H \qquad \text{[Equation 11]}$$

In Equation 11, $v_1 = w_1 - \beta_1 e_1$, $$\rho_1 = \frac{1}{v_1^H v_1}, \quad \beta_1 = \frac{2\rho - 1}{2\rho w_{11}},$$

$w_{11}$ is the first element of $w_1$, and $e_1$ means a vector having a size of Nt in which the first element is 1 and the other elements are 0.

Step 1: Calculate $$Q_1 W = \begin{bmatrix} a_1 & a_1' \\ 0 & W_1' \end{bmatrix}.$$

In this case, $Q_1 = I - 2\rho_1 v_1 v_1^H$, $a_1$ is a specific complex number, and $a_1'$ is an arbitrary complex number vector with a length of Nt−1.

Step 2: Calculate $$Q_2 Q_1 W = \begin{bmatrix} a_{11} & a_{12} & a_2' \\ 0 & a_{22} & a_2'' \\ 0 & 0 & W_2' \end{bmatrix}.$$

In this case, $a_{11}, a_{12}, a_{22}$ is a specific complex number and $a_2', a_2''$ is an arbitrary complex number vector with length Nt−2.

In addition, $$Q_2 = \begin{bmatrix} 1 & 0 \\ 0 & Q_2' \end{bmatrix},$$

in this case, $Q'_2 = I - 2\rho_2 v'_1 v'_1{}^H$, $v'_1 = w'_1 - \beta_2 e_1$, and $w'_1$ is the first column vector of $W_1'$. And it is calculated/configured to $$\rho_2 = \frac{1}{v_1'^H v_1'}, \quad \beta_2 = \frac{2\rho_2 - 1}{2\rho_2 w'_{11}}.$$

Step k: Calculate $$Q_{k-1} \ldots Q_2 Q_1 W = \begin{bmatrix} b_{11} & b_{12} & \ldots & b' \\ 0 & b_{22} & \ldots & \vdots \\ \vdots & \vdots & \ldots & b'' \\ 0 & 0 & 0 & W'_{k-1} \end{bmatrix}.$$

In this case, $b_{11}$, $b_{12}$, $b_{22}$ is a specific complex number and b', b" is an arbitrary complex number vector of length Nt−k.

In addition, $$Q_k = \begin{bmatrix} I_{k-1} & 0 \\ 0 & Q'_k \end{bmatrix},$$

in this case, $I_{k-1}$ is an identity matrix of size (k−1)-by-(k−1), $Q_k' = I - 2\rho_k v'_{k-1} v'^H_{k-1}$, $v'_{k-1} = w'_{k-1} - \beta_k e_1$, and $w'_{k-1}$ is the first column vector of $W_{k-1}'$, and it is calculated/configure as $$\rho_k = \frac{1}{v'^H_{k-1} v'_{k-1}} \beta_k = \frac{2\rho_k - 1}{2\rho_k (w'_{k-1})_{11}}.$$

The above step is performed until k=R. Then, the UE/base station calculates $Q = Q_1^H Q_2^H \ldots Q_R^H = [\tilde{Q}_1\ \tilde{Q}_2]$, calculates R orthogonal columns using $\tilde{Q}_1$, performs column-wise normalization, and calculates the final PMI.

(Method 1-2)—Given's Rotation Method (Given's Rotation Based)

Since elements constituting PMI are complex values, Given's rotation considers the following changed rotation matrix.

The rotation matrix R is $$R = \begin{bmatrix} \cos\alpha & -\sin\alpha \exp j\beta \\ \sin\alpha \exp j\beta & \cos\alpha \end{bmatrix}$$

or $$R = \begin{bmatrix} \cos\alpha & \sin\alpha \exp j\beta \\ -\sin\alpha \exp j\beta & \cos\alpha \end{bmatrix}$$

or $$R = \begin{bmatrix} \cos\alpha & -\sin\alpha \\ \sin\alpha & \cos\alpha \end{bmatrix} \begin{bmatrix} \cos\beta & j\sin\beta \\ j\sin\beta & \cos\beta \end{bmatrix},$$

where α and β are variables for rotation at any angle.

Hereinafter, a step in which the UE/base station performs PMI orthogonalization will be described, which is generalized to apply the rotation matrix to a vector of an arbitrary size. Hereinafter, for convenience of description, it is assumed $$R = \begin{bmatrix} \cos\alpha & \sin\alpha \exp j\beta \\ -\sin\alpha \exp j\beta & \cos\alpha \end{bmatrix}.$$

$$R_{mn} = \begin{bmatrix} 1 & \ldots & 0 & \ldots & 0 & \ldots & 0 \\ \vdots & \ddots & \vdots & \ldots & \vdots & \ddots & \vdots \\ 0 & \ldots & \cos\alpha & \ldots & \sin\alpha \exp j\beta & \ldots & 0 \\ \vdots & \ldots & \vdots & \ddots & \vdots & \ldots & \vdots \\ 0 & \ldots & -\sin\alpha \exp j\beta & \ldots & \cos\alpha & \ldots & 0 \\ \vdots & \ldots & \vdots & \ldots & \vdots & \ldots & \vdots \\ 0 & \ldots & 0 & \ldots & 0 & \ldots & 1 \end{bmatrix} \quad \text{[Equation 12]}$$

The $R_{mn}$ matrix (x-by-x) of Equation 12 indicates that the m and n-th elements of a complex vector of arbitrary length x are rotated using α and β, and only the m-th and n-th elements of the m-th column of the identity matrix of (x-by-x) are defined as cos α, −sin α exp jβ, and the remaining elements are 0, for the nth column, only the m-th and n-th elements are defined as sin α exp jβ, cos α, and the remaining elements indicate a matrix substituted with 0. When the matrix of Equation 12 is applied to an arbitrary matrix A, all elements of the m-th and n-th columns of the matrix are rotated using α and β.

Step 1: Calculate $Q_1 = R_{1N_t}$.

At this time, α and β in the matrix are calculated as follows. If $$w_1 = \begin{bmatrix} w_{11} \\ w_{12} \\ \vdots \\ w_{1N_t} \end{bmatrix}$$

is defined,

It is calculated as $$\alpha = \arctan\left(\left|\frac{w_{1N_t}}{w_{11}}\right|\right),$$

$$\beta = -ang\left(\frac{w_{1N_t}}{w_{11}}\right),$$

where ang(y) indicates the phase component of a specific complex value y. And, α and β are the results of calculating α and β satisfying $$Q_{1N_t} w_1 = \begin{bmatrix} \tilde{w}_{11} \\ \tilde{w}_{12} \\ \vdots \\ \tilde{w}_{1N_t-1} \\ 0 \end{bmatrix}.$$

Steps 2 to Nt−1: Repeat step 1 to calculate $Q_2 \ldots Q_{N_t-1}$. $Q_{N_t-1} = R_{12}$ may be obtained by calculating α and β that satisfy $$Q_{N_t-1} \ldots Q_1 w_1 = \begin{bmatrix} \tilde{\tilde{w}}_{11} \\ 0 \\ \vdots \\ 0 \\ 0 \end{bmatrix}.$$

Step Nt: Calculate $Q_{N_t} = R_{2N_t}$.

In this case, if $$Q_{N_t-1} \cdots Q_1 w_2 = \begin{bmatrix} w_{21} \\ w_{22} \\ \vdots \\ w_{2N_t} \end{bmatrix}$$

is defined, it is calculated as $$\alpha = \arctan\left(\left|\frac{w_{2N_t}}{w_{22}}\right|\right),$$
$$\beta = -ang\left(\frac{w_{2N_t}}{w_{22}}\right),$$

and the calculation is a result of calculating α and β satisfying $$Q_{N_t} Q_{N_t-1} \cdots Q_1 w_2 = \begin{bmatrix} \tilde{w}_{21} \\ \tilde{w}_{22} \\ \vdots \\ \tilde{w}_{2N_t-1} \\ 0 \end{bmatrix}.$$

Steps Nt+1 to 2Nt−3: Repeat the process of step Nt to calculate a matrix $Q_{2N_t-3} \cdots Q_{N_t+1}$ satisfying $$Q_{2N_t-3} \cdots Q_1 w_2 = \begin{bmatrix} \widehat{w_{21}} \\ \widehat{w_{22}} \\ 0 \\ \vdots \\ 0 \end{bmatrix}.$$

Steps 2Nt−2 to t: $t = \sum_{i=1}^{R}(N_t-i)$, $Q_t = R_{R,R+1}$ repeats the above scheme to calculate a matrix $Q_t \cdots Q_{2N_t-2}$ satisfying $$Q_t \cdots Q_1 w_R = \begin{bmatrix} \widehat{w_{R1}} \\ \vdots \\ \widehat{w_{RR}} \\ 0 \\ \vdots \\ 0 \end{bmatrix}.$$

$Q = Q_1^H Q_2^H \cdots Q_t^H [\tilde{Q}_1 \ \tilde{Q}_2]$ is calculated, and column-wise normalization is performed on the result of calculating R orthogonal columns using $\tilde{Q}_1$, and the UE/base station calculates the final PMI.

(Method 2)

Method 2 is a method in which, in the case of a linear combination-based codebook such as Type II CSI, when the UE reports RI to multiple layers (e.g. RI=R>1), as will be described later, a combining coefficient is calculated and reported to the base station to ensure orthogonality between respective layers.

Hereinafter, the Type II CSI of Rel-15 of Method 2 will be described as an example.

It is assumed that the PMI for a specific n-th SB is $$W_1 = \begin{bmatrix} v_0 v_1 \cdots v_{L-1} & 0 \\ 0 & v_0 v_1 \cdots v_{L-1} \end{bmatrix}$$

and is calculated as $$W_2 = \begin{bmatrix} c_{1,1} & c_{2,1} & \cdots & c_{R,1} \\ c_{1,2} & c_{2,2} & \ddots & c_{R,2} \\ \vdots & \cdots & \cdots & \cdots \\ c_{1,2L} & c_{2,2L} & \cdots & c_{R,2L} \end{bmatrix}.$$

At this time, in the case of Type II CSI, coefficients, amplitude and phase coefficients are quantized layer-independently, and the UE may report a maximum of 2L*R coefficients to the base station. In this case, L of the linear combining codebook means the number of combining beams (# of combining beams). At this time, if the calculated specific amplitude is 0, the UE may report to the UE by omitting the phase component of the corresponding coefficient, and at this time, the number of non-zero coefficients reported for each layer (1, . . . , R) constituting the PMI by actually linear combining may be defined as K1, K2, . . . KR, respectively. In this case, whether respective layers are orthogonal is determined by the value of each coefficient.

In the present disclosure, it is described that some or all of non-zero specific coefficients are used to maintain/guarantee/achieve orthogonality between respective layers, and hereinafter, embodiments for maintaining/guaranteeing/achieving orthogonality will be described.

(Method 2-1)

The UE reports K1 to KR coefficients for layer 1 to R, coefficients corresponding to a specific spatial domain DFT beam (corresponding to a specific column of $$\begin{bmatrix} v_0 v_1 \cdots v_{L-1} & 0 \\ 0 & v_0 v_1 \cdots v_{L-1} \end{bmatrix}),$$

which is promised in advance or that the UE is configured from the base station and reports as a bitmap, etc., may be used to maintain/guarantee/achieve orthogonality between respective layers. In this case, one may be used for layer 2, two may be used for layer 3, and R−1 may be used for layer R.

For example, in L=4, RI=3, layer 1 is configured with PMI using K1=5, $\{c_{1,1}, c_{1,2}, c_{1,4}, c_{1,5}, c_{1,6}\}$, layer 2 may use K2=4, $\{c_{2,1}, c_{2,2}, c_{2,3}, c_{2,7}\}$, and layer 3 may use K3=4, $\{c_{3,2}, c_{3,3}, c_{3,4}, c_{3,5}\}$. Coefficients corresponding to $c_{2,8}$, which are not reported among the coefficients of layer 2, but which can be calculated and obtained by the UE and the base station as described below, may be used to maintain/guarantee/achieve orthogonality between respective layers, and the calculation method is as follows.

$$w_1 = \begin{bmatrix} v_0 v_1 \ldots v_{L-1} & 0 \\ 0 & v_0 v_1 \ldots v_{L-1} \end{bmatrix} \begin{bmatrix} c_{1,1} \\ c_{1,2} \\ 0 \\ c_{1,4} \\ c_{1,5} \\ c_{1,6} \\ 0 \\ 0 \end{bmatrix}$$

When $$w_2 = \begin{bmatrix} v_0 v_1 \ldots v_{L-1} & 0 \\ 0 & v_0 v_1 \ldots v_{L-1} \end{bmatrix} \begin{bmatrix} c_{2,1} \\ c_{2,2} \\ c_{2,3} \\ 0 \\ 0 \\ 0 \\ c_{2,7} \\ c_{2,8} \end{bmatrix},$$

$c_{2,8}$ is calculated as a coefficient satisfying $w_1^H w_2 = 0$.

Similarly, in $$w_3 = \begin{bmatrix} v_0 v_1 \ldots v_{L-1} & 0 \\ 0 & v_0 v_1 \ldots v_{L-1} \end{bmatrix} \begin{bmatrix} 0 \\ c_{3,2} \\ c_{3,3} \\ c_{3,4} \\ c_{3,5} \\ 0 \\ c_{3,7} \\ c_{3,8} \end{bmatrix},$$

$c_{3,7}$ and $c_{3,8}$ are calculated/constructed as solutions satisfying $w_1^H w_3 = 0$, $w_2^H w_3 = 0$. Here, the coefficients corresponding to the calculated $c_{2,8}$, $c_{3,7}$, $c_{3,8}$ are not reported to the base station, but are calculated by the UE and the base station, respectively, and may be used to derive/calculate the CQI by reflecting it in the PMI. Here, when RI=4, three coefficients corresponding to layer 4 satisfying $w_1^H w_4 = 0$, $w_2^H w_4 = 0$, $w_3^H w_4 = 0$ may be calculated.

(Method 2-2)

In the case of Method 2-1, when the number of non-zero coefficients reported by the UE to the base station is less than the number of coefficients used to maintain orthogonality between respective layers, there is a problem in that it is difficult to apply.

As another embodiment to solve this, among the non-zero coefficients reported by the UE to the base station, that is, one coefficient for layer 2, two coefficients for layer 3, and R−1 coefficients for layer R may be used to maintain orthogonality between respective layers.

For example, in a situation where L=4 and RI=3 as described in Method 2-1 above, PMI is configured using K1=5 and $\{c_{1,1}, c_{1,2}, c_{1,4}, c_{1,5}, c_{1,6}\}$ for layer 1, K2=3, $\{c_{2,1}, c_{2,2}, c_{2,3}\}$ may be used for layer 2, and K3=3, $\{c_{3,2}, c_{3,3}, c_{3,4}\}$ may be used for layer 3. At this time, among the coefficients of layer 2, although not reported to the base station, the coefficients corresponding to $c_{2,7}$ that may be calculated and obtained by the UE and the base station as described below may be used to maintain/guarantee/achieve orthogonality between respective layers, and the calculation is done as follows.

$$w_1 = \begin{bmatrix} v_0 v_1 \ldots v_{L-1} & 0 \\ 0 & v_0 v_1 \ldots v_{L-1} \end{bmatrix} \begin{bmatrix} c_{1,1} \\ c_{1,2} \\ 0 \\ c_{1,4} \\ c_{1,5} \\ c_{1,6} \\ 0 \\ 0 \end{bmatrix}$$

When $$w_2 = \begin{bmatrix} v_0 v_1 \ldots v_{L-1} & 0 \\ 0 & v_0 v_1 \ldots v_{L-1} \end{bmatrix} \begin{bmatrix} c_{2,1} \\ c_{2,2} \\ c_{2,3} \\ 0 \\ 0 \\ 0 \\ c_{2,7} \\ 0 \end{bmatrix},$$

$c_{2,7}$ is calculated as a coefficient that satisfies $w_1^H w_2 = 0$.

In $$w_3 = \begin{bmatrix} v_0 v_1 \ldots v_{L-1} & 0 \\ 0 & v_0 v_1 \ldots v_{L-1} \end{bmatrix} \begin{bmatrix} 0 \\ c_{3,2} \\ c_{3,3} \\ c_{3,4} \\ c_{3,5} \\ 0 \\ c_{3,7} \\ 0 \end{bmatrix},$$

$c_{3,5}$ and $c_{3,7}$ are calculated/constructed as solutions satisfying $w_1^H w_3 = 0$ and $w_2^H w_3 = 0$. Here, the coefficients of $c_{2,7}$, $c_{3,5}$, $c_{3,7}$ are not reported to the base station, but may be calculated by the UE and the base station, respectively, reflected in the PMI and used for CQI calculation/derivation.

Method 2-2 is more efficient than method 2-1 in that the number of coefficients that the UE needs to report to the base station is reduced from K1+K2+K3 to K1+K2+K3−3, so the payload is reduced. In addition, if RI=4, it may be extended by calculating 3 coefficients corresponding to layer 4 satisfying $w_1^H w_4 = 0$, $w_2^H w_4 = 0$, $w_3^H w_4 = 0$.

Although the above-described methods 2-1 and 2-2 calculated coefficients satisfying orthogonality for all layers, for the purpose of reducing the payload, the above-described method may be modified and applied to layer-group wise. For example, a scheme in which layers (1,2) and (3,4) satisfy group-wise orthogonality may be considered. In this case, the the above-described methods 2-1 and 2-2 may be modified into methods 2-3 and 2-4 to be described later, respectively.

(Method 2-3)

In L=4, RI=4, PMI is configured using K1=5 and $\{c_{1,1}, c_{1,2}, c_{1,4}, c_{1,5}, c_{1,6}\}$ for layer 1, K2=4, $\{c_{2,1}, c_{2,2}, c_{2,3}, c_{2,7}\}$ may be used for layer 2, K3=4, $\{c_{3,2}, c_{3,3}, c_{3,4}, c_{3,5}\}$ may be used for layer 3, and K3=3, $\{c_{4,1}, c_{4,3}, c_{4,5}\}$ may be used for layer 4. At this time, among the coefficients of layer 2, although not reported to the base station, the coefficients corresponding to $c_{2,8}$ that may be calculated and obtained by the UE and the base station through a method described later may be used to maintain/guarantee/achieve orthogonality between respective layers, and the calculation is done as follows.

$$w_1 = \begin{bmatrix} v_0 v_1 \ldots v_{L-1} & 0 \\ 0 & v_0 v_1 \ldots v_{L-1} \end{bmatrix} \begin{bmatrix} c_{1,1} \\ c_{1,2} \\ 0 \\ c_{1,4} \\ c_{1,5} \\ c_{1,6} \\ 0 \\ 0 \end{bmatrix}$$

$$w_2 = \begin{bmatrix} v_0 v_1 \ldots v_{L-1} & 0 \\ 0 & v_0 v_1 \ldots v_{L-1} \end{bmatrix} \begin{bmatrix} c_{2,1} \\ c_{2,2} \\ c_{2,3} \\ 0 \\ 0 \\ 0 \\ c_{2,7} \\ 0 \end{bmatrix}$$

When $$w_3 = \begin{bmatrix} v_0 v_1 \ldots v_{L-1} & 0 \\ 0 & v_0 v_1 \ldots v_{L-1} \end{bmatrix} \begin{bmatrix} 0 \\ c_{3,2} \\ c_{3,3} \\ c_{3,4} \\ c_{3,5} \\ 0 \\ c_{3,7} \\ c_{3,8} \end{bmatrix},$$

$c_{3,7}$ and $c_{3,8}$ are calculated/constructed as solutions satisfying $w_1^H w_3 = 0$, $w_2^H w_3 = 0$, When $$w_4 = \begin{bmatrix} v_0 v_1 \ldots v_{L-1} & 0 \\ 0 & v_0 v_1 \ldots v_{L-1} \end{bmatrix} \begin{bmatrix} c_{4,1} \\ 0 \\ c_{4,3} \\ 0 \\ c_{4,5} \\ 0 \\ c_{4,7} \\ c_{4,8} \end{bmatrix},$$

$c_{4,7}$ and $c_{4,8}$ are calculated/constructed as solutions satisfying $w_1^H w_4 = 0$, $w_2^H w_4 = 0$. Here, the coefficients corresponding to $c_{3,7}$, $c_{3,8}$, $c_{4,7}$, $c_{4,8}$ are not reported to the base station, but may be calculated by the UE and the base station, respectively, reflected in the PMI and used for CQI calculation/derivation.

(Method 2-4)

In L=4, RI=4, PMI is configured using K1=5 and $\{c_{1,1}, c_{1,2}, c_{1,4}, c_{1,5}, c_{1,6}\}$ for layer 1, K2=4, $\{c_{2,1}, c_{2,2}, c_{2,3}, c_{2,7}\}$ may be used for layer 2, K3=4, $\{c_{3,2}, c_{3,3}, c_{3,4}, c_{3,5}\}$ may be used for layer 3, and K3=3, $\{c_{4,1}, c_{4,3}, c_{4,5}\}$ may be used for layer 4. At this time, among the coefficients of layer 2, although not reported to the base station, the coefficients corresponding to $c_{2,8}$ that may be calculated and obtained by the UE and the base station through a method described later may be used to maintain/guarantee/achieve orthogonality between respective layers, and the calculation is done as follows.

$$w_1 = \begin{bmatrix} v_0 v_1 \ldots v_{L-1} & 0 \\ 0 & v_0 v_1 \ldots v_{L-1} \end{bmatrix} \begin{bmatrix} c_{1,1} \\ c_{1,2} \\ 0 \\ c_{1,4} \\ c_{1,5} \\ c_{1,6} \\ 0 \\ 0 \end{bmatrix}$$

$$w_2 = \begin{bmatrix} v_0 v_1 \ldots v_{L-1} & 0 \\ 0 & v_0 v_1 \ldots v_{L-1} \end{bmatrix} \begin{bmatrix} c_{2,1} \\ c_{2,2} \\ c_{2,3} \\ 0 \\ 0 \\ 0 \\ c_{2,7} \\ 0 \end{bmatrix}$$

When $w_3 = \begin{bmatrix} v_0 v_1 \ldots v_{L-1} & 0 \\ 0 & v_0 v_1 \ldots v_{L-1} \end{bmatrix} \begin{bmatrix} 0 \\ c_{3,2} \\ c_{3,3} \\ c_{3,4} \\ c_{3,5} \\ 0 \\ 0 \\ 0 \end{bmatrix},$ $c_{3,4}$ and $c_{3,5}$ are calculated/constructed as solutions satisfying $w_1^H w_3 = 0$, $w_2^H w_3 = 0$, In $$w_4 = \begin{bmatrix} v_0 v_1 \ldots v_{L-1} & 0 \\ 0 & v_0 v_1 \ldots v_{L-1} \end{bmatrix} \begin{bmatrix} c_{4,1} \\ 0 \\ c_{4,3} \\ 0 \\ c_{4,5} \\ 0 \\ 0 \\ 0 \end{bmatrix},$$

$c_{4,3}$ and $c_{4,5}$ are calculated/constructed as solutions satisfying $w_1^H w_4 = 0$, $w_2^H w_4 = 0$. At this time, the coefficients corresponding to $c_{3,4}$, $c_{3,5}$, $c_{4,3}$, $c_{4,5}$ are not reported to the base station, but may be calculated by the UE and the base station, respectively, reflected in the PMI and used for CQI calculation/derivation. Method 2-4 has the effect that it is more efficient than method 2-3 in that the number of coefficients that the UE needs to report to the base station is reduced from K1+K2+K3 to K1+K2+K3−3, so the payload is reduced.

For the purpose of reducing inter-stream interference only for a specific layer, for example, the above-described methods 2-1 and 2-2 may be modified and applied to satisfy orthogonality with respect to a layer indicated by a layer indicator (L1) or a specific layer(s) (e.g. layer 1) promised in advance or indicated by a base station. That is, if orthogonality between all layers is guaranteed only for layer 1, to satisfy $w_1^H w_2=0$, $w_1^H w_3=0$, $w_1^H w_4=0$, one coefficient for each layer may be calculated using the above-described methods 2-1 and 2-2. On the other hand, when orthogonality for a plurality of layers is to be guaranteed, coefficients as many as the number of layers may be calculated using the above-described methods 2-1 and 2-2.

If this method is extended to layer group wise, the layer(s) belonging to the same group may omit the calculation of coefficients that satisfy orthogonality.

The above-described methods 2-1 to 2-4 are a scheme of modifying or adding a specific coefficient in the preferred PMI calculated by the UE, and a difference in the performance may increase according to a specific coefficient selected to ensure orthogonality between respective layers. For example, if the coefficient calculated to ensure orthogonality has a very large value, it is highly likely to cause severe distortion in the actual preferred PMI and degrade performance. To this end, the UE may report information on the location of the coefficient with the best performance while maintaining orthogonality between respective layers to the base station in a bitmap or the like manner, and it may use a full bit-map (size-2LR in the above embodiment), and report the location information to the base station in bitmaps of size-2L, respectively, only for layer 2, 3, . . . R. Alternatively, if there is location information for a non-zero coefficient by information of another bitmap or WideBand (WB) amplitude, such as method 2-2 and method 2-4, the corresponding information may be reported using a reduced bitmap to reduce the payload. For example, bitmaps of size-K2, size-K3, and size-K4 may be used. In this case, the bitmap information may be included in Part 2 CSI. In addition, it is obvious that the above-described method may be (changed) applied to the Rel-16 compression-based codebook. In addition, the bitmap information may maximize its performance effect with SB CSI, but since this greatly increases the payload, it may be more efficient to jointly apply WB CSI to all SBs.

(Method 2-A)

As in the above-described methods 1 and 2, when the codebook is configured/calculated to maintain orthogonality between respective layers configured by the base station or promised by a pre-defined rule, centered on a certain layer (e.g. centered on layer 1) or in certain layer order, information on whether processing to maintain orthogonality is performed may be promised in advance between the base station and the UE, or the UE may additionally report the information to the base station.

For example, when the UE/base station performs processing for maintaining orthogonality between respective layers, the layer indicated by LI becomes the starting layer. The order of layers to which processing for maintaining orthogonality between respective layers is applied follows a pre-defined rule, or the UE may report information on the order to the base station using a separate field.

As an example of a pre-defined rule, the applied layer order may be determined according to the order of many or few non-zero coefficients for layers applied or reported in the order of layer 1→2→3→4.

On the other hand, the importance of the process for maintaining orthogonality varies depending on the channel conditions or whether the base station operates in multi user-MIMO (MU-MIMO) or single user-MIMO (SU-MIMO). For example, when SU-MIMO is supported, since the process for maintaining orthogonality may be more important, the base station may instruct to the UE information on whether or not to apply the process for maintaining orthogonality or which process to apply (e.g. apply Method 1 or Method 2) through a higher layer (e.g. RRC or MAC CE) or dynamic signaling (e.g. DCI). In addition, when the UE reports the information to the base station, the size of the PMI may be changed depending on whether to apply the process for maintaining orthogonality such as method 2. Accordingly, information on whether to apply the process for maintaining such orthogonality may be included in Part 1 CSI and reported to the base station.

(Method 3)

In the case of a linear combination-based codebook such as Type II CSI, LI is not reported, and the UE assumes that the strongest layer is layer 1.

Depending on the channel environment, the strongest layer is not limited to a specific layer, but in a linear combination technique such as Type II codebook, unlike Type I CSI, it can be implemented based on singular value decomposition (SVD) for convenience of implementation, this SVD is likely to be used by an implementation that are ordered in the order of large singular value. Therefore, for most UE implementations, since the strongest layer is most likely to be the first layer, that is, layer 1, the RI reported for phase tracking reference resource (PTRS) mapping may be omitted without being reported by the UE, the UE may assume that the PTRS is always mapped to layer 1.

(Method 4)

The alphabet set of amplitude and/or phase of a linear combination-based codebook such as Type II CSI may be a non-uniform alphabet set.

Rel-16 Type II CSI uses a 4-bit alphabet for amplitude quantization for weaker polarization.

Alphabet of 4-bit size is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}.$$

(−1.5 dB step size)

Good performance may be obtained using power-domain-wise uniform alphabet. However, since the power difference between the two polarizations rarely has almost zero like the value of $$\left(\frac{1}{2^{14}}\right) = 0.08,$$

etc., from the point of view of optimizing this, for certain ranges (e.g. −0.75 dB), a more compact value is used, and for other ranges, a less compact value (e.g. −3 dB) is suggested.

For example, alphabets such as Table 16 and Table 17 may be considered.

Table 16 is an example in which 0 can be implicitly indicated by a non-zero coefficients indicator (e.g. bitmap), etc., and thus the state for this is used to increase granularity.

TABLE 16

| State | Value |
|---|---|
| 0 | $\left(\frac{1}{2^7}\right)^{\frac{1}{2}}$ |
| 1 | $\left(\frac{1}{2^6}\right)^{\frac{1}{2}}$ |
| 2 | $\left(\frac{1}{2^5}\right)^{\frac{1}{2}}$ |
| 3 | $\left(\frac{1}{2^4}\right)^{\frac{1}{2}}$ |
| 4 | $\left(\frac{1}{2^3}\right)^{\frac{1}{2}}$ |
| 5 | $\left(\frac{1}{2^{10}}\right)^{\frac{1}{8}}$ |
| 6 | $\left(\frac{1}{2^9}\right)^{\frac{1}{8}}$ |
| 7 | $\left(\frac{1}{2^8}\right)^{\frac{1}{8}}$ |
| 8 | $\left(\frac{1}{2^7}\right)^{\frac{1}{8}}$ |
| 9 | $\left(\frac{1}{2^6}\right)^{\frac{1}{8}}$ |
| 10 | $\left(\frac{1}{2^5}\right)^{\frac{1}{8}}$ |
| 11 | $\left(\frac{1}{2^4}\right)^{\frac{1}{8}}$ |
| 12 | $\left(\frac{1}{2^3}\right)^{\frac{1}{8}}$ |
| 13 | $\left(\frac{1}{2^2}\right)^{\frac{1}{8}}$ |
| 14 | $\left(\frac{1}{2^1}\right)^{\frac{1}{8}}$ |
| 15 | 1 |

TABLE 17

| State | Value |
|---|---|
| 0 | $\left(\frac{1}{2^6}\right)^{\frac{1}{2}}$ |
| 1 | $\left(\frac{1}{2^5}\right)^{\frac{1}{2}}$ |
| 2 | $\left(\frac{1}{2^4}\right)^{\frac{1}{2}}$ |
| 3 | $\left(\frac{1}{2^3}\right)^{\frac{1}{2}}$ |
| 4 | $\left(\frac{1}{2^{11}}\right)^{\frac{1}{8}}$ |
| 5 | $\left(\frac{1}{2^{10}}\right)^{\frac{1}{8}}$ |
| 6 | $\left(\frac{1}{2^9}\right)^{\frac{1}{8}}$ |
| 7 | $\left(\frac{1}{2^8}\right)^{\frac{1}{8}}$ |
| 8 | $\left(\frac{1}{2^7}\right)^{\frac{1}{8}}$ |
| 9 | $\left(\frac{1}{2^6}\right)^{\frac{1}{8}}$ |
| 10 | $\left(\frac{1}{2^5}\right)^{\frac{1}{8}}$ |
| 11 | $\left(\frac{1}{2^4}\right)^{\frac{1}{8}}$ |
| 12 | $\left(\frac{1}{2^3}\right)^{\frac{1}{8}}$ |
| 13 | $\left(\frac{1}{2^2}\right)^{\frac{1}{8}}$ |
| 14 | $\left(\frac{1}{2^1}\right)^{\frac{1}{8}}$ |
| 15 | 1 |

It is obvious that the above-described methods 1 to 4, although PUSCH1-4 was mainly described for PUSCH-based report, may be equally extended and applied to the PUCCH-based report.

Base Station and UE Operation

Operation procedures of the base station and the UE performing a method proposed in the present disclosure are shown in FIGS. 22 and 23.

FIGS. 22 and 23, which will be described below, are for convenience of description, and are only an example for performing the method proposed in the present disclosure, and do not limit the scope of the method proposed by the present disclosure. In addition, some of the steps described in FIGS. 22 and 23 may be combined or omitted. In addition, in performing the procedures described below, the above-described CSI-related operation may be considered/applied.

For reference, although not specified in FIG. 22, the base station and the UE may first perform a beam management procedure before performing the CSI procedure. For example, the UE and/or the base station may be configured to perform the DL BM procedure and/or the above-described UL BM procedure in the above-described beam management. Specifically, with respect to the DL BM procedure, the UE and/or the base station may be configured to perform the above-described DL BM procedure using SSB (e.g. FIG. 12, etc.), DL BM using the CSI-RS (e.g. FIGS. 13, 14, etc.), and/or DL BM-related beam indication procedure. In addition, with respect to the UL BM procedure, the UE and/or the base station may be configured to perform the UL BM procedure (e.g. FIGS. 17 and 18, etc.) using the above-described SRS. After such a beam management procedure is performed, the CSI procedure may be performed based on the determined/selected beam pair(s).

First, the base station may transmit system information (SI) and/or scheduling information and/or CSI related Config. (e.g. CSI reporting setting, e.g. CSI-RS resource setting, etc.) by a higher layer (e.g. RRC or MAC CE) to the UE (D05).

The base station may transmit RS (e.g. SSB, CSI-RS, TRS, PT-RS) to the UE in order to receive the channel state report of the UE (D10). In addition, the base station may transmit an indication for CSI reporting to the UE (D15). For example, in the case of aperiodic CSI reporting, the indication may be performed through CSI reporting triggering DCI. Alternatively, in the case of semi-persistent CSI reporting/periodic CSI reporting, step D15 may be omitted. In addition, steps D10 and D15 may be changed in order or merged into one step.

The base station may receive a report of channel state CSI (e.g. CRI/RI/CQI/PMI/LI) from the UE (D20). For example, the base station may receive a report of the determined/calculated CSI based on the above-described method (Methods 1 to 4) from the UE.

In addition, as mentioned above, the CSI may be reported through PUCCH/PUSCH. In this case, the transmit power for the CSI reporting, i.e. PUCCH/PUSCH Tx power, may be determined based on the above-described power control scheme. As an example, the UE may be configured to determine PUCCH/PUSCH Tx power based on the above-described Equation P2/P1 and the signaling of FIG. 10 in performing CSI reporting through PUCCH/PUSCH.

In addition, as mentioned above, the CSI may be reported through the PUSCH. In this case, the UE may receive DCI (i.e.g UL DCI) for scheduling the corresponding PUSCH from the base station. Here, information indicating the BWP to be used by the UE for PUSCH transmission may be included to the DCI for scheduling the PUSCH. That is, the base station may indicate or configure the BWP (i.e. active BWP) to be used by the UE for PUSCH transmission through DCI. For example, as mentioned in the Bandwidth Part (BWP) part section in the above-mentioned BP. the table of contents, the DCI may include a field indicating a specific UL BWP (i.e. active UL BWP). In this case, the UE receiving the DCI may be configured to perform PUSCH based CSI reporting in the active UL BWP indicated by the DCI.

Thereafter, the base station may determine/calculate data scheduling and precoding based on the CSI (and/or a situation in consideration of CSI reported from the UE and other UEs served by the base station) reported from the UE (D25), and may transmit data to which the precoding is applied and RS (e.g. DMRS, TRS, PT-RS) for data decoding to the (scheduled) UE (D30).

FIG. 23 is a flowchart illustrating an operation process in a UE performing a CSI procedure to which a method proposed in the present disclosure may be applied.

For reference, although not specified in FIG. 23, the base station and the UE may first perform a beam management procedure before performing the CSI procedure. For example, the UE and/or the base station may be configured to perform the DL BM procedure in the above-described beam management and/or the above-described UL BM procedure. Specifically, with respect to the DL BM procedure, the UE and/or the base station may be configured to perform the above-described DL BM procedure using SSB (e.g. FIG. 12, etc.), DL BM using the CSI-RS (e.g. FIGS. 13, 14, etc.), and/or DL BM-related beam indication procedure. In addition, with respect to the UL BM procedure, the UE and/or the base station may be configured to perform the UL BM procedure (e.g. FIGS. 17 and 18, etc.) using the above-described SRS. After such a beam management procedure is performed, the CSI procedure may be performed based on the determined/selected beam pair(s).

First, the UE may receive system information (SI) and/or scheduling information and/or CSI related Config. (CSI reporting setting, CSI-RS resource setting, etc.) by a higher layer (e.g. RRC or MAC CE) from the base station (E05).

The UE may receive RS (e.g. SSB, CSI-RS, TRS, PT-RS) related to the channel state report from the base station (E10). In addition, the UE may receive an indication for CSI reporting from the base station (E15). For example, in the case of aperiodic CSI reporting, the indication may be performed through CSI reporting triggering DCI. Alternatively, in the case of semi-persistent CSI reporting/periodic CSI reporting, step D15 may be omitted. In addition, steps D10 and D15 may be changed in order or merged into one step.

The UE may determine/calculate CSI based on the information (information of reporting setting, information indicated by DCI, etc.) configured from the RS and the base station (E20), and report the CSI to the base station (E25). For example, the UE may apply the above-described method (e.g. Method 1 to Method 4) in determining/calculating the CSI, and information (e.g. CQI, PMI, RI, LI, etc.) included in the reported CSI may also be configured/determined based on the above-described method (e.g. Method 1 to Method 4).

In addition, as mentioned above, the CSI may be reported through PUCCH/PUSCH. In this case, the transmit power for the CSI reporting, i.e. PUCCH/PUSCH Tx power, may be determined based on the above-described power control scheme. As an example, the UE may be configured to determine PUCCH/PUSCH Tx power based on the above-described Equation P2/P1 and the signaling of FIG. 10 in performing CSI reporting through PUCCH/PUSCH.

In addition, as mentioned above, the CSI may be reported through the PUSCH. In this case, the UE may receive DCI (i.e.g UL DCI) for scheduling the corresponding PUSCH from the base station. Here, information indicating the BWP to be used by the UE for PUSCH transmission may be included to the DCI for scheduling the PUSCH. That is, the base station may indicate or configure the BWP (i.e. active BWP) to be used by the UE for PUSCH transmission through DCI. For example, as mentioned in the Bandwidth Part (BWP) part of the above-mentioned BP. the table of contents, the DCI may include a field indicating a specific UL BWP (i.e. active UL BWP). In this case, the UE receiving the corresponding DCI may be configured to perform PUSCH based CSI reporting in the active UL BWP indicated by the DCI.

Thereafter, the UE may receive data/RS (for data decoding) according to data scheduling information from the base station (E30). In this case, data scheduling and precoding to be applied to data may be determined/calculated by the base station based on the CSI reported by the UE, but may not consider only the CSI reported by the UE.

In this regard, the operation of the base station and/or the UE may be implemented by a device (e.g. FIGS. 26 to 28) to be described below. For example, the base station may correspond to a transmitting device, the UE may correspond to a receiving device, and vice versa. As a specific example, the UE may receive DCI through an RF unit, after blind decoding (BD) DCI decoding and DMRS port through the processor, and may perform decoding on data. In this process, the UE may use the memory and may store the decoded data in the memory. In addition, the base station may store data to be transmitted in the memory and perform scheduling and DCI encoding for data signal transmission using a processor. Thereafter, the base station may transmit the DCI through the RF unit.

The above-described method or operation of the present disclosure has been described in terms of a "terminal" or "base station", but may be performed or implemented by a transmitting or receiving device, a (digital signal) processor, a microprocessor, etc. to be described later instead of the "UE" and "base station". In addition, the "terminal" is a general term, and may be used interchangeably with devices having mobility, such as mobile station (MS), user equipment (UE), and mobile terminal, and "base station" is a general term and may be used interchangeably with devices such as a base station (BS), an evolved NodeB (eNB), a next generation eNode B (ng-eNB), and a next generation NodeB (gNB).

Since examples of the above-described proposed method may also be included as one of the implementation methods of the present disclosure, it is obvious that they may be regarded as a kind of proposed schemes. In addition, the described proposed methods may be implemented independently, or may be implemented in the form of a combination (or merge) of some proposed methods. A rule may be defined so that information on whether the proposed methods are applied (or information about the rules of the proposed methods) is notified by the base station to the UE through a predefined signal (e.g. a physical layer signal or a higher layer signal). In addition, the proposed method described in the methods of the present disclosure and methods extendable therefrom may be implemented as a device, and the present disclosure includes the contents of a device implementing the proposed method. A description of the corresponding device will be described later with reference to the drawings.

The UE/base station described in the present disclosure may be replaced with various devices and applied as shown in FIGS. 26 to 28.

FIG. 24 is a flowchart illustrating an operation process in a UE performing CSI transmission in a wireless communication system according to an embodiment of the present disclosure.

First, the UE receives, from the base station, type-linear combining-based codebook-related parameters (S2410).

The UE calculates the CSI based on the codebook-related parameters (S2420).

The UE reports the CSI to the base station (S2430).

In this case, a channel quality indicator (CQI) in the CSI may be calculated using a precoding matrix indicator (PMI) determined so as to maintain orthogonality between respective layers by using a predefined method.

The predefined method may be i) a House-holder method or ii) a Givens rotation method.

The linear combination-based codebook may be a codebook for type 2 CSI, and the CSI may be is the type 2 CSI.

After step S2430, the UE may report, to the base station, a start layer index to which the predefined method is applied or an order of layers to which the predefined method is applied.

The precoding matrix indicator (PMI) in the CSI may maintain orthogonality between respective layers by using the predefined method.

A layer indicator (LI) may be not included in the CSI, and a phase tracking reference signal (PTRS) may be mapped to a first layer.

A user equipment (UE) device performing a method of transmitting channel state information (CSI) in a wireless communication system proposed in the present disclosure will be described with reference to FIGS. 26 to 29.

In this case, the UE device may be configured to include one or more transceivers for transmitting and receiving wireless signals, one or more processors functionally connected to the transceiver, and one or more memories for storing instructions for operations executed by the one or more processors and connected to the one or more processors.

In this case, the operations executed by the one or more processors may be the same as the operations related to FIG. 24 described above.

FIG. 25 is a flowchart illustrating an operation process in a base station receiving CSI in a wireless communication system according to an embodiment of the present disclosure.

First, the base station transmits, to a user equipment (UE), linear combining-based codebook-related parameters (S2510).

The base station receives the CSI calculated based on the codebook-related parameters from the UE (S2520).

In this case, a channel quality indicator (CQI) in the CSI may be calculated using a precoding matrix indicator (PMI) in the CSI determined so as to maintain orthogonality between respective layers by using a predefined method.

A base station device performing a method of receiving channel state information (CSI) in a wireless communication system will be described with reference to FIGS. 26 to 29.

In this case, the base station device may be configured to include one or more transceivers for transmitting and receiving wireless signals, one or more processors functionally connected to the transceiver, and one or more memories for storing instructions for operations executed by the one or more processors and connected to the one or more processors.

In this case, the operations executed by the one or more processors may be the same as the operations related to FIG. 25 described above.

The UE/base station described in the present disclosure may be replaced with various devices and applied as shown in FIGS. 26 to 29.

For example, the operation of transmitting/receiving channel state information (CSI) in the wireless communication system of the UE/base station described in FIGS. 24 and 25 may be implemented by a device of FIGS. 26 to 29 described below. For example, referring to FIG. 27, one or more processors 2712, 2722 may control one or more memories 2714, 2724 and/or one or more transceivers 2716, 2726, etc. to receive related information, and the one or more transceivers 2716 and 2726 may transmit the related information.

Operations related to a method of transmitting/receiving channel state information (CSI) in the above-mentioned wireless communication system may be implemented by a device (e.g. FIGS. 26 to 29) to be described later. For example, operations related to the above-mentioned method of transmitting/receiving the CSI may be processed by one or more processors 2712 and 2722 of FIGS. 26 to 29, and the operations related to the method of transmitting/receiving such CSI may be stored in memories 2714 and 2724 in the form of instructions/programs (e.g. instruction, executable code) for driving at least one processor 2712 and 2722 of FIGS. 26 to 29.

For example, a device comprising one or more memories and one or more processors functionally connected to the one or more memories, wherein the one or more processors is configured to cause the device to, receive, from a base station, linear combining-based codebook-related parameters, calculate the CSI based on the codebook-related parameters, and report the CSI to the base station, wherein a channel quality indicator (CQI) in the CSI may be configured to be calculated using a precoding matrix indicator (PMI) in the CSI determined so as to maintain orthogonality between respective layers by using a predefined method.

As another example, a non-transitory computer-readable medium storing one or more instructions, wherein the one or more instructions, which are executable by one or more processors, are configured for the UE to receive, from a base station, linear combining-based codebook-related parameters, calculate the CSI based on the codebook-related parameters, and report the CSI to the base station, wherein a channel quality indicator (CQI) in the CSI may be calculated using a precoding matrix indicator (PMI) in the CSI determined so as to maintain orthogonality between respective layers by using a predefined method.

Example of Communication System Applied to the Present Disclosure

Although not limited thereto, the various descriptions, functions, procedures, proposals, methods, and/or operational flowcharts of the present disclosure described in this document may be applied to a variety of fields requiring wireless communication/connection (e.g. 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 26 illustrates a communication system 10000 applied to the present disclosure.

Referring to FIG. 26, a communication system 10000 applied to the present disclosure includes a wireless device, a base station, and a network. Herein, the wireless device represents a device performing communication using Radio Access Technology (RAT) (e.g. 5G New RAT (NR)) or Long-Term Evolution (LTE)) and may be referred to as communication/radio/5G devices. Although not limited thereto, the wireless device may include a robot 10000a, vehicles 10000b-1 and 10000b-2, an eXtended Reality (XR) device 10000c, a hand-held device 10000d, a home appliance 10000e, an Internet of Things (IoT) device 10000f, and an Artificial Intelligence (AI) device/server 40000. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g. a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g. a smartwatch or smartglasses), and a computer (e.g. a notebook). The home appliance may include a TV, a refrigerator, and a washing machine. The IoT device may include a sensor and a smartmeter. For example, the BSs and the network may be implemented as wireless devices and a specific wireless device 20000a may operate as a BS/network node with respect to other wireless devices.

The wireless devices 10000a to 10000f may be connected to the network 30000 via the BSs 20000. An AI technology may be applied to the wireless devices 10000a to 10000f and the wireless devices 10000a to 10000f may be connected to the AI server 40000 via the network 30000. The network 30000 may be configured using a 3G network, a 4G (e.g. LTE) network, or a 5G (e.g. NR) network. Although the wireless devices 10000a to 10000f may communicate with each other through the BSs 20000/network 30000, the wireless devices 10000a to 10000f may perform direct communication (e.g. sidelink communication) with each other without passing through the BSs/network. For example, the vehicles 10000b-1 and 10000b-2 may perform direct communication (e.g. Vehicle-to-Vehicle (V2V)/Vehicle-to-everything (V2X) communication). The IoT device (e.g. a sensor) may perform direct communication with other IoT devices (e.g. sensors) or other wireless devices 10000a to 10000f.

Wireless communication/connections 15000a, 15000b, or 15000c may be established between the wireless devices 10000a to 10000f/BS 20000, or BS 20000/BS 20000. Herein, the wireless communication/connections may be established through various RATs (e.g. 5G NR) such as uplink/downlink communication 15000a, sidelink communication 15000b (or, D2D communication), or inter BS communication 15000c (e.g. Relay, Integrated Access Backhaul (IAB)). The wireless devices and the BSs/the wireless devices, the BSs and the BSs may transmit/receive radio signals to/from each other through the wireless communication/connections 15000a, 15000b, and 15000c. For example, the wireless communication/connections 15000a, 15000b, and 15000c may transmit/receive signals through various physical channels. To this end, at least a part of various configuration information configuring processes, various signal processing processes (e.g. channel encoding/decoding, modulation/demodulation, and resource mapping/demapping), and resource allocating processes, for transmitting/receiving radio signals, may be performed based on the various proposals of the present disclosure.

Example of Wireless Devices Applicable to the Present Disclosure

FIG. 27 is an example of a wireless device to which the methods proposed in the present disclosure may be applied.

Referring to FIG. 27, a first wireless device 2710 and a second wireless device 2720 may transmit radio signals through a variety of RATs (e.g. LTE and NR). Herein, {the first wireless device 2710 and the second wireless device 2720} may correspond to {the wireless device 10000x and the BS 20000} and/or {the wireless device 10000x and the wireless device 10000x} of FIG. 26.

The first wireless device 2710 may include one or more processors 2712 and one or more memories 2714 and additionally further include one or more transceivers 2716 and/or one or more antennas 2718. The processor(s) 2712 may control the memory(s) 2714 and/or the transceiver(s) 2716 and may be configured to implement the descriptions, functions, procedures, proposals, methods, and/or operational flowcharts disclosed in this document. For example, the processor(s) 2712 may process information within the memory(s) 2714 to generate first information/signals and then transmit radio signals including the first information/signals through the transceiver(s) 2716. The processor(s) 2712 may receive radio signals including second information/signals through the transceiver 2716 and then store information obtained by processing the second information/signals in the memory(s) 2714. The memory(s) 2714 may be connected to the processor(s) 2712 and may store a variety of information related to operations of the processor(s) 2712. For example, the memory(s) 2714 may store software code including commands for performing a part or the entirety of processes controlled by the processor(s) 2712 or for performing the descriptions, functions, procedures, proposals, methods, and/or operational flowcharts disclosed in this document. Herein, the processor(s) 12712 and the memory(s) 2714 may be a part of a communication modem/circuit/chip designed to implement RAT (e.g. LTE or NR). The transceiver(s) 2716 may be connected to the processor(s) 2712 and transmit and/or receive radio signals through one or more antennas 2718. The transceiver(s) 2716 may include a transmitter and/or a receiver. The transceiver(s) 2716 may be interchangeably used with Radio Frequency (RF) unit(s). In the present disclosure, the wireless device may represent a communication modem/circuit/chip.

The second wireless device 2720 may include one or more processors 2722, one or more memories 2724, and additionally further include one or more transceivers 2726 and/or one or more antennas 2728. The processor 2722 may control the memory 2724 and/or the transceiver 2726 and may be configured to implement the descriptions, functions, procedures, proposals, methods, and/or operational flowcharts disclosed in this document. For example, the processor 2722 may process information within the memory 2724 to generate third information/signals and then transmit radio signals including the third information/signals through the transceiver 2726. The processor 2722 may receive radio signals including fourth information/signals through the transceiver 2726 and then store information obtained by processing the fourth information/signals in the memory 2724. The memory 2724 may be connected to the processor 2722 and may store a variety of information related to operations of the processor 2722. For example, the memory 2724 may store software code including commands for performing a part or the entirety of processes controlled by the processor 2722 or for performing the descriptions, functions, procedures, proposals, methods, and/or operational flowcharts disclosed in this document. Herein, the processor 2722 and the memory 2724 may be a part of a communication modem/circuit/chip designed to implement RAT (e.g. LTE or NR). The transceiver 2726 may be connected to the processor 2722 and transmit and/or receive radio signals through one or more antennas 2728. The transceiver 2726 may include a transmitter and/or a receiver. The transceiver 2726 may be interchangeably used with an RF unit. In the present disclosure, the wireless device may represent a communication modem/circuit/chip.

Hereinafter, hardware elements of the wireless devices 2710 and 2720 will be described more specifically. Although not limited thereto, one or more protocol layers may be implemented by one or more processors 2712 and 2722. For example, the one or more processors 2712 and 2722 may implement one or more layers (e.g. functional layers such as PHY, MAC, RLC, PDCP, RRC, and SDAP). The one or more processors 2712 and 2722 may generate one or more Protocol Data Units (PDUs) and/or one or more Service Data Unit (SDUs) according to the descriptions, functions, procedures, proposals, methods, and/or operational flowcharts disclosed in this document. The one or more processors 2712 and 2722 may generate messages, control information, data, or information according to the descriptions, functions, procedures, proposals, methods, and/or operational flowcharts disclosed in this document. The one or more processors 2712 and 2722 may generate signals (e.g., baseband signals) including PDUs, SDUs, messages, control information, data, or information according to the functions, procedures, proposals, methods, and/or operational flowcharts disclosed in this document and provide the generated signals to the one or more transceivers 2716 and 2726. The one or more processors 2712 and 2722 may receive the signals (e.g. baseband signals) from the one or more transceivers 2716 and 2726 and acquire the PDUs, SDUs, messages, control information, data, or information according to the descriptions, functions, procedures, proposals, methods, and/or operational flowcharts disclosed in this document.

The one or more processors 2712 and 2722 may be referred to as controllers, microcontrollers, microprocessors, or microcomputers. The one or more processors 2712 and 2722 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 2712 and 2722. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 2712 and 2722 or stored in the one or more memories 2714 and 2724 to be driven by the one or more processors 2712 and 2722. The descriptions, functions, procedures, proposals, methods, and/or operational flowcharts disclosed in this document may be implemented using firmware or software in the form of code, commands, and/or a set of commands.

The one or more memories 2714 and 2724 may be connected to the one or more processors 2712 and 2722 and store various types of data, signals, messages, information, programs, code, instructions, and/or commands. The one or more memories 2714 and 2724 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 2714 and 2724 may be located at the interior and/or exterior of the one or more processors 2712 and 2722. The one or more memories 2714 and 2724 may be connected to the one or more processors 2712 and 2722 through various technologies such as wired or wireless connection.

The one or more transceivers 2716 and 2726 may transmit user data, control information, and/or radio signals/channels, mentioned in the methods and/or operational flowcharts of this document, to one or more other devices. The one or more transceivers 2716 and 2726 may receive user data, control information, and/or radio signals/channels, mentioned in the descriptions, functions, procedures, proposals, methods, and/or operational flowcharts disclosed in this document, from one or more other devices. For example, the one or more transceivers 2716 and 2726 may be connected to the one or more processors 2712 and 2722 and transmit and receive radio signals. For example, the one or more processors 2712 and 2722 may perform control so that the one or more transceivers 2716 and 2726 may transmit user data, control information, or radio signals to one or more other devices. The one or more processors 2712 and 2722 may perform control so that the one or more transceivers 2716 and 2726 may receive user data, control information, or radio signals from one or more other devices. The one or more transceivers 2716 and 2726 may be connected to the one or more antennas 2718 and 2728 and the one or more transceivers 2716 and 2726 may be configured to transmit and receive user data, control information, and/or radio signals/channels, mentioned in the descriptions, functions, procedures, proposals, methods, and/or operational flowcharts disclosed in this document, through the one or more antennas 2718 and 2728. In this document, the one or more antennas may be a plurality of physical antennas or a plurality of logical antennas (e.g. antenna ports). The one or more transceivers 2716 and 2726 may convert received radio signals/channels etc. from RF band signals into baseband signals in order to process received user data, control information, radio signals/channels, etc. using the one or more processors 2712 and 2722. The one or more transceivers 2716 and 2726 may convert the user data, control information, radio signals/channels, etc. processed using the one or more processors 2712 and 2722 from the base band signals into the RF band signals. To this end, the one or more transceivers 2716 and 2726 may include (analog) oscillators and/or filters.

Example of a Wireless Device Applied to the Present Disclosure

FIG. 28 illustrates another example of a wireless device applied to the present disclosure. The wireless device may be implemented in various forms according to a use-case/service.

Referring to FIG. 28, wireless devices 2801 and 2802 may correspond to the wireless devices 2710 and 2720 of FIG. 27 and may be configured by various elements, components, units/portions, and/or modules. For example, each of the wireless devices 2710 and 2720 may include a communication unit 2810, a control unit 2820, a memory unit 2830, and additional components 2840. The communication unit may include a communication circuit 2812 and transceiver(s) 2814. For example, the communication circuit 2812 may include the one or more processors 2712 and 2722 and/or the one or more memories 2714 and 2724 of FIG. 27. For example, the transceiver(s) 2814 may include the one or more transceivers 2716 and 2726 and/or the one or more antennas 2718 and 2728 of FIG. 27. The control unit 2820 is electrically connected to the communication unit 2810, the memory 2830, and the additional components 2840 and controls overall operation of the wireless devices. For example, the control unit 2820 may control an electric/mechanical operation of the wireless device based on programs/code/commands/information stored in the memory unit 2830. The control unit 2820 may transmit the information stored in the memory unit 2830 to the exterior (e.g., other communication devices) via the communication unit 2810 through a wireless/wired interface or store, in the memory unit 2830, information received through the wireless/wired interface from the exterior (e.g. other communication devices) via the communication unit 2810.

The additional components 2840 may be variously configured according to types of wireless devices. For example, the additional components 2840 may include at least one of a power unit/battery, input/output (I/O) unit, a driving unit, and a computing unit. The wireless device may be implemented in the form of, without being limited to, the robot (10000a of FIG. 26), the vehicles (10000b-1 and 10000b-2 of FIG. 26), the XR device (10000c of FIG. 26), the hand-held device (10000d of FIG. 26), the home appliance (10000e of FIG. 26), the IoT device (10000f of FIG. 26), a digital broadcast terminal, a hologram device, a public safety device, an MTC device, a medicine device, a fintech device (or a finance device), a security device, a climate/environment device, the AI server/device (40000 of FIG. 26), the BSs (20000 of FIG. 26), a network node, etc. The wireless device may be used in a mobile or fixed place according to a use-example/service.

In FIG. 28, the entirety of the various elements, components, units/portions, and/or modules in the wireless devices 2801 and 2802 may be connected to each other through a wired interface or at least a part thereof may be wirelessly connected through the communication unit 2810. For example, in each of the wireless devices 2710 and 2720, the control unit 2820 and the communication unit 2810 may be connected by wire and the control unit 2820 and first units (e.g. 2830 and 2840) may be wirelessly connected through the communication unit 2810. In addition, each element, component, unit/portion, and/or module within the wireless devices 2710 and 2720 may further include one or more elements. For example, the control unit 2820 may be configured by a set of one or more processors. As an example, the control unit 2820 may be configured by a set of a communication control processor, an application processor, an Electronic Control Unit (ECU), a graphical processing unit, and a memory control processor. As another example, the memory 2830 may be configured by a Random Access Memory (RAM), a Dynamic RAM (DRAM), a Read Only Memory (ROM)), a flash memory, a volatile memory, a non-volatile memory, and/or a combination thereof.

Hereinafter, the embodiment of FIG. 28 will be described in more detail with reference to the drawings.

Examples of Mobile Devices to Which the Present Disclosure Can be Applied

FIG. 29 illustrates a portable device applied to the present disclosure. The portable device may include a smart phone, a smart pad, a wearable device (e.g. a smart watch, a smart glass), and a portable computer (e.g. a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 29, a portable device 2710 may include an antenna unit 2718, a communication unit 2810, a control unit 2820, a memory unit 2830, a power supply unit 2840a, an interface unit 2840b, and an input/output unit 2840c. The antenna unit 2714 may be configured as a part of the communication unit 2810. The blocks 2810 to 2830/2840a to 2840c correspond to the blocks 2810 to 2840, respectively.

The communication unit 2810 may transmit/receive a signal (e.g. data, a control signal, etc.) to/from another wireless device and base stations. The control unit 2820 may perform various operations by controlling components of the portable device 2710. The control unit 2820 may include an Application Processor (AP). The memory unit 2830 may store data/parameters/programs/codes/instructions required for driving the portable device 2710. Further, the memory unit 2830 may store input/output data/information, etc. The power supply unit 2840a may supply power to the portable device 2710 and include a wired/wireless charging circuit, a battery, and the like. The interface unit 2840b may support a connection between the portable device 2710 and another external device. The interface unit 2840b may include various ports (e.g. an audio input/output port, a video input/output port) for the connection with the external device. The input/output unit 2840c may receive or output a video information/signal, an audio information/signal, data, and/or information input from a user. The input/output unit 2840c may include a camera, a microphone, a user input unit, a display unit 2840d, a speaker, and/or a haptic module.

As one example, in the case of data communication, the input/output unit 2840c may acquire information/signal (e.g. touch, text, voice, image, and video) input from the user and the acquired information/signal may be stored in the memory unit 2830. The communication unit 2810 may transform the information/signal stored in the memory into the radio signal and directly transmit the transformed radio signal to another wireless device or transmit the radio signal to the base station. Further, the communication unit 2810 may receive the radio signal from another wireless device or base station and then reconstruct the received radio signal into original information/signal. The reconstructed information/signal may be stored in the memory unit 2830 and then output in various forms (e.g. text, voice, image, video, haptic) through the input/output unit 2840c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent to constitute an embodiment by combining claims that are not explicitly cited in the claims or to be included as a new claim by amendment after filing.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The present disclosure has been described focusing on examples applied to the 3GPP LTE/LTE-A/NR system, but it is possible to apply to various wireless communication systems in addition to the 3GPP LTE/LTE-A/NR system.

The invention claimed is:

1. A method of transmitting, by a user equipment (UE), channel state information (CSI) in a wireless communication system, the method comprising:
receiving, from a base station, linear combining-based codebook-related parameters;
calculating the CSI based on the codebook-related parameters;
reporting the CSI to the base station, wherein a channel quality indicator (CQI) in the CSI is calculated using a precoding matrix indicator (PMI) determined so as to maintain orthogonality between respective layers by using a predefined method; and
reporting, to the base station, a start layer index to which the predefined method is applied.

2. The method of claim 1, wherein the predefined method is i) a House-holder method or ii) a Givens rotation method.

3. The method of claim 1, wherein the linear combination-based codebook is a codebook for type 2 CSI, and the CSI is the type 2 CSI.

4. The method of claim 1, further comprising:
reporting, to the base station, an order of layers to which the predefined method is applied.

5. The method of claim 1, wherein the precoding matrix indicator (PMI) in the CSI maintains orthogonality between respective layers by using the predefined method.

6. The method of claim 1, wherein a layer indicator (LI) is not included in the CSI, and a phase tracking reference signal (PTRS) is mapped to a first layer.

7. A user equipment (UE) configured to transmit channel state information (CSI) in a wireless communication system, the UE comprising:
a transceiver;
at least one processor; and
at least one computer memory operably connectable to the at least one processor and storing instructions that, based on being executed by the least one processor, perform operations comprising:
receiving, from a base station, linear combining-based codebook-related parameters;
calculating the CSI based on the codebook-related parameters;
reporting the CSI to the base station, wherein a channel quality indicator (CQI) in the CSI is calculated using a precoding matrix indicator (PMI) determined so as to maintain orthogonality between respective layers by using a predefined method; and reporting, to the base station, a start layer index to which the predefined method is applied.

8. The UE of claim 7, wherein the predefined method is i) a House-holder method or ii) a Givens rotation method.

9. The UE of claim 7, wherein the linear combination-based codebook is a codebook for type 2 CSI, and the CSI is the type 2 CSI.

10. The UE of claim 7, the operations further comprising: reporting, to the base station, an order of layers to which the predefined method is applied.

11. The UE of claim 7, wherein the precoding matrix indicator (PMI) in the CSI maintains orthogonality between respective layers by using the predefined method.

12. A base station configured to receive channel state information (CSI) in a wireless communication system, the base station comprising:

a transceiver;

at least one processor; and at least one computer memory operably connectable to the least one processor and storing instructions that, based on being executed by the at least one processor, perform operations comprising:

transmitting, to a user equipment (UE), linear combining-based codebook-related parameters;

receiving the CSI calculated based on the codebook-related parameters from the UE, wherein a channel quality indicator (CQI) in the CSI is calculated using a precoding matrix indicator (PMI) in the CSI determined so as to maintain orthogonality between respective layers by using a predefined method; and receiving, from the UE, a start layer index to which the predefined method is applied.

* * * * *